US012077319B2

(12) United States Patent
Smith et al.

(10) Patent No.: US 12,077,319 B2
(45) Date of Patent: Sep. 3, 2024

(54) FABRICATION LINE, SYSTEMS, AND METHODS FOR FUSELAGE SECTIONS

(71) Applicant: The Boeing Company, Chicago, IL (US)

(72) Inventors: Daniel R. Smith, Woodinville, WA (US); Darrell D. Jones, Mill Creek, WA (US); Paul Chace Wilcoxson, Kent, WA (US); Raviendra Sidath Suriyaarachchi, Kirkland, WA (US); Robert William Whiting, St. Louis, MO (US); Jeremy Evan Justice, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 408 days.

(21) Appl. No.: 17/454,293

(22) Filed: Nov. 10, 2021

(65) Prior Publication Data
US 2022/0153452 A1 May 19, 2022

Related U.S. Application Data

(60) Provisional application No. 63/115,058, filed on Nov. 18, 2020.

(51) Int. Cl.
B29C 70/30 (2006.01)
B29C 70/54 (2006.01)
B64C 1/12 (2006.01)
B64F 5/10 (2017.01)
B64F 5/50 (2017.01)
B64C 1/00 (2006.01)

(52) U.S. Cl.
CPC ............. B64F 5/10 (2017.01); B29C 70/30 (2013.01); B64F 5/50 (2017.01); B64C 2001/0072 (2013.01); B64C 1/12 (2013.01)

(58) Field of Classification Search
CPC ... B64F 5/10; B64F 5/50; B29C 70/30; B29C 70/54; B64C 1/12; B64C 2001/0072
See application file for complete search history.

(56) References Cited

U.S. PATENT DOCUMENTS

| 6,613,258 | B1 | 9/2003 | Maison et al. |
| 9,221,235 | B1* | 12/2015 | Rotter .................. B29C 66/636 |
| 2002/0056788 | A1 | 5/2002 | Anderson et al. |
| 2003/0102596 | A1 | 6/2003 | Miller |

(Continued)

FOREIGN PATENT DOCUMENTS

| EP | 2062814 A1 | 5/2009 |
| EP | 2998228 A1 | 3/2016 |

(Continued)

OTHER PUBLICATIONS

European Examination Report, dated Mar. 30, 2022 regarding Application No. 21207619.4; 5 pages.

(Continued)

Primary Examiner — Robert B Davis
(74) Attorney, Agent, or Firm — Yee & Associates, P.C.

(57) ABSTRACT

Systems and methods are provided for fabricating a part on a mandrel. The system includes a series of stations divided into at least two groups of stations, wherein each group of stations performs fabrication operations on a particular zone of the mandrel.

28 Claims, 21 Drawing Sheets

(56) References Cited

U.S. PATENT DOCUMENTS

| | | | |
|---|---|---|---|
| 2006/0108058 A1 | 5/2006 | Chapman et al. | |
| 2007/0175031 A1 | 8/2007 | Pham et al. | |
| 2009/0145545 A1* | 6/2009 | Brennan | B29C 70/38 |
| | | | 156/60 |
| 2011/0047791 A1* | 3/2011 | Ferenczi | B23P 21/004 |
| | | | 29/791 |
| 2013/0097849 A1* | 4/2013 | Bergmann | B23P 23/00 |
| | | | 29/527.1 |
| 2020/0331634 A1* | 10/2020 | Knutson | B29C 70/446 |
| 2020/0384701 A1* | 12/2020 | Ahn | B29C 66/82661 |

FOREIGN PATENT DOCUMENTS

| | | |
|---|---|---|
| WO | 2006001860 A2 | 1/2006 |
| WO | 2013153537 A2 | 10/2013 |

OTHER PUBLICATIONS

European Examination Report, dated Apr. 4, 2022 regarding Application No. 21207624.4; 7 pages.

European Examination Report, dated Mar. 29, 2022 regarding Application No. 21207549.3 7 pages.

Netherlands Patent Office Written Opinion and Search Report with English Translation, dated Jul. 2, 2021, regarding Application No. NL2027415; 12 pages.

Netherlands Patent Office Written Opinion and Search Report with English Translation, dated Jul. 8, 2021, regarding Application No. NL2027417; 9 pages.

Netherlands Patent Office Written Opinion and Search Report with English Translation, dated Jul. 2, 2021, regarding Application No. NL2027419; 10 pages.

Netherlands Patent Office Written Opinion and Search Report with English Translation, dated Jul. 2, 2021 regarding Application No. NL2027420; 10 pages.

"Glossary of Terms", Composites, ASM International, vol. 21, Dec. 2001, 13 pages.

European Examination Report, dated Mar. 30, 2022, regarding Application No. 21207615.2, 7 pages.

EP Communication pursuant to Article 94(3) EPC dated May 11, 2023, regarding Application No. 21207624.4, 4 pages.

EP Communication pursuant to Article 94(3) EPC dated May 3, 2023, regarding Application No. 212076152, 4 pages.

EP Communication pursuant to Article 94(3) EPC dated May 4, 2023, regarding Application No. 21207549.3, 4 pages.

* cited by examiner

FABRICATION LINE, SYSTEMS, AND METHODS FOR FUSELAGE SECTIONS

CROSS-REFERENCE TO RELATED APPLICATION

This application claims the benefit of U.S. Provisional Patent Application Ser. No. 63/115,058, filed Nov. 18, 2020, and entitled "Fabrication Line, Systems, and Methods for Fuselage Sections" which is incorporated herein by reference in its entirety.

FIELD

The disclosure relates to the field of aircraft, and in particular, to fabrication of composite parts, such as fuselage section, for aircraft.

BACKGROUND

Large composite parts, such as those spanning tens of feet, occupy substantial space within a factory floor. Laminates for these parts are laid up on a layup mandrel in a stationary work cell, where an Automated Fiber Placement (AFP) machine, having a massive end effector for a large robot arm, proceeds to add fiber-reinforced material on a tow-by-tow basis. The lone AFP machine traverses the entire part singularly according to an optimized layup pattern.

Present techniques for fabricating large composite parts therefore can require a substantial amount of time in order for the layup mandrel to be indexed and then for a laminate to be laid-up. Therefore, it would be desirable to have a method and system that take into account at least some of the issues discussed above, as well as other possible issues.

SUMMARY

In one aspect the disclosure includes a method for fabricating a composite part using stations including at least a component station, a preform station, and a skin station, preferably wherein the composite part is a section of a fuselage. The method includes receiving a mandrel at the stations, placing components on the mandrel at the component station, moving the mandrel to a preform station, placing preforms on the mandrel at the preform station, moving the mandrel to a skin station, and placing one or more skin layers on the mandrel at the skin station so the one or more skin layers cover at least the components. In some examples, the components include at least one of isolation plies and frame filler preforms, the preforms are configured to become support structures of the fuselage, such as stringers, and/or the mandrel has an arcuate cross-sectional shape.

In another aspect, the disclosure include a system for fabricating a section of a fuselage from objects. The system includes a component station that places components on a mandrel, and a skin station separated from the component station in a process direction. The skin station places one or more skin layers on the mandrel. In some examples, the components include frame filler preforms formed of an unhardened fiber-reinforced material.

In still another aspect, the disclosures includes a method for fabricating a section of a fuselage. The method includes moving a mandrel to a first subsystem assigned to a first zone of the mandrel, placing components, preforms, and one or more skin layers on the first zone of the mandrel at the first subsystem, moving the mandrel to a second subsystem assigned to a second zone of the mandrel, and placing the components, the preforms, and the one or more skin layers on the second zone of the mandrel at the second subsystem. In some examples, the first zone includes a crown portion of the mandrel and/or the second zone includes a lateral portion of the mandrel.

In yet another aspect, the disclosure includes a method for fabricating a section of a fuselage using a series of mandrels including at least a first mandrel and a second mandrel. The method includes moving the first mandrel in a process direction by one or more pulses to a first station of a group of stations, indexing a portion of the first mandrel to the first station, placing objects including at least one of components, preforms, or one or more skin layers on the mandrel within the first station, and moving the first mandrel by one or more pulses to a second station of the group of stations while the second mandrel is moved by one or more pulses to the first station.

In an aspect of the disclosure a system for fabricating a composite part for a section of a fuselage using a full-barrel mandrel is provided. The system includes a spindle that rotates the full-barrel mandrel about a longitudinal axis of the spindle through a plurality of angular positions, a component station that places components on the full-barrel mandrel at a first angular position of the plurality of angular positions, a preform station that places preforms on the full-barrel mandrel at a second angular position of the plurality of angular positions, and a skin station having end effectors that place one or more skin layers on the full-barrel mandrel at a third angular position of the plurality of angular positions.

In another aspect, the disclosure includes a fabrication line. The fabrication line includes a full-barrel mandrel having a layup surface and multiple troughs that are separated chordwise from each other along the full-barrel mandrel. Each trough has dimensions that correspond with dimensions of a stringer preform. The fabrication line further includes a component station that places components on the full-barrel mandrel at a first angular position of the plurality of angular positions; a preform station that places preforms on the full-barrel mandrel at a second angular position of the plurality of angular positions, and a skin station configured to place one or more skin layers on the full-barrel mandrel at a third angular position of the plurality of angular positions.

In still another aspect, the disclosure includes a method for fabricating a composite part. The method includes rotating a full-barrel mandrel about a longitudinal axis of a spindle through a plurality of angular positions including at least a first angular position, a second angular position, and a third angular position, placing components on the full-barrel mandrel at the first angular position of the spindle, placing preforms on the full-barrel mandrel at the second angular position of the spindle, and placing one or more skin layers to the full-barrel mandrel at the third angular position of the spindle.

An aspect of the disclosure includes a fabrication system for fabricating a part on a mandrel. The fabrication system includes a series of stations divided into at least two groups of stations, wherein each group of stations performs fabrication operations on a particular zone of the mandrel.

Another aspect of the disclosure includes a system for fabricating a composite part on a mandrel. The fabrication system includes one or more Zone 1 component stations configured to place components on a first zone of the mandrel, one or more Zone 1 preform stations configured to place preforms on the first zone of the mandrel, one or more Zone 1 skin stations configured to place one or more skin layers on the first zone of the mandrel, one or more Zone 2 component stations configured to place the components on a second zone of the mandrel, one or more Zone 2 preform stations configured to place the preforms on the second zone of the mandrel, and one or more Zone 2 skin stations configured to place the one or more skin layers on the second zone of the mandrel.

Still another aspect of the disclosure includes a fabrication line for fabricating a composite part. The fabrication line includes a mandrel including at least a first zone and a second zone, a first subsystem comprising a first group of stations configured to perform fabrication operations at the first zone of the mandrel, and a second subsystem a second group of stations configured to perform fabrication operations at the second zone of the mandrel.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg". Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape. The various sections of fuselage described herein may be fabricated as composite parts.

Embodiments described herein can fabricate composite parts, such as arcuate sections of fuselage or full-barrel sections of fuselage, by subdividing the mandrel upon which the composite part will be fabricated into zones, and assigning the work for each mandrel zone to different stations in a fabrication system. By subdividing the operations in this manner, overall fabrication speed is rapidly increased without the need for specialized machinery.

Example Lines and Systems

Figure 1:
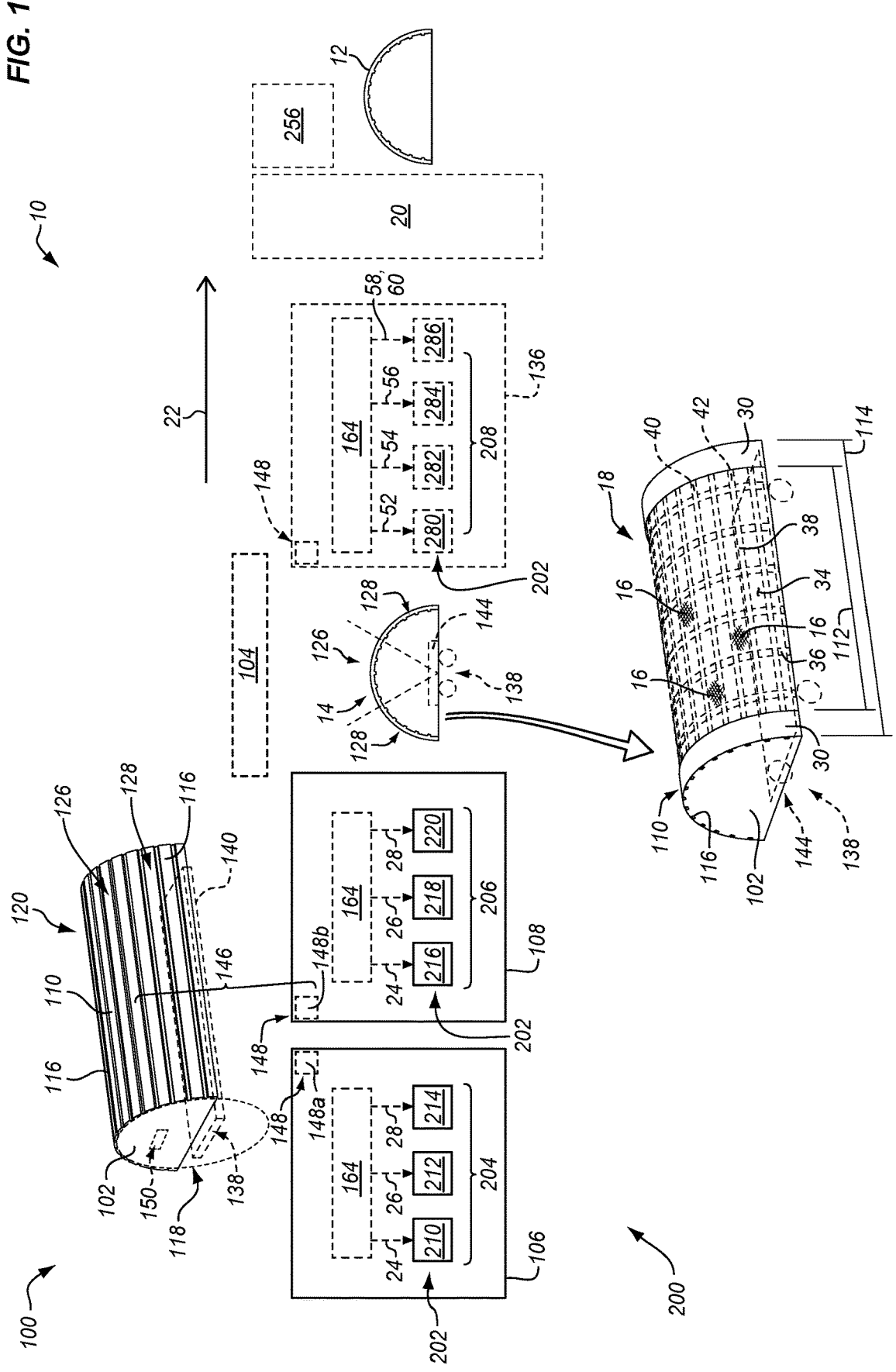
FIG. 1 illustrates a manufacturing line including a fabrication line for fabricating a composite part.

FIG. 1 illustrates a manufacturing line 10 for fabricating a composite part 12. The manufacturing line 10 includes a fabrication line 100. The fabrication line 100 is configured to fabricate a layup 14 of unhardened fiber-reinforced material 16. The layup 14 is also referred to as a part layup because the layup 14 becomes the composite part 12. For example, the fabrication line 100 is configured to place objects 18 on a mandrel 102 to fabricate the layup 14. The manufacturing line 10 further includes a hardening system 20.

Figure 2:
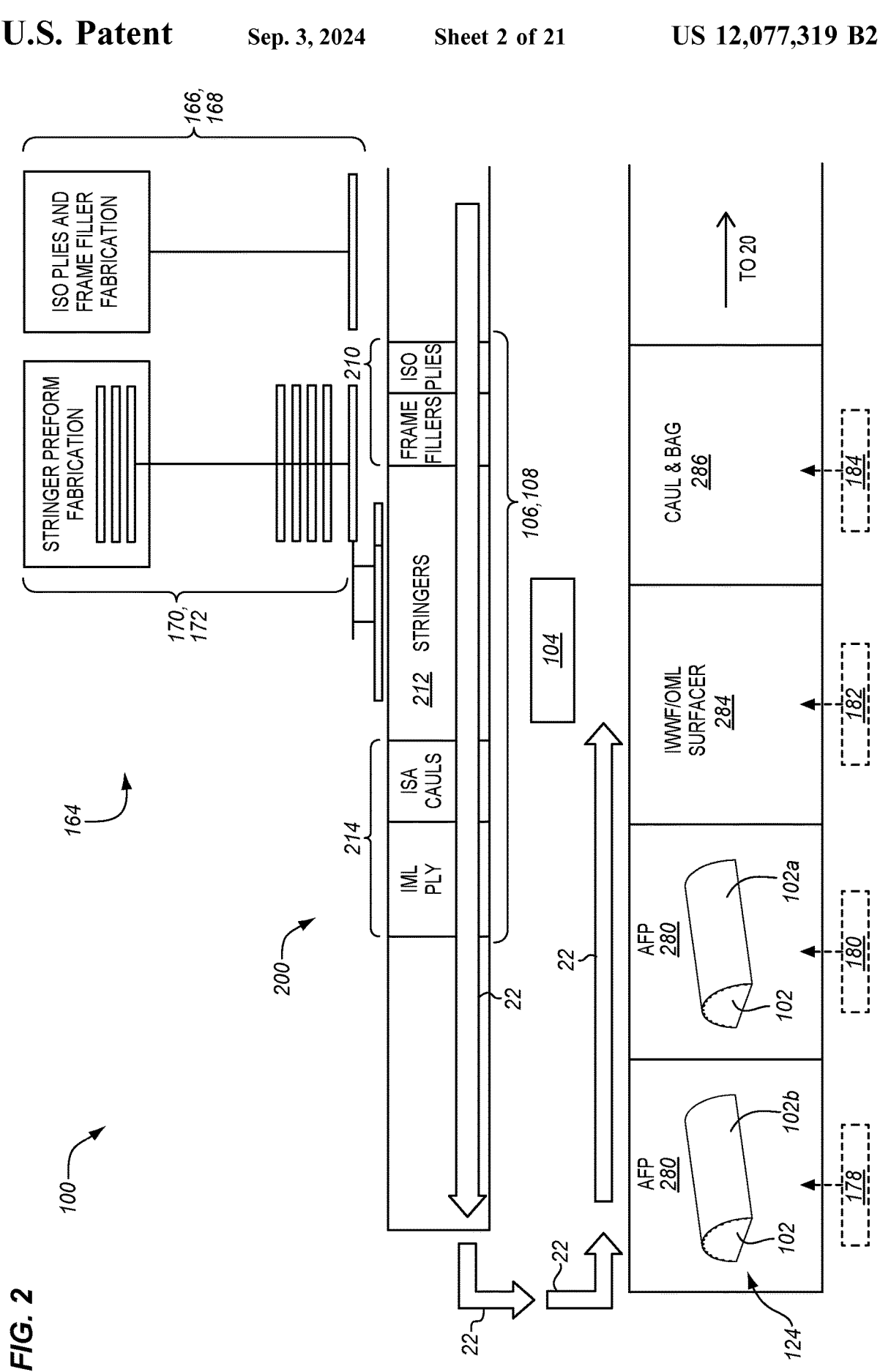
FIG. 2 is a schematic view of a fabrication line that can be used with the manufacturing line shown in FIG. 1.
Figure 9:
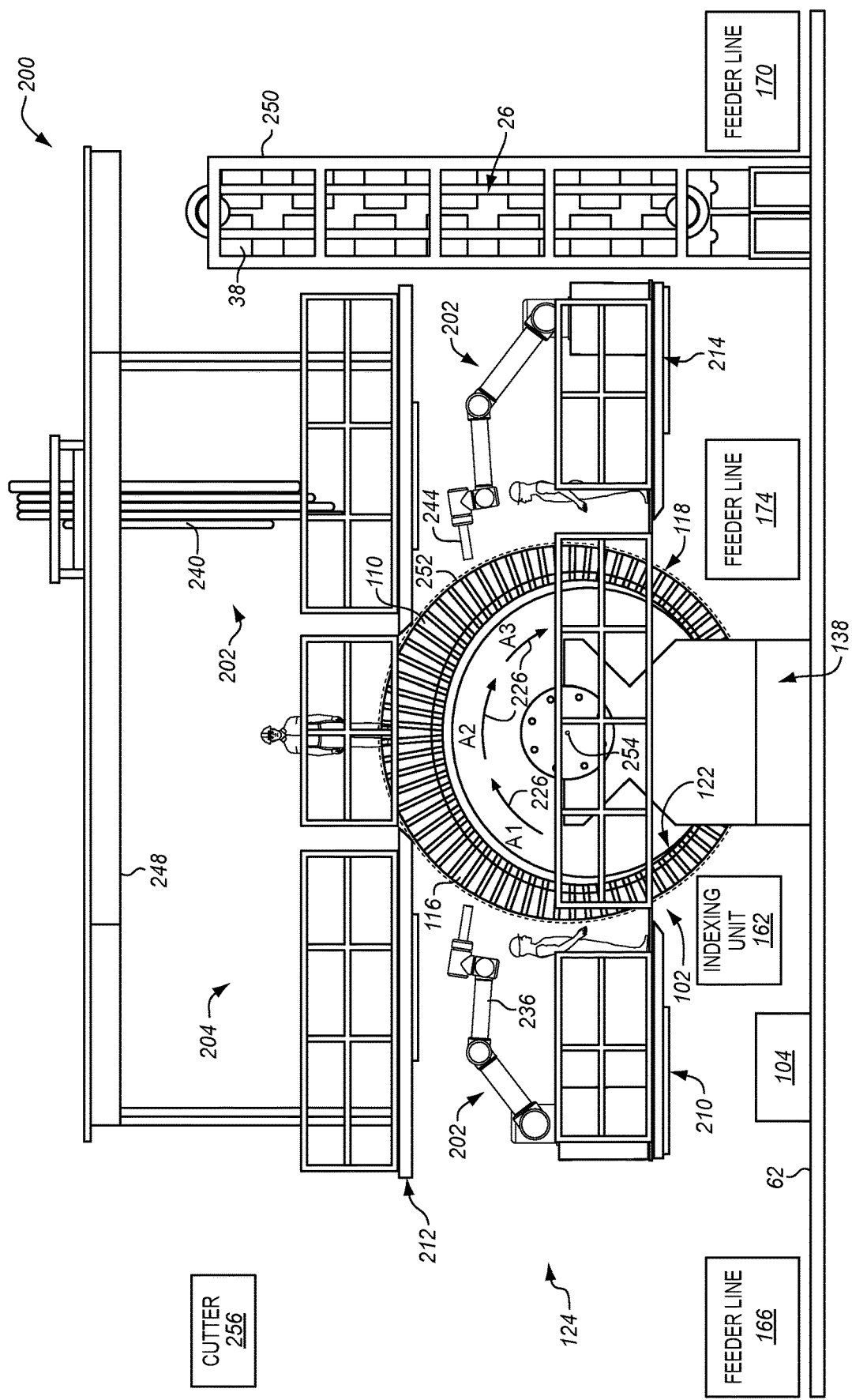
FIG. 9 is a front view of a rotary arrangement of the fabrication system shown in FIGS. 1, 2, and 6.

The hardening system 20 is positioned after the fabrication line 100 in a process direction 22. The hardening system 20 is configured to harden the part layup 14 into the composite part 12. As used herein "hardening" includes curing for thermoset materials or consolidating for thermoplastic materials. The hardening system 20 is configured to harden an unhardened material, such as the unhardened fiber-reinforced material 16, into a hardened material. The hardening system 20 can cure a thermoset material and/or consolidate a thermoplastic material. For example, the hardening system 20 includes an autoclave. FIG. 2 is a schematic view of a fabrication line 100 that can be used with the manufacturing line 10 shown in FIG. 1. Referring to FIGS. 1 and 2, the fabrication line 100 includes a fabrication system 200 and the mandrel 102. The fabrication line 100 can be a single linear line, a pair of linear lines with a gap as shown in FIG. 2, or a combination of linear and rotary lines (e.g., a linear path to the rotary arrangement as shown in FIG. 9 and then a rotary path in the fabrication system 200, followed by a linear path out of the fabrication system 200 or to another subsystem of the fabrication system 200).

The fabrication line 100 and/or the fabrication system 200 includes a controller 104. The controller 104 is operable to perform the methods described herein. The controller 104 is in communication with stations 202, such as end effectors of the stations 202, to perform fabrication operations, such as placement operations. For example, the controller 104 is operatively coupled to the end effectors and/or sensors at each station 202 to place the objects 18 on the mandrel 102.

Each station 202 can includes its own controller 104 or have a common controller 104 that controls multiple stations 202 in the fabrication system 100 and/or in a subsystem 106, 108. In one example, the stations 202 have a common controller 104 when the stations 202 are in the same subsystem 106 or 108; however, one or more stations 202 in different subsystems 106, 108 can be operated by the same controller 104. When each station 202 includes a respective controller 104, the controllers 104 are configured to communicate with each other to coordinate operations of the stations 202.

Figure 3:
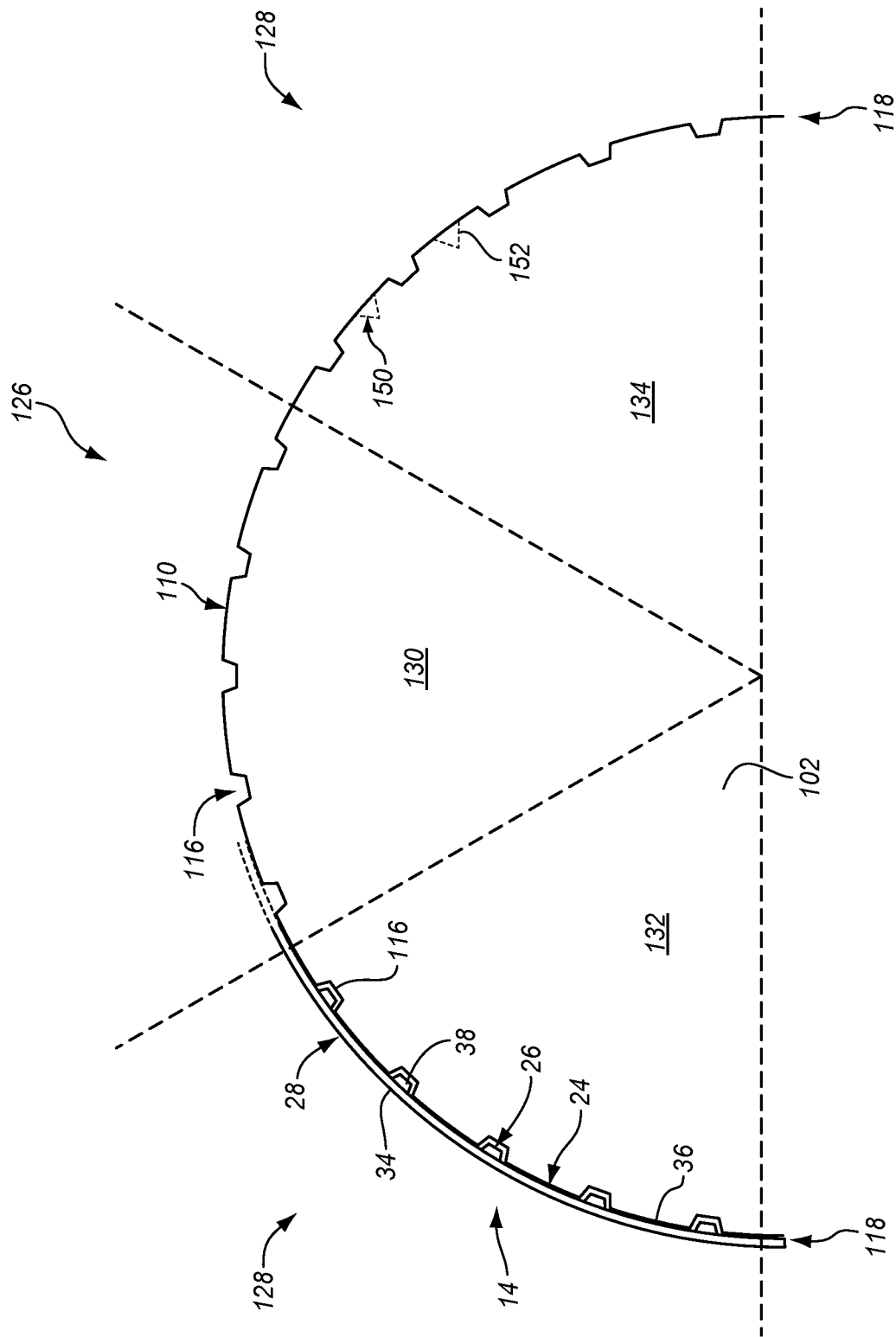
FIG. 3 is a cross-sectional view of a mandrel that can be used with the manufacturing line shown in FIGS. 1 and 2.
Figure 4:
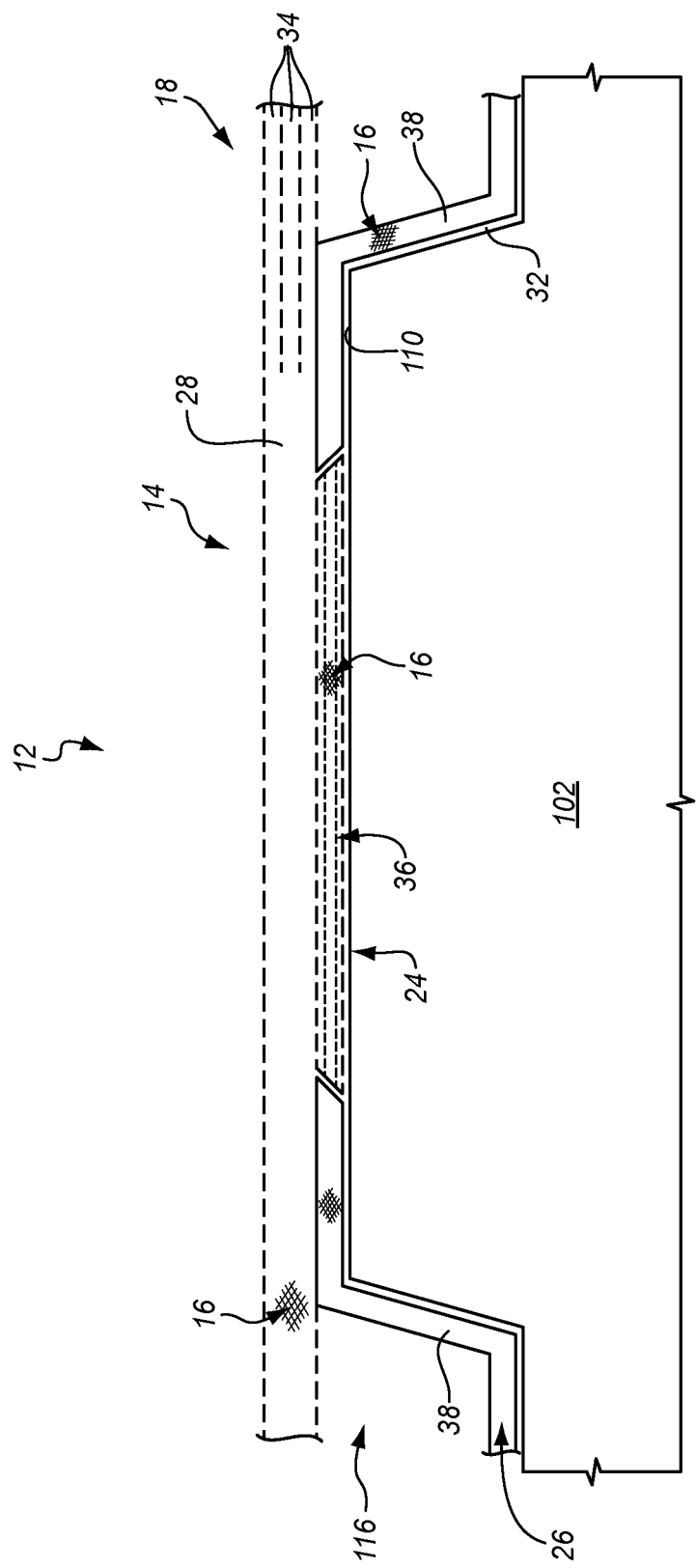
FIG. 4 is a cross-sectional view of a layup on the mandrel shown in FIG. 3.

FIG. 3 is a cross-sectional view of a mandrel 102 that can be used with the fabrication line 100 shown in FIGS. 1 and 2. FIG. 4 is a cross-sectional view of a layup 14 on the mandrel 102. Referring to FIGS. 1 to 4, the fabrication line 100 is configured to place objects 18 on the mandrel 102 to fabricate the composite part 12.

The objects 18 include components 24, preforms 26, and one or more skin layers 28. The objects 18 can further include intersurface anomaly (ISA) caul(s) 30, additional skin 52 (shown in FIG. 15), an electrical protection layer 54 (shown in FIG. 15), surface skin plies 56 (shown in FIG. 15), caul 58 (shown in FIG. 15), and/or a bag 60 (shown in FIG. 15). Any "preform" described herein an object formed from one or more plies of unhardened fiber-reinforced material 16 and, usually, from a plurality of layers of the unhardened fiber-reinforced material 16 that are built up from one or more plies of the unhardened fiber-reinforced material 16. In one example, the objects 18 are selected from the group consisting of: isolation plies 32, skin panel plies 34, and frame filler preforms 36. In another example, the objects 18 are selected from the group consisting of: isolation plies 32, frame filler preforms 36, and stringer preforms 38.

The components 24 include at least frame filler preforms 36 (also known as "postage stamps"). The components 42 can further include one or more isolation plies 32. The isolation plies 32 prevent the preforms 36, 26 and the one or more skin layers 28 from contacting a layup surface 110 of the mandrel 102. The isolation plies 32 can be formed form the unhardened fiber-reinforced material 16, another fiber-reinforced material (e.g., fiberglass), or can be a release film. The release films can include bagging materials, peel plies, separation films, etc.

Figure 12:
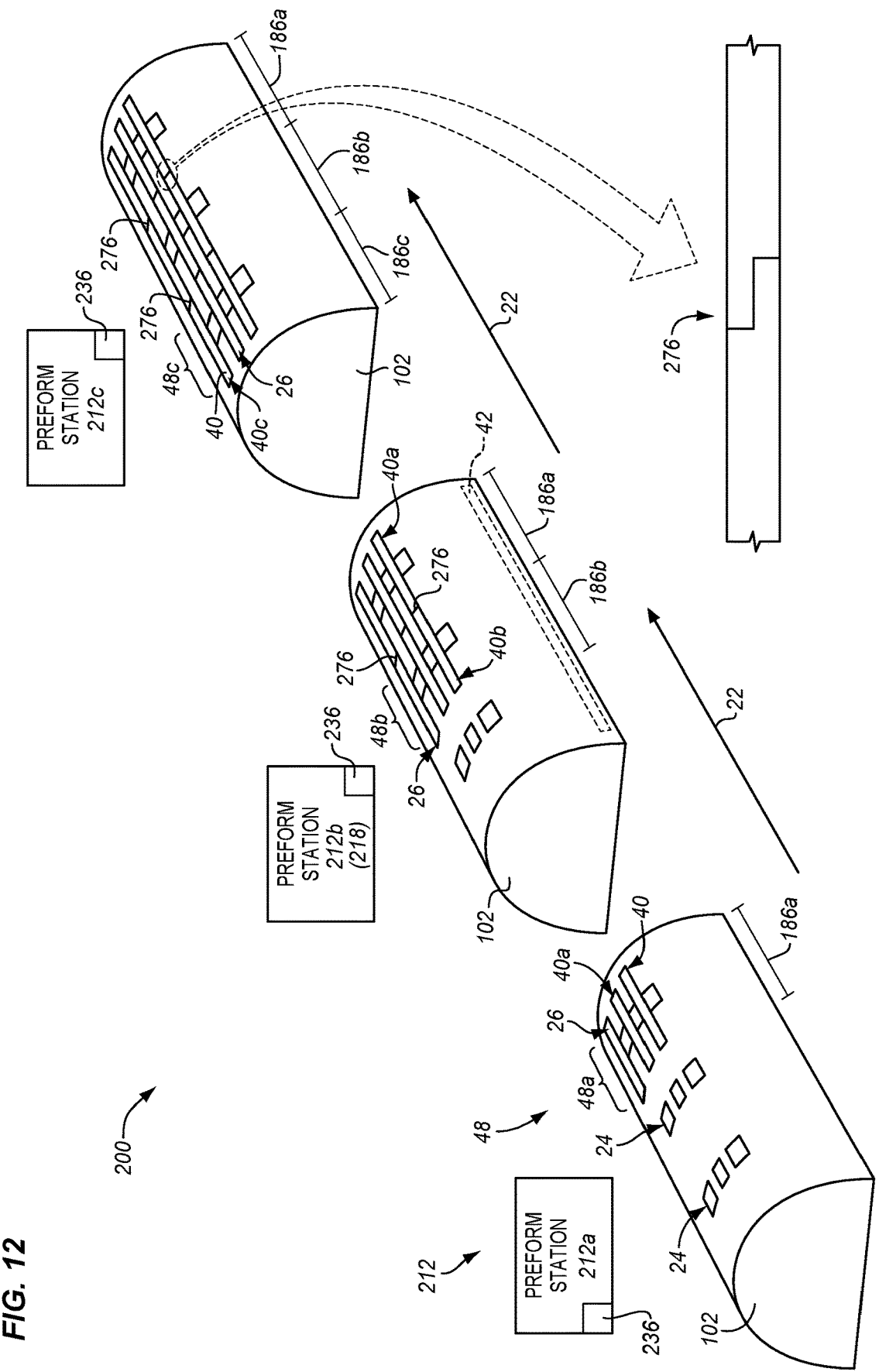
FIG. 12 is a perspective view of a plurality stations that can be used with the fabrication system shown in FIGS. 1, 2, and 6 to 8 to create longitudinal splices.

The preforms 26 include stringer preforms 38. The stringer preforms 38 become support structure of a fuselage 666 (shown in FIGS. 22 and 23). The stringer preforms 38 can be short stringer preforms 40 (as shown in FIG. 12) ad/or long stringer preforms 42 (shown in FIG. 1), where a long stringer preform extends a length 112 of layup surface 110 of the mandrel 102 and a short stringer preform extends less than the length 112 of the layup surface 110, such as a half or a third of the length 112 of the layup surface 110. The length 112 of the layup surface 110 can be less than a length 114 of the mandrel 102 to accommodate for Intersurface Anomaly ISA cauls 30 and/or other tooling attached to the mandrel 102. The length 114 of the mandrel 102 can be equal to or longer than a fuselage half-barrel section 670, or full-barrel section 676 (shown in FIG. 23). And the length 112 of the layup surface 110 can be about the same length as the fuselage half-barrel section 670, or full-barrel section 676 or can be shorter than the fuselage half-barrel section 670, or full-barrel section 676 when two or more composite parts 12 are assembled together to form the fuselage half-barrel section 670, or full-barrel section 676.

The one or more skin layers 28 is formed from one or more skin panel plies 34 of the unhardened fiber-reinforced material 16. The one or more skin layers 28 define an inner mold line (IML) of the composite part 12.

The mandrel 102 includes the layup surface 110 and multiple troughs 116. The troughs 116 are separated chordwise from each other along a circumference 118 of the mandrel 102. Each trough 116 is configured to receive a perform 26, such as a stringer preform 38, therein. In one example, each trough 116 has dimensions that correspond with dimensions of a stringer preform 38. For example, each of the troughs 116 is shaped to accommodate a hat stringer preform.

Figure 6:
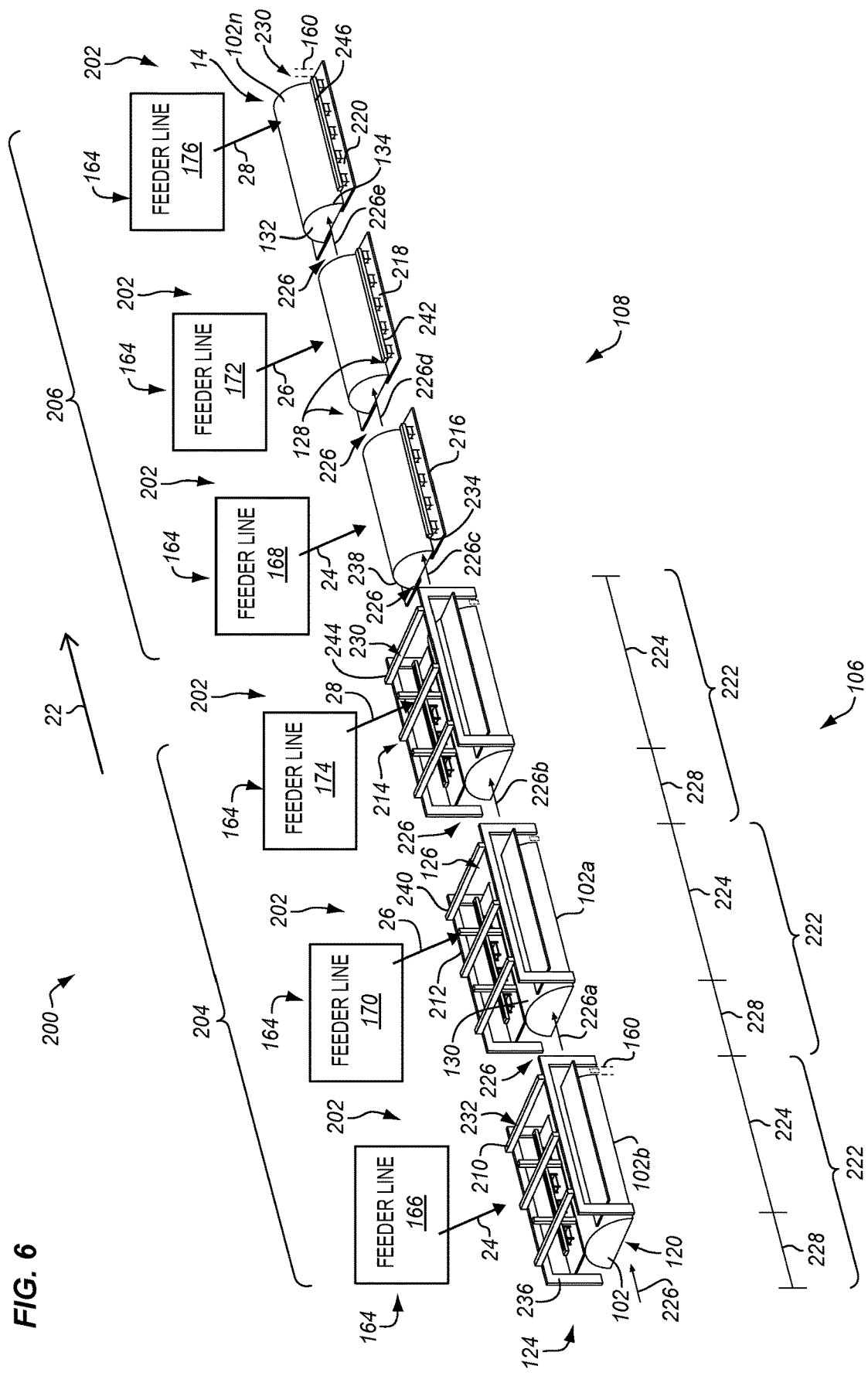
FIG. 6 is a perspective view of a fabrication system that can be used with the manufacturing line and/or fabrication line of FIGS. 1 and 2.
Figure 10:
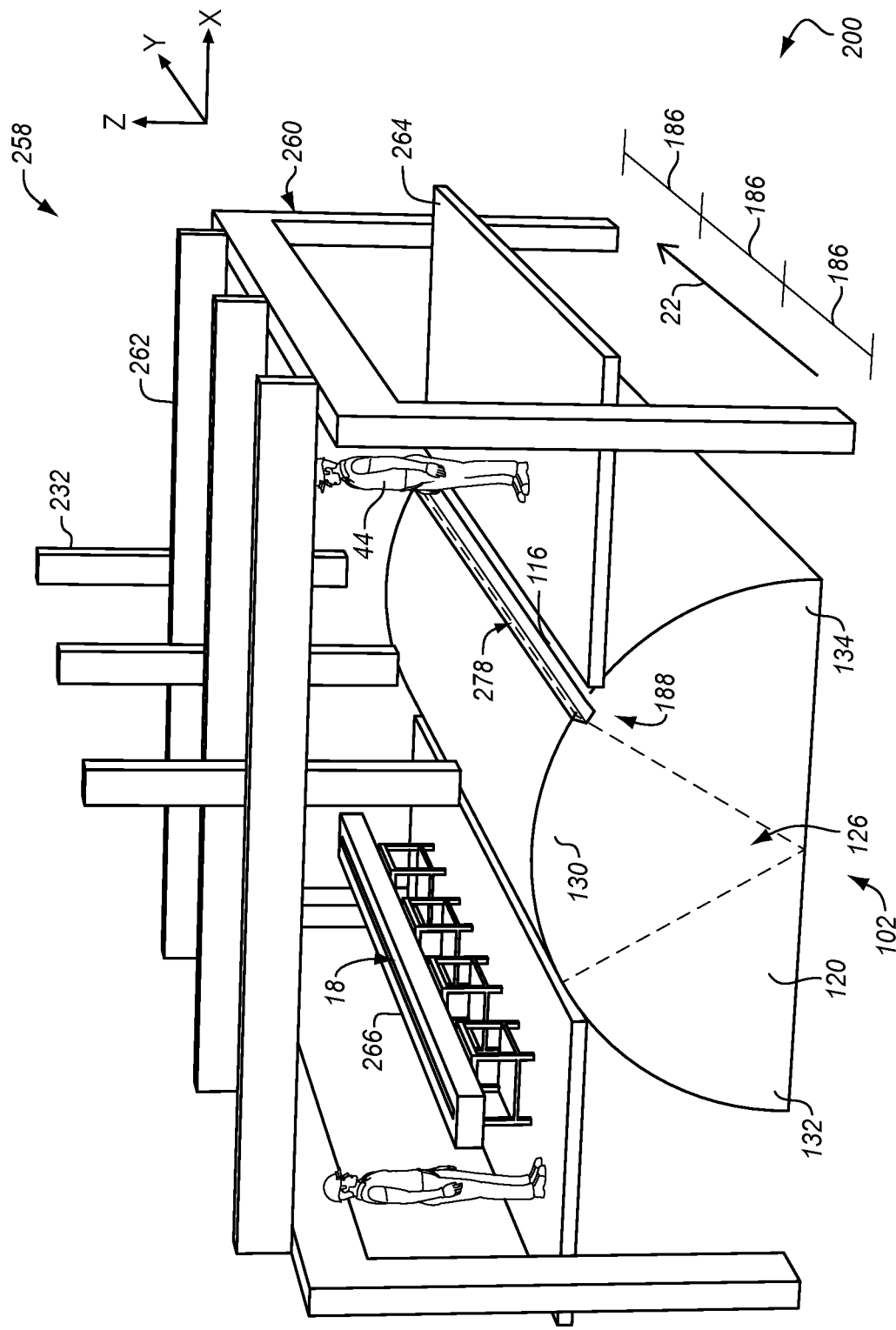
FIG. 10 is a perspective view of a station for a first zone of the mandrel, which can be used with the fabrication system shown in FIGS. 1, 2, and 6 to 8.
Figure 11:
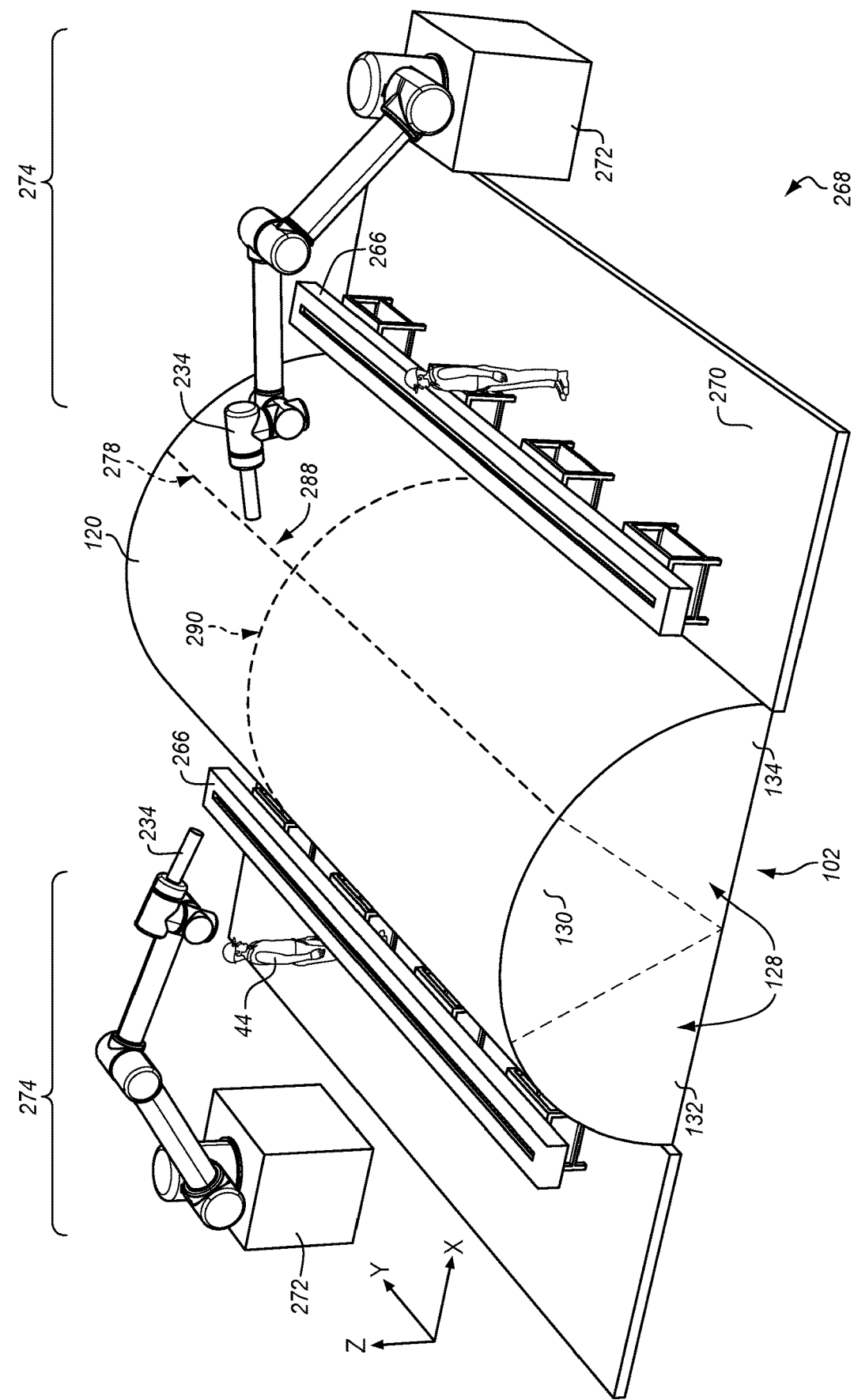
FIG. 11 is a perspective view of a station for a second zone of the mandrel, which can be used with the fabrication system shown in FIGS. 1, 2, and 6 to 8.

The mandrel 102 can be a half-barrel mandrel 120, as shown in FIGS. 6, 10, and 11. The half-barrel mandrel 120 defines a shape for a half-barrel section 670 (shown in FIG. 23) of the fuselage 666. The circumference 118 of the half-barrel mandrel 120 is substantially a half circle about the layup surface 110. Alternatively, the mandrel 102 can be a full-barrel mandrel 122, as shown in FIG. 9. The full-barrel mandrel 122 has the circumference 118 extending in a full circle about the layup surface 110.

Further, the mandrel 102 can be one mandrel in a series 124 of mandrels, as shown in FIGS. 1 and 6. The series 124 of mandrels includes at least a first mandrel 120a and a second mandrel 102b. In one example, the series 124 of mandrels has the same number of mandrels 102 as stations 202 in the fabrication system 200. Alternatively, the series 124 of mandrels has the fewer mandrels 102 than stations 202 in the fabrication system 200.

Referring to FIG. 3, the mandrel 102 includes at least a first zone 126 and a second zone 128. The first zone 126 and second zone 128 can each correspond to crown portion 130, first lateral portion 132, and/or second lateral portion 134 of the mandrel 102. When the mandrel 102 has an arcuate cross-sectional shape, the crown portion 130, first lateral portion 132, and/or second lateral portion 134 can occupy at least a 60° arc of the mandrel 102. Accordingly, for a half-barrel mandrel 120 there can be three portions, and for the full-barrel mandrel 122 there can be six portions. Alternatively, the full-barrel mandrel 122 can include three portions that are each a 120° arc of the mandrel 102.

In an alternative embodiment, the first zone 126 and second zone 128 correspond to two or more longitudinal portions 186 (shown in FIG. 10) of the mandrel 102. Although the examples herein refer mainly to the first zone 126, and second zone 128 corresponding to crown portion 130, first lateral portion 132, and/or second lateral portion 134, the description can be apply to situations where the first zone 126 is a first longitudinal portion 186 and the second zone corresponds to a second longitudinal portion 186. In other examples, such as the example of FIG. 12, the mandrel 102 can be divided into first zone 126, and second zone 128 and longitudinal portions 186.

Each first zone 126 and second zone 128 can correspond to one or more of crown portion 130, first lateral portion 132, and/or second lateral portion 134 of the mandrel 102. For example, when the mandrel 102 is the half-barrel mandrel 120, the first zone 126 includes a crown portion 130 and the second zone 128 includes a first lateral portion 132 and a second lateral portion 134. The lateral portions such as first lateral portion 132, and second lateral portion 134 are circumferentially adjacent to each side of the crown portion 130. When the mandrel 102 is the full-barrel mandrel 122, each of first zone 126 and second zone 128 can correspond to one portion of the mandrel 102.

Referring to FIG. 1, the fabrication system 200 includes at least one group such as first group 204, or second group 206, and/or third group 208 of stations 202. For example, the fabrication system 200 includes the group 204 and/or 206 of stations 202 having a component station 210, a preform station 212, and a skin station 214. Accordingly, the fabrication line 100 includes the component station 210, the preform station 212, and the skin station 214. When the fabrication system 200 includes the first group 204 and the second group 206, the first group 204 includes a first component station 210, a first preform station 212, and a first skin station 214. Similarly, the second group 206 includes a second component station 216, a second preform station 218, and a second skin station 220.

As described more detail with respect to FIG. 9, when the mandrel 102 is the full-barrel mandrel 122, the fabrication line 100 includes the component station 210 that places components 24 on the full-barrel mandrel 122 at a first angular position A1, the preform station 212 that places preforms 26 on the full-barrel mandrel 122 at a second angular position A2, and the skin station 214 configured to place one or more skin layers 28 on the full-barrel mandrel 122 at a third angular position A3. This is referred to as a rotary arrangement, as shown in FIG. 9.

When the mandrel 102 includes at least the first zone 126 and the second zone 128, the fabrication line 100 includes the first subsystem 106 and the second subsystem 108. The first subsystem 106 includes the first group 204 of stations 202 configured to perform fabrication operations at the first zone 126 of the mandrel 102. The second subsystem 108 includes the second group 206 of stations 202 configured to perform fabrication operations at the second zone 128 of the mandrel 102. The fabrication operations are operations performed by the stations 202 to place objects 18 on the mandrel 102.

In the fabrication line 100, the mandrel 102 is configured to move with respect to the first subsystem 106 and the second subsystem 108, and additionally a third subsystem 136 when the third subsystem 136 is present. In other words, the mandrel 102 moves with respect to the stations 202. When the mandrel 102 is the full-barrel mandrel 122, the mandrel 122 moves with respect to the stations 202 by rotating. Further, when the fabrication line 100 includes the series 124 of mandrels 102, the mandrel 102 can one mandrel 102a, 102b, 102n of the series 124 of mandrels moving with respect to the fabrication system 200 in the process direction 22.

To move the mandrel 102, the fabrication line 100 includes a drive system 138. The drive system 138 is configured to move the mandrel 102 with respect to the stations 202. Accordingly, the drive system 138 is configured to move the mandrel 102 with the respect to the first subsystem 106 and the second subsystem 108. The controller 104 is operatively coupled to the drive system 138 to coordinate movements of the mandrel 102 with fabrication operations of the stations 202.

In one example, the drive system 138 includes a track 140 positioned with respect to the stations 202 and, accordingly, the first subsystem 106 and the second subsystem 108. The track 140 can extend to and/or through the third subsystem 136 when present. The mandrel 102 moves along the track 140. The track 140 can include a chain drive 142. The chain drive 142 is coupled with the track 140 or an engine that moves along the track 140. In such embodiments, power may be provided to the mandrel 102 (or the engine that drives mandrel 102) via an electrified or powered rail.

Further, the drive system 138 can additionally or alternatively include an electrified/powered rail. The powered rail can be integrated into the track 140 or can be separate from the track 140. When the powered rail is included in the fabrication line 100, the drive system 138 moves the mandrel 102 along the powered rail to transport the mandrel 102 to and through the stations 202.

In another example, the drive system 138 is on-board and/or attached to the mandrel 102 to move the mandrel 102 with respect the stations 202, and accordingly the first subsystem 106 and the second subsystem 108 and, optionally the third subsystem 136. In a particular example, the drive system 138 includes an Autonomous Guided Vehicle (AGV) 144 attached to the mandrel 102 or integrated into the mandrel 102 and/or a spindle 525 (shown in FIG. 9). When the mandrel 102 is transported by the AGV 144 or other automated device acting as the drive system 138, and the track 140 can be omitted from the drive system 138.

The fabrication line 100 further includes an indexing system 146. The indexing system 146 is configured to align the mandrel 102 with one or more stations 202. Accordingly, the indexing system 146 is also configured to align the mandrel 102 with the first subsystem 106 and the second subsystem 108, and optionally the third subsystem 136. The indexing system 146 includes system indexing elements 148 at one or more stations 202. When the fabrication line 100 includes the first subsystem 106 and the second subsystem 108, the indexing system 146 includes first system indexing elements 148a at the first subsystem 106 and second system indexing elements 148b at the second subsystem 108.

The indexing system 146 further includes mandrel indexing elements 150 at the mandrel 102. The mandrel indexing elements 150 are configured to interact with the system indexing elements 148 to align the mandrel 102 to the fabrication system 200. When the fabrication line 100 includes the first subsystem 106 and the second subsystem 108, the mandrel indexing elements 150 are configured to interact with the first system indexing elements 148a to align the mandrel 102 with the first subsystem 106 and interact with the second system indexing elements 148*b* to align the mandrel 102 with the second subsystem 108.

Figure 5:
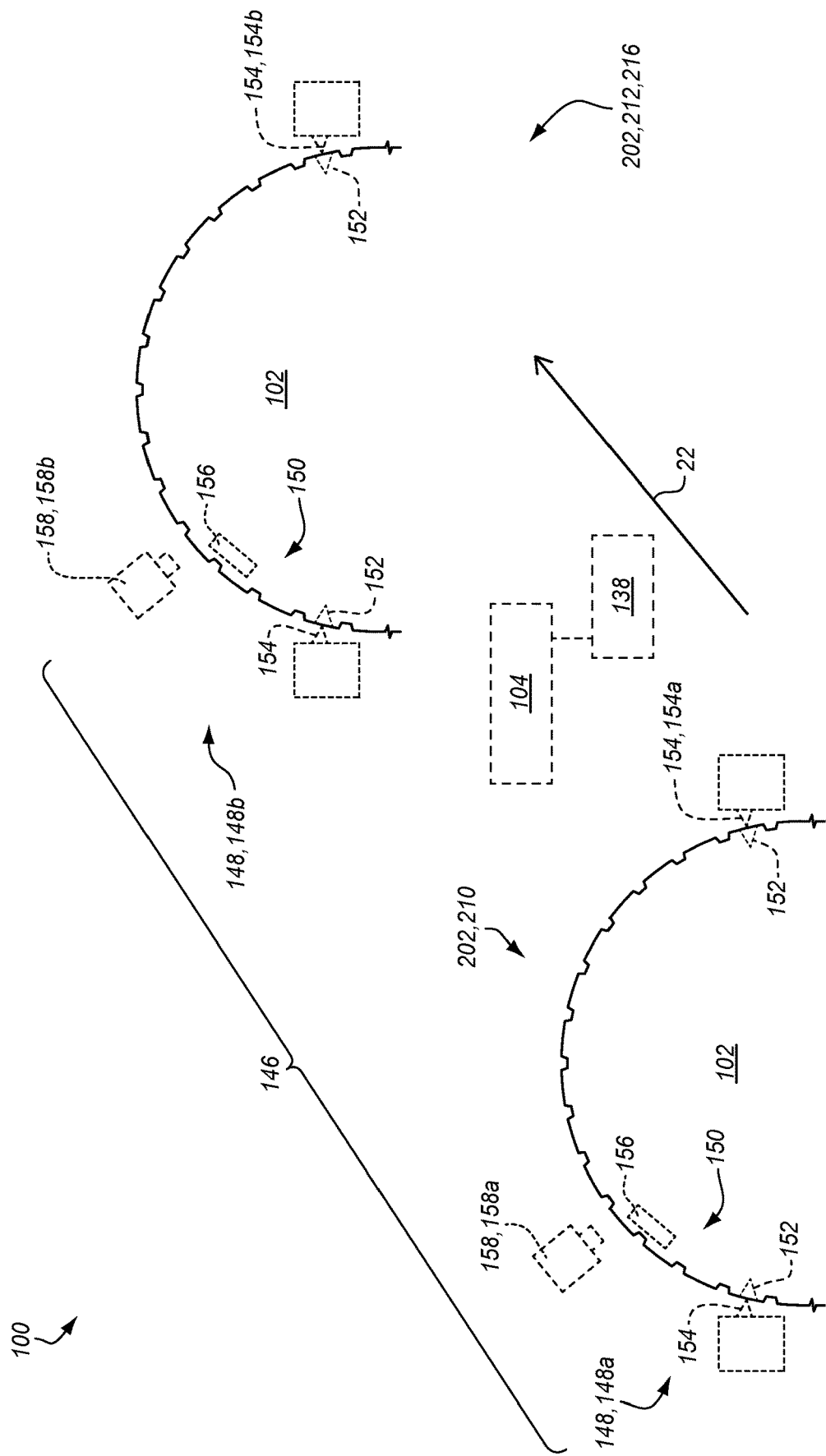
FIG. 5 is a schematic view of an indexing system that can be used with the fabrication line shown in FIGS. 1 and 2.

FIG. 5 is a schematic view of an indexing system 146 that can be used with the fabrication line 100. As shown in FIG. 5, in one example, the indexing system 146 includes indexing cups 152 defined in the mandrel 102 as the mandrel indexing elements 150. The indexing system 146 also includes indexing pins 154 at each station 202 as the system indexing elements 148. Although pins are cups are given as an example, tabs and slots could be used in place of the pins and cups.

Each of the indexing pins 154 is configured to engage a respective indexing cup 152 to align the mandrel 102 with one or more stations 202. The indexing pins 154 are shaped to contact the indexing cups 152 to guide the mandrel 102 with respect to the station(s) 202 to align the mandrel 102 to the station 202, and more particularly, to an end effector of the station 202.

In one example, each indexing pin 154 has a shape that corresponds to the shape of the indexing cups 152. For example, each indexing pin 154 can be configured as a cone when the cups 152 are conically-shaped holes. Accordingly, each indexing pin 154 can be received in a respective indexing cup 152 when the mandrel 102 aligns with a station 202. The indexing pins 154 and the indexing cups 152 are tapered, such as being conically shaped, to allow more tolerance in the misalignment between the mandrel 102 and the station 202 initially and reduce the misalignment as the mandrel 102 and the station 202 move closer together, until the indexing pins 154 are centered in the indexing cups 152 when the mandrel 102 is in position with respect to the station 202. When the mandrel 102 moves away from the station 202, the indexing pins 154 disengage from the indexing cups 152.

When the fabrication line 100 includes the first subsystem 106 and the second subsystem 108, the indexing system 146 includes first indexing pins 154*a* at each station 202 of the first group 204 of stations of the first subsystem 106 and second indexing pins 154*b* at each station 202 of the second group 206 of stations of the second subsystem 108. In one example, each of the first indexing pins 154*a* is configured to engage a respective indexing cup 152 to align the mandrel 102 with each station 202 of the first subsystem 106, and each of the second indexing pins 154*b* is configured to engage a respective indexing cup 152 to align the mandrel 102 with each station 202 of the second subsystem 108.

Alternatively or additionally, the indexing system 146 includes an identification tag 156 on the mandrel 102 and an identification reader 158 at one or more stations 202. The identification tag 156 includes information about the mandrel 102 and the composite part 12 encoded therein. In some examples, the identification tag 156 is a radio frequency (RF) identification tag or a barcode tag. The identification reader 158 is configured to obtain the information from the identification tag 156 to determine an alignment between the mandrel 102 and each station 202 and transfer the information to the drive system 138. The drive system 138 then indexes the mandrel 102 to each station 202. When the identification tag 156 is a radio frequency (RF) identification tag or a barcode tag, the first identification reader 158 is an RF reader or a barcode reader. When the indexing system 146 includes the identification reader 158, the controller 104 is in communication with the identification reader 158 to control the drive system 138 and/or the stations 202.

When the fabrication line 100 includes the first subsystem 106 and the second subsystem 108, the indexing system 146 includes a first identification reader 158*a* positioned at one or more of the stations 202 of the first subsystem 106. The first identification reader 158*a* is configured to obtain the information from the identification tag 156 to determine an alignment between the mandrel 102 and each station 202 of the first subsystem 106 and transfer the information to the drive system 138 to index the mandrel 102 to each station 202 of the first subsystem 106. The indexing system 146 further includes a second identification reader 158*b* positioned at one or more of the stations 202 of the second subsystem 108. Similarly, the second identification reader 158*b* is configured to obtain the information from the identification tag 156 to determine an alignment between the mandrel 102 and each station 202 of the second subsystem 108 and transfer the information to the drive system 138 to index the mandrel 102 to each station 202 of the second subsystem 108.

Additionally or alternatively, the indexing system 146 includes a hard stop 160, as shown in FIG. 6. More specifically, a hard stop 160 is positioned at one or more stations 202, such as at each station 202, to align the mandrel 102 to the station(s) 202.

When the mandrel 102 is the full-barrel mandrel 122, the indexing system 146 includes an indexing unit 162, as shown in FIG. 9. The indexing unit 162 is configured to index the full-barrel mandrel 122 to predetermined angular positions with respect to the stations 202 after each rotation by the spindle 252 (shown in FIG. 9) supporting the full-barrel mandrel 122. Additionally or alternatively, the indexing unit 162 is configured to index the full-barrel mandrel 122 to at least one station 202, such as to at least one of the component station 210, the preform station 212, and the skin station 214 after each rotation of the spindle 252.

FIG. 6 is a perspective view of a fabrication system 200 that can be used with the manufacturing line 10 and/or fabrication line 100. Referring to FIGS. 1, 2 and 6, the fabrication system 200 fabricates the composite part 12, such as a half-barrel section 670, or full-barrel section of a fuselage 666 (shown in FIG. 23), from the objects 18. The fabrication system 200 includes a plurality of stations 202, such as a series 124 of stations 202, to place objects 18 on the mandrel 102. A number of stations 202 in the series 124 is based on a predetermined takt time 222 for each station 202. As described in more detail below, the takt time 222 is a pause time 224 between movement pulses 226 plus the movement time 228.

In one example, the fabrication system 200 includes at least a component station 210 and a skin station 214. The skin station 214 is separated from the component station 210 in the process direction 22. The component station 210 places components 24 (shown in FIG. 4) on the mandrel 102, and the skin station 214 places one or more skin layers 28 (shown in FIG. 4) on the mandrel 102. In examples, the components 24 include frame filler preforms 36 formed of the unhardened fiber-reinforced material 16, as shown in FIG. 4. The fabrication system 200 can further include a preform station 212 separated from the component station 210 in the process direction 22. The preform station 212 places preforms 26 (shown in FIG. 4) on the mandrel 102. For example, the preforms 26 are stringer preforms 38 formed of the unhardened fiber-reinforced material 16, as shown in FIG. 4.

When the component station 210 is a first component station 210 assigned to the first zone 126 of the mandrel 102 and the skin station 214 is a first skin station 214 assigned to the first zone 126 of the mandrel 102, the fabrication system 200 further includes a second component station 216 having component end effectors 236, 238 (shown in FIGS. 7, 8, and 11) configured to place the components 24 on the second zone 128 of the mandrel 102 and a second skin station 220 having skin end effectors 244, 246 (shown in FIGS. 7, 8, and 11) configured to place the one or more skin layers 28 on the second zone 128 of the mandrel 102. The fabrication system 200 further includes a second preform station 218 and preform end effectors 240, 242 (shown in FIGS. 7, 8, and 11) configured to place the preforms 26 on the second zone 128 of the mandrel 102. In this example, the first zone 126 is a crown portion 130 of the mandrel 102, and the second zone 128 is one or more lateral portions such as first lateral portion 132, or second lateral portion 134 of the mandrel 102.

When the mandrel 102 includes at least the first zone 126 and the second zone 128, the fabrication system 200 includes the series 124 of stations 202 divided into at least two groups such as first group 204, and second group 206 of stations. Each group such as first group 204, and second group 206 of stations 202 performs fabrication operations on a particular first zone 126, or second zone 128 of the mandrel 102. The at least two groups of stations includes the first group 204 of stations 202 and the second group 206 of stations 202. The first group 204 is assigned to the first zone 126 of the mandrel 102, and the second group 206 is assigned to the second zone 128 of the mandrel 102.

In another example, the fabrication system 200 includes the series 124 of stations 202 where the series 124 includes one or more Zone 1 component stations 210 configured to place components 24 on the first zone 126, one or more Zone 1 preform stations 212 configured to place preforms 26 on the first zone 126, one or more Zone 1 skin stations 214 configured to place one or more skin layers 28 on the first zone 126, one or more Zone 2 component stations 216 configured to place the components 24 on the second zone 128 of the mandrel 102, one or more Zone 2 preform stations 218 configured to place the preforms 26 on the second zone 128, and one or more Zone 2 skin stations 220 configured to place the one or more skin layers 28 on the second zone 128. In such an example, the first group 204 can include the Zone 1 component station 210, the Zone 1 preform station 212, and the Zone 1 skin station 214. Similarly, the second group 206 can include the Zone 2 component station 216, the Zone 2 preform station 218, and the Zone 2 skin station 220.

Another way to describe the fabrication system 200 is a fabrication system 200 having a first subsystem 106 with the first group 204 of stations 202 configured to perform fabrication operations at the first zone 126 of the mandrel 102 and a second subsystem 108 having the second group 206 of stations 202 configured to perform fabrication operations at the second zone 128 of the mandrel 102. The fabrication operations of the first subsystem 106 and the second subsystem 108 fabricate the layup 14 on the mandrel 102. More specifically, the first subsystem 106 and the second subsystem 108 operate together to fabricate the layup 14, which includes at least components 24, preforms 26, and one or more skin plies 28.

The number of stations 202 in each group such as first group 204, and second group 206 or subsystem 106, 108 depends on a takt time 222 of the subsystem 106, 108 and/or a takt time 222 of each station 202. As one example, each group such as first group 204, and second group 206 or subsystem 106, 108 includes three or more stations 202. Each group such as first group 204, and second group 206 or subsystem 106, 108 can have the same or different types of stations 202, For example, the first subsystem 106 and/or the second subsystem 108 includes one or more preform stations 212, 218 configured to place preforms 26 on to the mandrel 102.

In one example, each subsystem 106, 108 is configured to perform different fabrication operations on the mandrel 102. In such an example, the subsystems 106 include a component subsystem for placing the components 24 on the mandrel 102 as the first subsystem 106 and a preform subsystem for placing the preforms 26 on the mandrel 102 as the second subsystem 108. A skin subsystem for placing the one or more skin layers 28 on the mandrel 102 is also included in this this example. When the mandrel 102 includes multiple zones such as first zone 126, and second zone 128, the component subsystem 106 is configured to place components 24 on the multiple zones such as first zone 126 and second zone 128 of the mandrel 102, the preform subsystem 108 is configured to place preforms 26 on the multiple zones such as first zone 126 and second zone 128 of the mandrel 102, and the skin subsystem is configured to place the one or more skin layers 28 on the multiple zones such as first zone 126 and second zone 128 of the mandrel 102.

In another example, each subsystem 106, 108 is configured to perform similar fabrication operations on the mandrel 102. More specifically, each subsystem 106, 108 is configured to place components 24 on the mandrel 102, place preforms 26 on the mandrel 102, and place one or more skin layers 28 on the mandrel 106. At least the components 24, the preforms 26, and one or more of skin layers 28 form the layup 14 on the mandrel 102. Accordingly, each group such as first group 204, and second group 206 or subsystem 106, 108 includes at least a component station 210, 216, a preform station 212, 218, and a skin station 214, 220.

Figure 7:
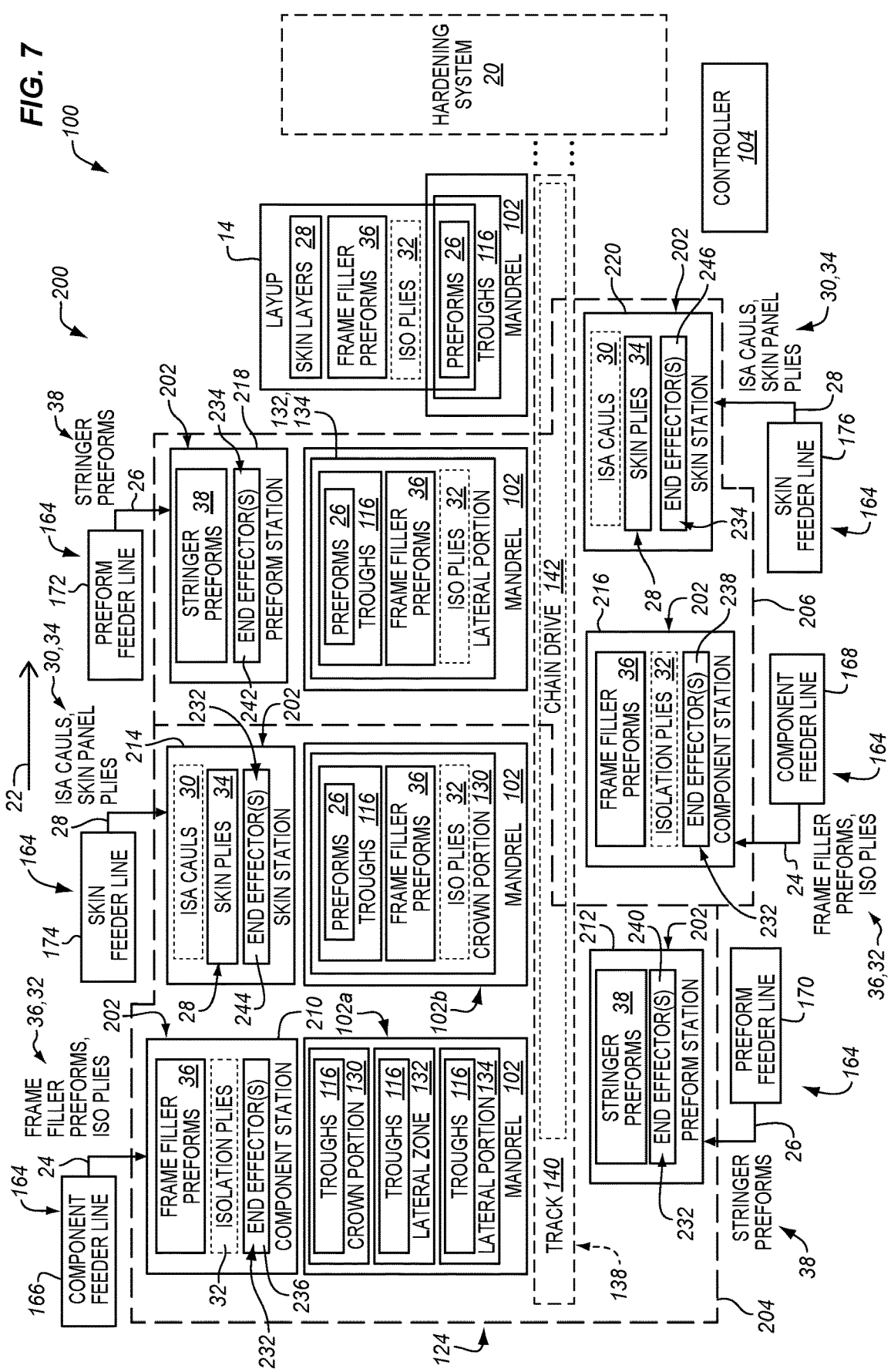
FIG. 7 is a schematic block diagram of a first example arrangement of the fabrication system shown in FIGS. 1, 2, and 6.
Figure 8:
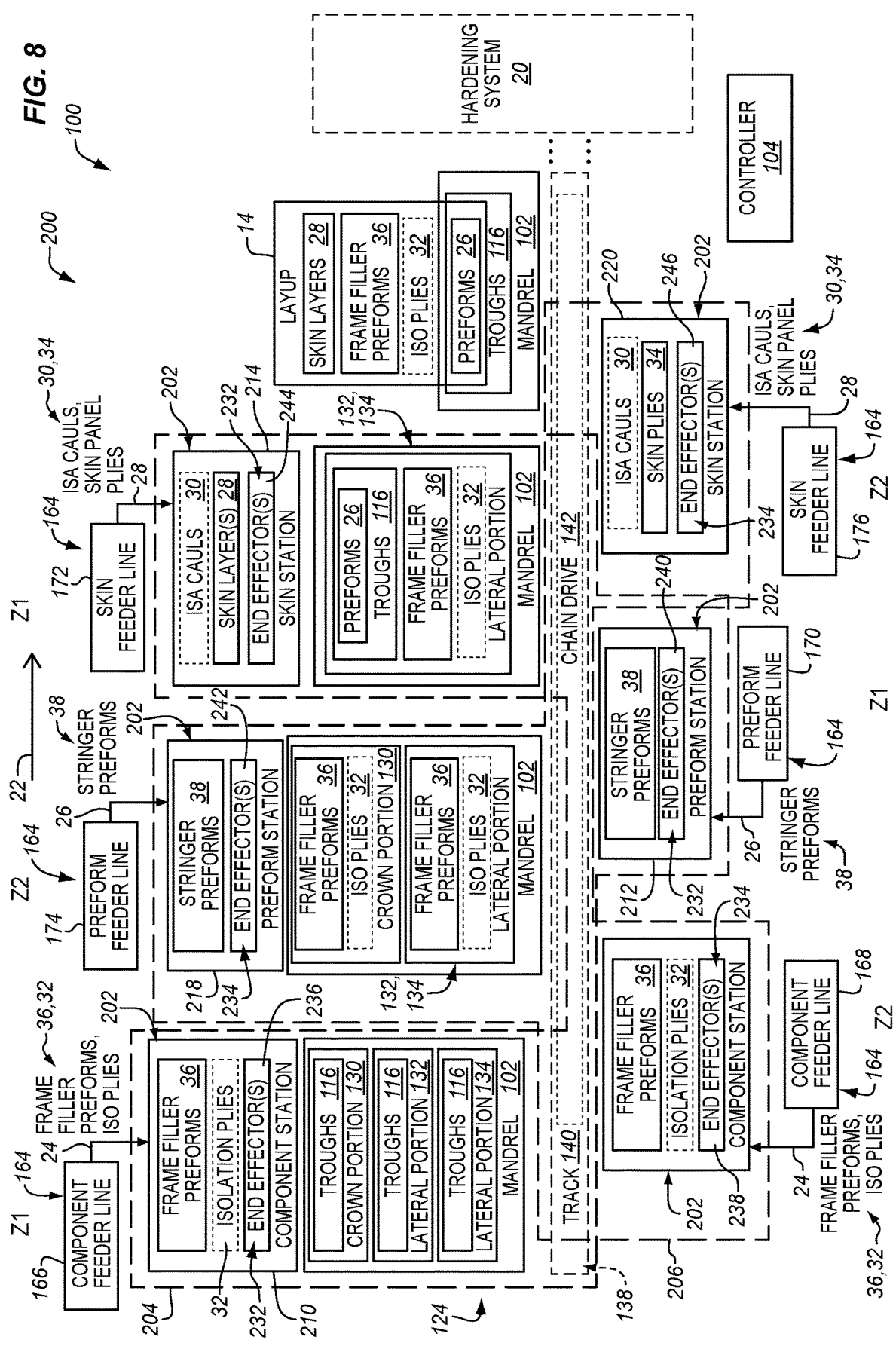
FIG. 8 is a schematic block diagram of a second example arrangement of the fabrication system shown in FIGS. 1, 2, and 6.

When the mandrel 102 is the half-barrel mandrel 120, the first subsystem 106 and the second subsystem 108 are positioned in series along the process direction 22 to fabricate the composite part 12 on the half-barrel mandrel 120, as shown in FIGS. 6 to 8. When the mandrel 102 is the full-barrel mandrel 122, the first subsystem 106 and the second subsystem 108 are aligned to surround the circumference 118 of the full-barrel mandrel 122, as shown in FIG. 9. Alternatively, the first subsystem 106 and the second subsystem 108 are positioned in series along the process direction 22 when the mandrel 102 is the full-barrel mandrel 122, which enables the subsystems 106, 108 to perform fabrication operations on different longitudinal portions of the same or different mandrels 102.

FIG. 7 is a schematic block diagram of a first example arrangement of the fabrication system 200. FIG. 8 is a schematic block diagram of a second example arrangement of the fabrication system 200. Referring to FIGS. 6 to 8, the series 124 of stations 202 includes different types of stations, such as component stations 210, 214, preform stations 212, 218, and skin stations 214, 220. While one of each type of station 202 is shown for each zone such as first zone 126, or second zone 128 of the mandrel 102, the fabrication system 200 can includes a plurality of any of the types of stations, depending on the takt time 222. For example, if placing the preforms 26 takes a longer time than a single takt time 222, the fabrication system 200 or subsystem 106, 108 includes multiple preform stations 212 and/or 218. As an example, when placing preforms takes three times the takt time 222, the fabrication system 200 or subsystem 106, 108 includes three preform stations 212 and/or 218. For clarity, one of a type of station will be described and that description applies to all of that type of station in the fabrication system 200 or subsystem 106, 108.

Each station 202 includes an end effector 230 for performing fabrication operations for a respective station 202. Depending on the zone such as first 126 or second zone 128, the end effector 230 is configured as a first zone, or Zone 1, end effector 232, as described in more detail with respect to FIG. 10, or as a second zone, or Zone 2, end effector 234, as described in more detail with respect to FIG. 11.

The component station 210, 216 is configured to place components 24 on the mandrel 102. In some examples, the component station 210, 216 includes component end effectors 236 or 238 configured to place the components 24, such as frame filler preforms 36, on the mandrel 102. When the component station is a Zone 1 component station 210, the end effector is a Zone 1 component end effector 236 configured to place components 24 in the first zone 126, such as in the crown portion 130. Similarly, when the component station is a Zone 2 component station 216, the end effector is a Zone 2 component end effector 236 configured to place components 24 in the second zone 128, such as in a lateral portion such as first lateral portion 132, or second lateral portion 134.

In one example, the component station 210, 216 is further configured to place one or more isolation plies 32 on the mandrel 102 before placing the components 24 on the mandrel 102. More specifically, the component end effectors 236, 238 are configured to one or more place isolation plies 32 on the mandrel 102 and then place frame filler preforms 36 on the isolation plies 32, when isolation plies 32 are used. Alternatively, the isolation plies 32 are placed at a station preceding the component station 210, 216, depending on the takt time 222 and the time for placing the isolation plies 32 and the frame filler preforms 36.

The preform station 212, 218 includes is configured to place preforms 26 on the mandrel 102. In some examples, the preform station 212, 218 includes preform end effectors 240, 242 configured to place the preforms 26. When the preform station is a Zone 1 preform station 212, the end effector is a Zone 1 preform end effector 240 configured to place preforms 26 in the first zone 126, such as in the crown portion 130. Similarly, when the preform station is a Zone 2 preform station 218, the end effector is a Zone 2 preform end effector 242 configured to place preforms 26 in the second zone 128, such as in a lateral portion such as first lateral portion 132, or second lateral portion 134.

The preform end effectors 240, 242 are configured to place the preforms 26 in the troughs 116 of the mandrel 102. As will be described below, the preform end effectors 240, 242 can also splice preforms 26 longitudinally.

The skin station 214, 220 is configured to place one or more skin layers 28 on the mandrel 102. In some examples, the skin station 214, 220 includes skin end effectors 244, 246 configured to place the one or more skin layers 28 on the mandrel 102. When the skin station is a Zone 1 preform station 214, the end effector is a Zone 1 skin end effector 244 configured to place one or more of skin layers 28 in the first zone 126, such as in the crown portion 130. Similarly, when the skin station is a Zone 2 skin station 220, the end effector is a Zone 2 skin end effector 246 configured to place one or more of skin layers 28 in the second zone 128, such as in a lateral portion such as first lateral portion 132, or second lateral portion 134.

More specifically, the skin end effectors 244, 246 are configured to apply one or more skin panel plies 34 to the mandrel 102 to place by building up the one or more skin layers 28 on the mandrel 102. At least one skin layer of skin layers 28 includes an inner mold line ply. The skin end effectors 244, 246 are also configured to place the one or more skin layers 28 over the components 24 and preforms 26 on the mandrel 102.

The skin station 210, 216 is further configured to place an intersurface anomaly (ISA) caul of ISA cauls 30 on the mandrel 102. More specifically, the skin station 210, 216 is configured to place the one or more skin layers 28 after placing the ISA caul of ISA cauls 30 on the preforms 26. Alternatively, an ISA caul station is positioned between the preform station 212, 218 and skin station 210, 216 depending on whether placing the ISA caul of ISA cauls 30 and the placing the one or more skin layers 28 takes longer than the takt time 222.

As alternative to the end effectors 230, the fabrication operations, such as placement, at any station 202 may be performed manually.

Referring to FIGS. 1, 2, and 6 to 8, the fabrication system 200 can further include one or more feeder lines 164. For example, each subsystem 106, 108 can further include one or more feeder lines 164 associated with one or more stations 202 in the subsystem 106, 108. Accordingly, each subsystem 106, 108 includes a group such as first group 204, or second group 206 of stations 202 and one or more feeder lines 164. Each feeder line 164 operates at a takt time corresponding the takt time 222 of the stations 202. The fabrication system 200 (or subsystem 106, 108) includes different types of feeder lines 164 depending on the type of station 202 receiving material from the associated feeder line 164.

One or more component feeder lines 166, 168 are associated with at least one component station 210, 216, such as the Zone 1 component station(s) 210 and/or the Zone 2 component station(s) 216. When the stations 202 are grouped by zone such as first zone 126, or second zone 128, the component feeder line(s) 166, 168 can include one or more Zone 1 component feeder lines 166 configured to supply the components 24 to the Zone 1 component station(s) 210 and one or more Zone 2 component feeder lines 168 configured to supply the components 24 to the Zone 2 component station(s) 216. The component feeder lines 166, 168 include systems and apparatus to supply and/or fabricate isolation plies 32 and/or frame filler preforms 36.

One or more preform feeder lines 170, 172 are associated with at least one preform station 212, 218, such as the Zone 1 preform station(s) 212 and the Zone 2 preform station(s) 218. When the stations 202 are grouped by zone such as first zone 126, or second zone 128, the preform feeder line(s) include one or more Zone 1 preform feeder lines 170 configured to supply the preforms 26 to the Zone 1 preform station(s) 212 and one or more Zone 2 preform feeder lines 172 configured to supply the preforms 26 to the Zone 2 preform station(s) 218. The feeder lines 170, 172 can include systems and apparatus to fabricate stringer preforms 38. Alternatively, the feeder lines 170, 172 transport stringer preforms 38 from a stringer fabrication system to the preform station(s) 212, 218.

One or more skin feeder lines 174, 176 are associated with at least one skin station 214, 220, such as the Zone 1 skin station(s) 214 and the Zone 2 skin station(s) 220. When the stations 202 are grouped by zone such as first zone 126, or second zone 128, the skin feeder line(s) include one or more Zone 1 skin feeder lines 174 configured to supply the one or more skin layers 28 to the Zone 1 skin station(s) 214 and one or more Zone 2 skin feeder lines 176 configured to supply the one or more skin layers 28 to the Zone 2 skin station(s)

220. For example, the skin feeder lines 174, 176 supply skin panel plies 34 and/or fabricate one or more of skin layers 28 from skin panel plies 34 for use by the skin station(s) 214, 220. Further, the skin feeder lines 174, 176 can supply ISA cauls 30 to skin station(s) 214, 220.

Referring to FIG. 7, the stations 202 can be ordered according to which zone such as first zone 126 or second zone 128 of the mandrel 102 the station 202 is assigned to. In this example, stations 202 of the first subsystem 106 are in series before the stations 202 of the second subsystem 108. In such an arrangement, the series 124 of stations includes, in series, the first group 204 then the second group 206. More specifically, the a series 124 of stations includes, in order, the Zone 1 component station(s) 210, the Zone 1 preform station(s) 212 following the Zone 1 component station(s) 210, the Zone 1 skin station(s) 214 following the Zone 1 preform station(s) 212, the Zone 2 component station(s) 216 following the Zone 1 skin station(s) 214, the Zone 2 preform station(s) 218 following the Zone 2 component station(s) 216, and the Zone 2 skin station(s) 220 following the Zone 2 preform station(s) 218.

Referring to FIG. 8, the stations 202 can be ordered according to which type of station. In this example, stations 202 of the first group 204 are interleaved the stations 202 of the second group 206. In such an arrangement, the series 124 of stations includes, in order, the Zone 1 component station(s) 210, the Zone 2 component station(s) 216 following the Zone 1 component station(s) 210, the Zone 1 preform station(s) 212 following the Zone 2 component station(s) 216, the Zone 2 preform station(s) 218 following the Zone 1 preform station(s) 212, the Zone 1 skin station(s) 214 following the Zone 2 preform station(s) 218, and the Zone 2 skin station(s) 220 following the Zone 1 skin station(s) 214.

FIG. 9 is a front view of a rotary arrangement of the fabrication system 200. In the rotary arrangement, the mandrel 102 is the full-barrel mandrel 122 and the series 124 of stations 202 are in series along the circumference 118 of the full-barrel mandrel 122. In one example, multiple skin stations 214 are positioned along the circumference 118 of the full-barrel mandrel 122. When the fabrication system 200 includes more than one subsystem, the first subsystem 106 and the second subsystem 108 are aligned to surround the circumference 118 of the full-barrel mandrel 122.

In the example illustrated, the preform station 212 is elevated over the full-barrel mandrel 122. Accordingly, the fabrication system 200 includes an overhead gantry 248 to support the preform station 212. More specifically, the gantry 248 supports the preform end effector 240 such that preform end effector 240 can move with respect to the full-barrel mandrel 122. The preform feeder line 170 can include a loader 250 that raises the preforms 26 to the preform station 212.

In the rotary arrangement, the fabrication system 200 further includes a spindle 252. The spindle 252 is configured to support the full-barrel mandrel 122 from within the full-barrel mandrel 122. The spindle 252 is configured to rotate the full-barrel mandrel 122 about a longitudinal axis 254 of the spindle 252 through a plurality of angular positions. More specifically, the spindle 252 moves different zones of the mandrel 122 to and through the stations 202 by rotating. The spindle 252 is configured to rotate to each angular position and then pause movement at the angular position before rotating to the next angular position. A rotation and then a pause is considered a movement pulse 226 of the spindle 252. The component station 210, the preform station 212, and the skin station 214 are configured operate during a same pause of the spindle 252.

The spindle 252 that rotates the full-barrel mandrel 122 with respect to the component station 210, the preform station 212, and the skin station 214. As described above, the component station 210 places components 24 at the first angular position A1, the preforms station 212 places preforms 26 at the second angular position A2, and the skin station 214 places one or more of skin layers 28 at least at the third angular position A3. When the fabrication system 200 includes multiple skin stations 214, one or more of skin layers 28 can be placed at multiple angular positions. Accordingly, the skin station(s) 214 can create splices 278 (shown in FIG. 14) of one or more of skin layers 28 in different zones such as first zone 126, and second zone 128 and/or different angular positions A1, A2, A3, as described in more detail with respect to FIG. 14.

The spindle 252 included in the drive system 138. More specifically, the spindle 252 is used to move the full-barrel mandrel 122 along the fabrication line 100. For example, the spindle 252 moves the full-barrel mandrel 122 to be positioned within the stations 202. After the stations 202 perform fabrication operations, the spindle 252 moves the full-barrel mandrel 122 to the next system or the next group such as second group 206 of stations 202.

When the fabrication system 200 includes the first group 204 and the second group 206 and/or the first subsystem 106 and the second subsystem 108, the spindle 252 rotates the full-barrel mandrel 122 with respect to each station of the first group 204 of stations and each station of the second group 206 of stations. Further, as part of the drive system 138, the spindle 252 is configured to move the full-barrel mandrel 122 in the process direction 22 to and through the first subsystem 106 and the second subsystem 108.

Figure 23:
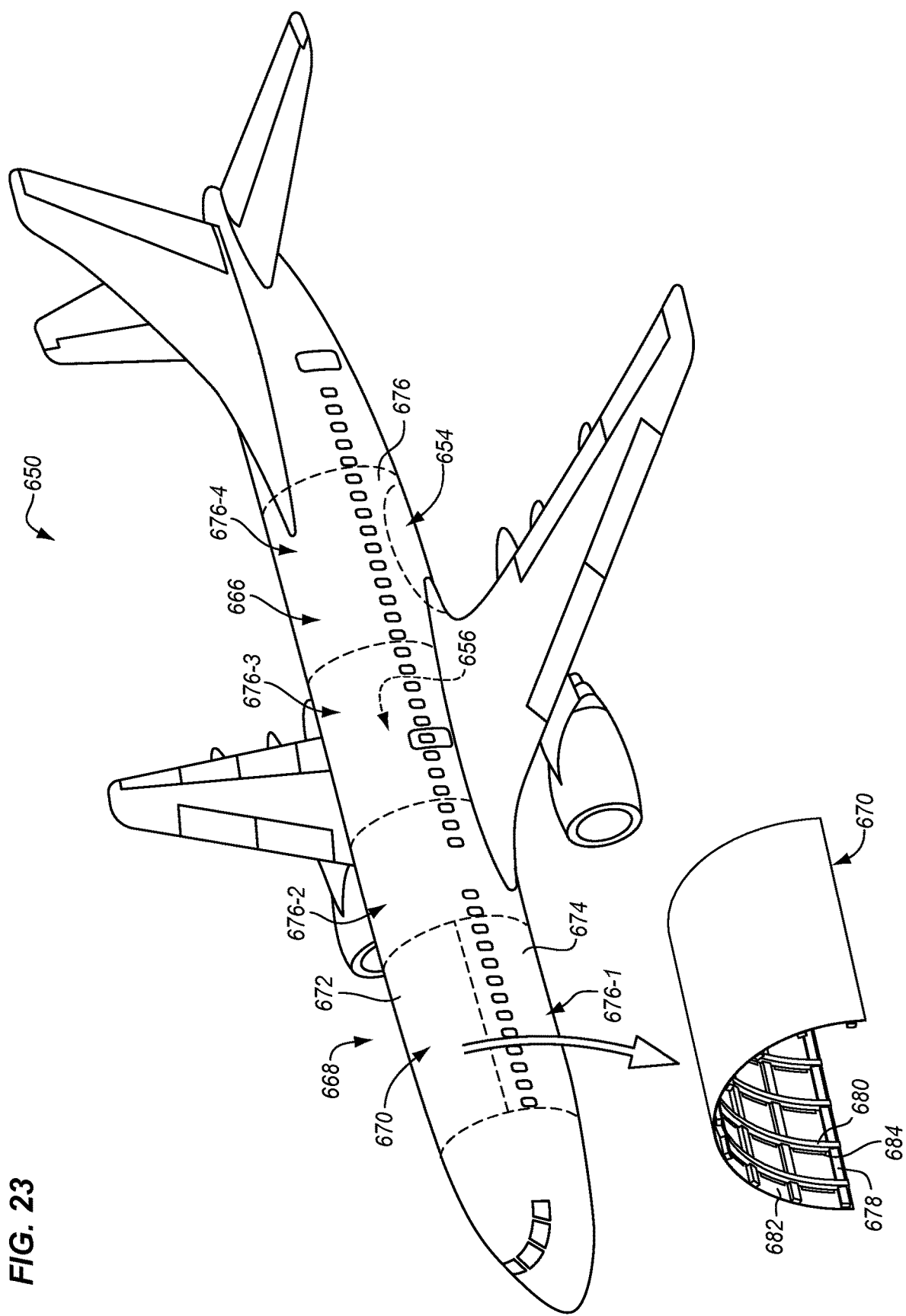
FIG. 23 is a perspective view of the aircraft shown in FIG. 22.

The fabrication system 200 can optionally include a cutter 256 configured to cut the composite part 12 at the full-barrel mandrel 122 into two half-barrel sections 670 (shown in FIG. 23). The cutter 256 can be positioned before or after the hardening system 20 (shown in FIG. 1). If the cutter 256 is used to cut the composite part 12 into two of half-barrel section 670, the two half-barrel section 670 pieces can be assembled back together into a full-barrel section 676 after systems and hardware are installed the half-barrel sections 670.

When the arrangement is linear, as shown in FIGS. 6 to 8, the stations 202 have different configurations depending on which zone such as first zone 126 or second zone 128 the station 202 is assigned to.

FIG. 10 is a perspective view of a station 258 for a first zone 126 of the mandrel 102, such as the crown portion 130. For example, the stations 258 in the first group 204 of stations are each configured to perform fabrication operations on a crown portion 130 of the mandrel 102. Accordingly, the Zone 1 stations 258, such as the Zone 1 component station(s) 210, the Zone 1 preform station(s) 212, and/or the Zone 1 skin station(s) 214, are configured to place objects 18 overhead. At least the Zone 1 component station 210 and the Zone 1 skin station 214 each include an elevated gantry 260 for placing objects 18 on the crown portion 130 of the mandrel 102. The Zone 1 component station 210 can also include a gantry 260. The gantry 260 supports the end effectors 232 over the mandrel 102 so the objects 18 can be placed on the crown portion 130. The end effectors 232 can also move in the X, Y, and Z-directions with respect to a frame 262 of the gantry 260. The gantry 260 can also include platforms 264 to support technician(s) 44 thereon.

The Zone 1 station 258 can also include one or more trays 266. The trays 266 can hold components 24, preforms 26, and/or one or more of skin layers 28 before placement on the mandrel 102. The end effector 232 can move on the frame 262 between the tray(s) 266 and mandrel 102 to pick the objects 18 from the tray(s) 266 and place the objects 18 on the mandrel 102.

FIG. 11 is a perspective view of a station 268 for a second zone 128 of the mandrel 102, such as one or more lateral portions such as first lateral portion 132, or second lateral portion 134. For example, the stations 268 in the second group 206 of stations are each configured to perform fabrication operations on the two lateral portions such as first lateral portion 132, and second lateral portion 134 of the mandrel 102. Accordingly, the Zone 2 stations 268, such as the Zone 2 component station(s) 216, the Zone 2 preform station(s) 218, and/or the Zone 2 skin station(s) 220, are configured to place objects 18 generally horizontally on to the mandrel 102. Because the second zone 128 includes the lateral portion(s) such as first lateral portion 132, and second lateral portion 134, the Zone 2 stations 268 include end effectors 234 that can move horizontally to place objects 18 on the mandrel 102.

When the second zone 128 includes two lateral portions such as first lateral portion 132, and second lateral portion 134, the component end effectors 238 of the second component station, or the Zone 2 component station 216, place the components 24 in the two lateral portions such as first lateral portion 132, and second lateral portion 134 in parallel (e.g., at the same time, during the same pulse 226). Similarly, the skin end effectors 246 of the second skin station, or the Zone 2 skin station 220, place the one or more skin layers 28 in the two lateral portions such as first lateral portion 132 and second lateral portion 134 in parallel. Also, the preform end effectors 242 of the second preform station, or the Zone 2 preform station 218, place the preforms 26 in the two lateral portions such as first lateral portion 132, and second lateral portion 134 in parallel.

The Zone 2 station 268 can include decks 270 upon which the technicians 44 can stand. Trays 266 can be included on the decks 270 or the floor. The trays 266 can hold components 24, preforms 26, and/or one or more of skin layers 28 before placement on the mandrel 102. The end effector 234 can move on a robotic arm 272 between the tray(s) 266 and mandrel 102 to pick the objects 18 from the tray(s) 266 and place the objects 18 on the mandrel 102. Each set of a robotic arm 272 with an end effector 234 can be considered a sub-station 274 of the station 268 because each robotic arm 272 can operated the associated end effector 234 independently of the other robotic arm 272 and end effector 234.

FIG. 12 is a perspective view of a plurality preform stations 212 that can be used to create splices 276 of the preforms 26. In one example, when the preforms 26 are short stringer preforms 40 that are shorter than a full length of a stringer 678 (shown in FIG. 23) to be fabricated, a group such as first group 204, or second group 206 of stations includes one or more preform stations 212, 218 configured to place first short stringer preforms 40 on to the mandrel 102. For example, the fabrication system 200 includes a first Zone 1 first preform station 212a, a second Zone 1 preform station 212b, and a third Zone 1 preform station 210c. Each of the first preform station 212a, second preform station 212b, and third preform station 212c place a set 48 of short stringer preforms 40 on a zone such as first zone 126, or second zone 128 of the mandrel 102.

The first Zone 1 preform station 212a places a first set 48a of short stringer preforms 40 on a first longitudinal portion 186a of the first zone 126 of the mandrel 102. The second Zone 1 preform station 212b places a second set 48b of short stringer preforms 40 on the second longitudinal portions 186b adjacent the first set 48a of short stringer preforms 40 such that the second set 48b of short stringer preforms 40 slightly overlap the first set 48a of short stringer preforms 40. This overlap can create a scarf splice or a lap splice as the splice 276 between each short stringer preform 40 of the first set 48a and a respective short stringer preform 40 of the second set 48b. Similarly, the third Zone 1 preform station 212c places a third set 48c of short stringer preforms 40 on a third longitudinal portion 186c adjacent the second set 48b of short stringer preforms 40 such that the third set 48c of short stringer preforms 40 slightly overlap the second set 48b of short stringer preforms 40 to create the splices 276.

When the fabrication system 200 includes two groups such as first group 204 and second group 206, the second group 206 of stations includes one or more second preforms stations 218 configured to place second short stringer preforms 40b on to the mandrel 102 with respect to the first short stringer preforms 40a and splice each second short stringer preform 40b to a respective first short stringer preform 40a. Additionally or alternatively, the first preform station 212 and the second preform station 218 work together to create the splices 276. More specifically, the second preform station(s) 218 are configured to perform the splicing during the placement of the second short stringer preforms 40b. For example, as the second short stringer preforms 40b are placed, the second short stringer preforms 40b slightly overlap the first short stringer preforms 40a. This overlap can create a scarf splice or a lap splice between each first short stringer preform 40a and a respective second short stringer preform 40b. Because the splices 276 align with the circumference 118 of the mandrel 102, the splices 276 can be referred to as hoopwise splices of the preforms 26.

Figure 13:
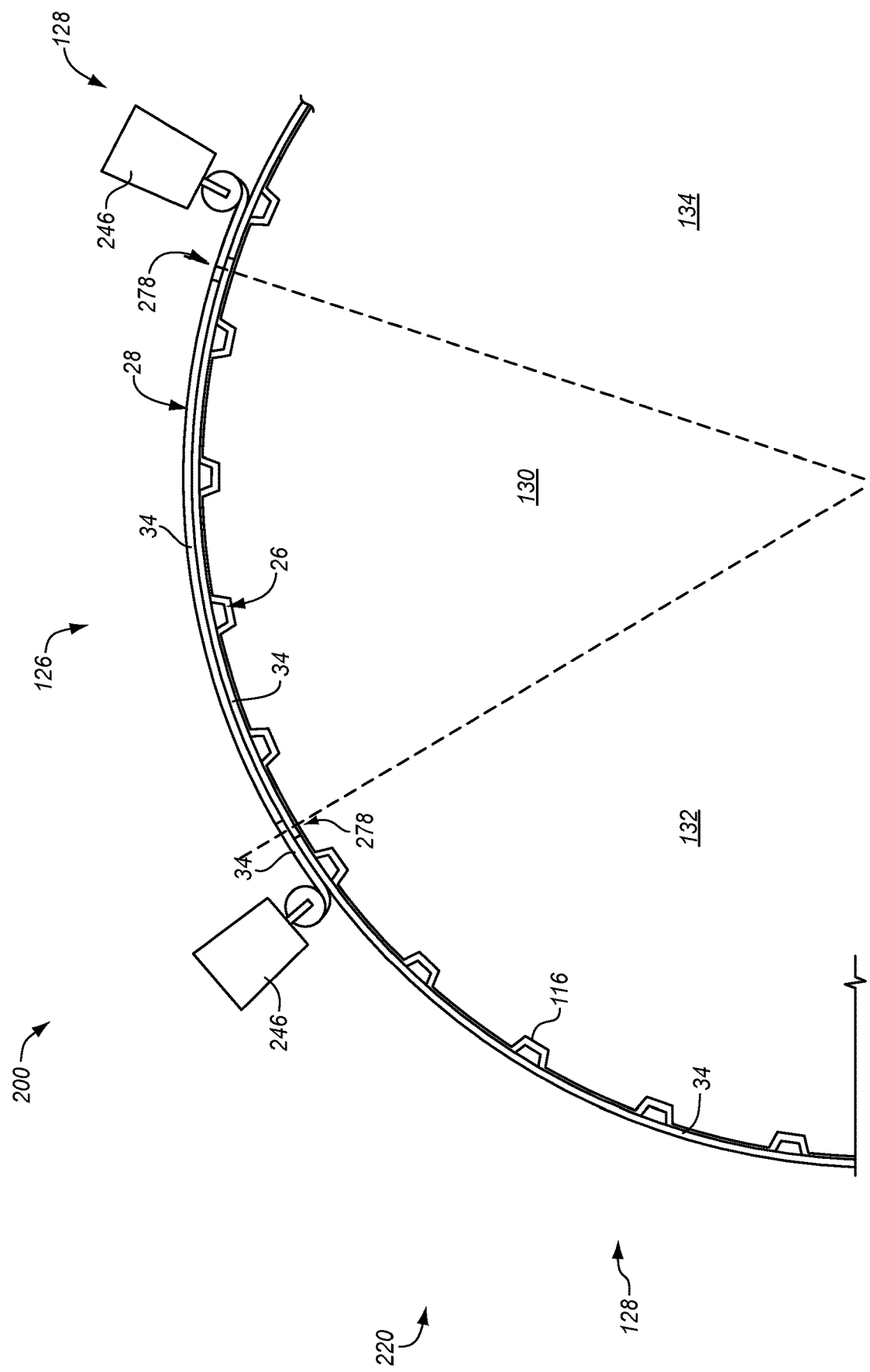
FIG. 13 is a cross-sectional view of a station that can be used with the fabrication system shown in FIGS. 1, 2, and 6 to 8 to create skin layer splices.

FIG. 13 is a cross-sectional view of a skin station 220 that can be used to create splice 278 in skin layers 28. In some examples, the first skin station 214 or the second skin station 220 is configured to splice skin panel plies 34 at the first zone 126 of the mandrel 102 to skin panel plies 34 at the second zone 128 of the mandrel 102. More specifically, after the first skin station 214 applies the skin panel plies 34 to place one or more of skin layers 28, the second skin station 220 applies skin panel plies 34 the overlap some of the skin panel plies 34 applied by the first skin station 214. Alternatively, when the stations 202 place the objects 18 in the laterals portions 132 and 143 and then in the crown portion, the Zone 1 skin station 214 forms the splices 278. Accordingly, the first skin station 214 and/or the second skin station 220 is configured to splice the skin panels plies 34 as the one or more skin layers 28 are placed on the mandrel 102. Because the splices 278 are aligned along the longitudinal axis of the mandrel 102, the splices 278 can be referred to as longitudinal splices.

Figure 14:
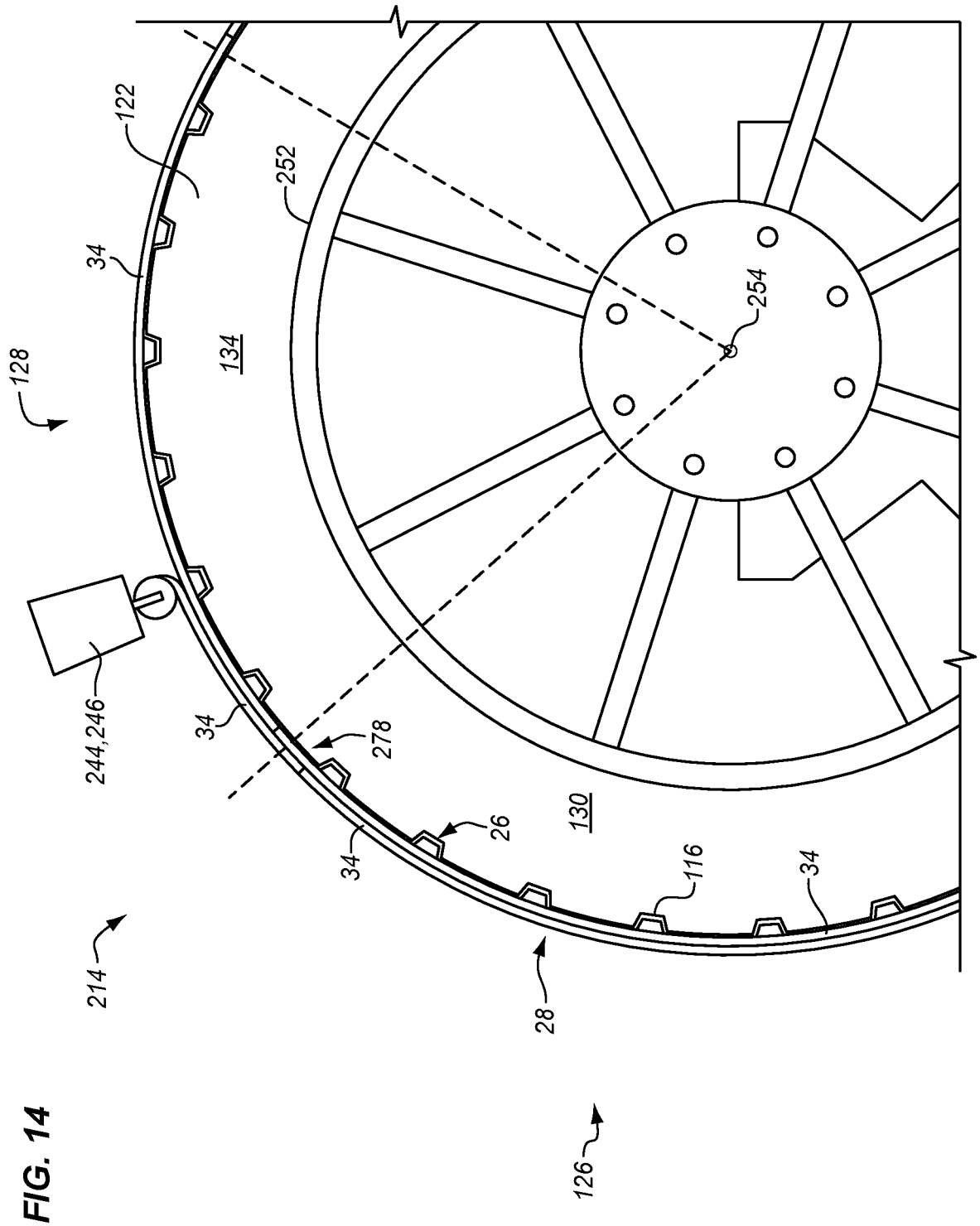
FIG. 14 is a cross-sectional view of a station that can be used with the fabrication system shown in FIGS. 1, 2, and 9 to create skin layer splices.

FIG. 14 is a cross-sectional view of a skin station 214 to create splice 278 in skin layers 28 in a rotary arrangement. When the full-barrel mandrel 122 includes a two or more zones such as first zone 126, and second zone 128, the skin station 214 is configured to splice skin panel plies 34 at the first 126 to skin panel plies 34 at the second zone 128 as the one or more skin layers 28 are placed. More specifically, after the skin panel plies 34 are applied to the first zone 126 to place one or more of skin layers 28, the skin station 214 applies skin panel plies 34 to the second zone 128 to overlap one or more of the skin panel plies 34 applied to the first zone 126.

When the full-barrel mandrel 122 includes a crown portion 130 and a second lateral portion 134, the skin station 214 is configured to splice skin panel plies 34 at the crown portion 130 to skin panel plies 34 at the lateral portion 134 as the one or more skin layers 28 are placed. More specifically, after the skin panel plies 34 are applied to the crown portion 130 to place one or more of skin layers 28, the skin station 214 applies skin panel plies 34 to the second lateral portion 134 to overlap one or more of the skin panel plies 34 applied to the crown portion 130.

Figure 15:
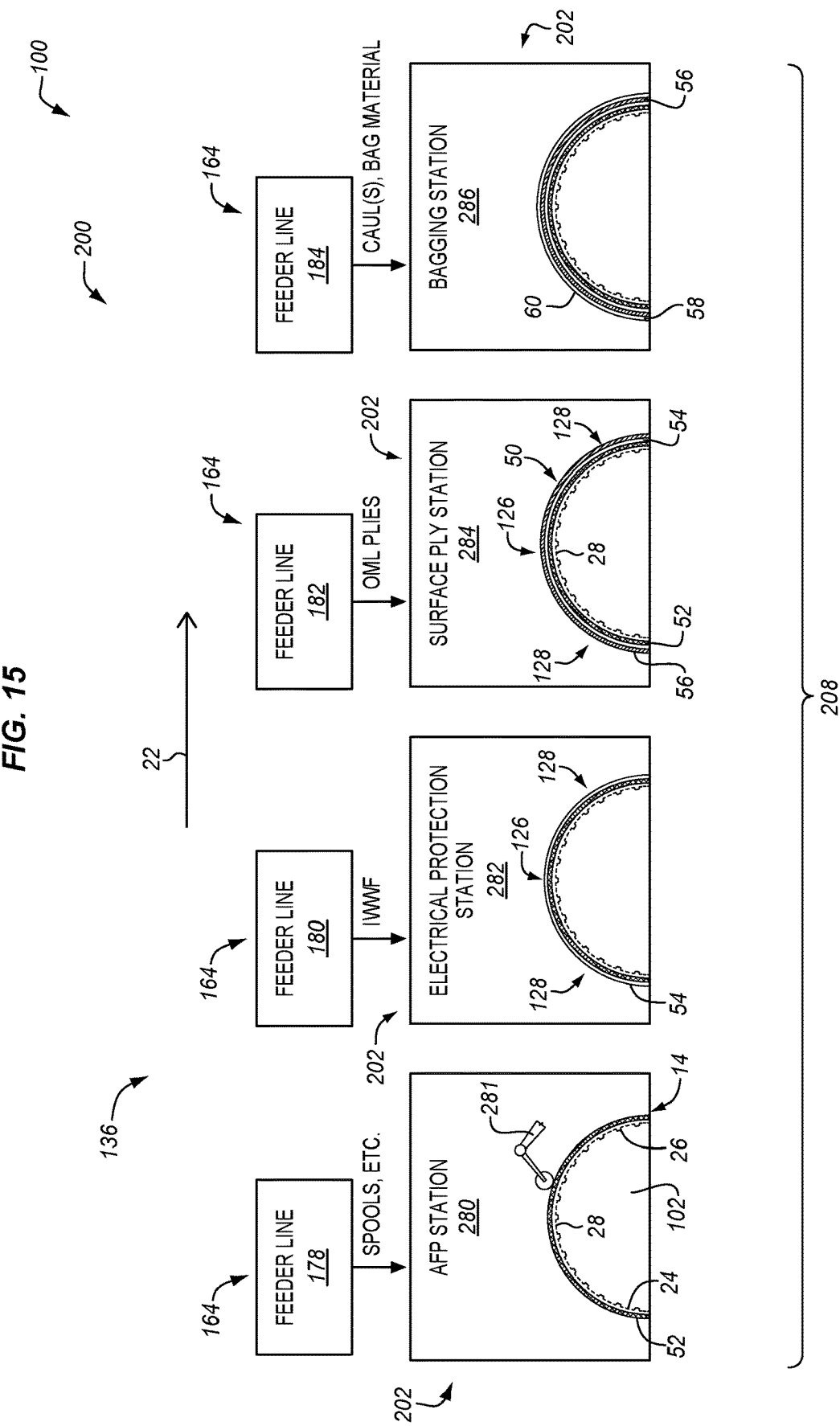
FIG. 15 is a schematic view of a third subsystem that can be used with the fabrication system shown in FIGS. 1 to 14.

FIG. 15 is a schematic view of a third subsystem 136 that can be used with the fabrication system 200 shown in FIGS. 1 to 14. Referring to FIGS. 1, 2, and 14. The third subsystem 136 is positioned after the first group 204 and the second group 206, or the first subsystem 106 and the second subsystem 108, in the process direction 22. Accordingly, the mandrel 102 is moved to the third subsystem 136 after the layup 14 has been fabricated. The third subsystem 136 is configured to perform lamination operations on the layup 14 on the mandrel 102 to form an unhardened part 50 that becomes the composite part 12. As discussed above, the layup 14 includes at least the components 24, the preforms 26, and the one or more skin layers 28.

The third subsystem 136 includes the third group 208 of stations 202 configured to perform fabrication operations in all zones such as first zone 126, and second zone 128 of the mandrel 102. More specifically, the third subsystem 136 includes stations 202 configured to: perform automated fiber placement (AFP) to fabricate additional skin 52 on the layup 14, place an electrical protection layer 54 on the additional skin 52, place one or more surface skin plies 56 over the electrical protection layer 54, and place a caul 58 and/or a bag 60 over the unhardened part 50 on the mandrel 102.

In some examples, the electrical protection layer 54 includes an inter-woven wire fabric (IWWF). For example, the one or more surface skin plies 56 includes an outer mold line (OML) ply. The unhardened part 50 includes the layup 14, the additional skin 52, the electrical protection layer 54, and the surface skin plies 56.

The third subsystem 136 includes at least one advanced fiber placement (AFP) station 280 configured to fabricate the additional skin 52 on the layup 14 on the mandrel 102. The automated fiber placement AFP station(s) 280 is configured to fabricate the additional skin 52 on at least one of the first zone 126 and the second zone 128 of the mandrel 102. In some examples, the AFP station(s) 280 is configured to fabricate the additional skin 52 on all zones of the mandrel 102 at each AFP station 280. More specifically, the AFP station 280 includes an AFP machine 281 that applies plies of the unhardened fiber-reinforced material 16 from an AFP head to build up the additional skin 52 on the layup 14.

The third subsystem 136 further includes one or more electrical protection stations 282 configured to place the electrical protection layer 54. In one example, the electrical protection station(s) 282 is configured to place the electrical protection layer 54 on all zones of the mandrel 102 at each electrical protection station 282. In another example, the third subsystem 136 includes a plurality of electrical protection stations 282. Each of the electrical protection stations 282 is assigned to a particular zone such as first zone 126 or second zone 128 of the mandrel 102. In such an example, the electrical protection stations 282 include one or more Zone 1 electrical protection stations 282 configured to place the electrical protection layer 54 on the first zone 126 of the mandrel 102, and one or more Zone 2 electrical protection stations 282 configured to place the electrical protection layer 54 on the second zone 128 of the mandrel 102.

The third subsystem 136 includes one or more surface ply stations 284 configured to place the one or more surface skin plies 56. The surface ply station(s) 284 place the OLM ply of surface skin plies 56 of the composite part 12. The surface ply station(s) 284 can be configured similarly to the skin station(s) 214, 220. In one example, the surface ply station(s) 284 is configured to place the one or more surface skin plies 56 on all zones of the mandrel 102 at each surface ply station 284.

In another example, the third subsystem 136 includes a plurality of surface ply stations 284, and each of the surface ply stations 284 is assigned to a particular zone such as first zone 126 or second zone 128 of the mandrel 102. In such an example, the surface ply stations 284 include one or more Zone 1 surface ply stations 284 configured to place one or more of the surface skin plies 56 on the first zone 126 of the mandrel 102 and one or more Zone 2 surface ply stations 284 configured to place the surface skin plies 56 on the second zone 128 of the mandrel 102.

The third subsystem 136 further includes one or more bagging stations 286 to place a caul 58 and/or a bag 60 over the mandrel 102. More specifically, the bagging station(s) 286 prepares the mandrel 102 and layup 14 and/or unhardened part 50 to be hardened in the hardening system 20. In one example, the bagging station(s) 286 is configured to place the caul 58 and/or the bag 60 on all zones of the mandrel 102 at each bagging station 286.

The third subsystem 136 can include one or more feeder lines 164. For example, the third subsystem 136 includes one or more AFP feeder lines 178, one or more electrical protection feeder lines 180, one or more surface ply feeder lines 182, and one or more bagging feeder lines 184. Each feeder line 178, 180, 182, and 184 is configured to supply appropriate materials to the associated station 280, 282, 284, or 286. For example, the AFP feeder line(s) 178 can supply AFP spools and other materials to the AFP station 280. The electrical protection feeder line(s) 180 can fabricate and/or supply the electrical protection layer(s) 54, such as IWWF, to the electrical protection station 282. The surface ply feeder line(s) 182 fabricate and/or supply plies of the unhardened fiber-reinforced material 16 to the surface ply station 284. The bagging feeder line(s) 184 supply the cauls 58, such as caul plates, and/or bagging material that makes the bag 60 to the bagging station 286.

ILLUSTRATIVE EXAMPLES

FIG. 7 illustrates a fabrication line 100 for laying up a layup 14 for an arcuate half-barrel section 670, or full-barrel section 676 of a fuselage 666 (shown in FIG. 23) in an illustrative embodiment. In this embodiment, fabrication line 100 includes an arcuate mandrel 102, such as a half-barrel mandrel 120, a full-barrel mandrel 122, or other mandrel for an arcuate portion of a half-barrel section 670, or full-barrel section 676 (shown in FIG. 23) of the fuselage 666. The arcuate mandrel 102 proceeds along a track 140 which advances or moves the arcuate mandrel 102 from the first component station 210 to the first preform station 212 and the first skin station 214, and from the second preform station 216 to the second preform station 218, and the second skin station 220, and eventually to the hardening system 20, such as an autoclave, for hardening. When station 202 to referred to, the description applies to the first component station 210, to the first preform station 212, the first skin station 214, the second component station 216, the second preform station 218, and the second skin station 220. In further embodiments, the stations 202 may be arranged serially from first component station 210 to the second component station 216 to the first preform station 212 to the second preform station 218 to the first skin station 214 to second skin station 220, as shown in FIG. 8.

The fabrication system 200 allows each station 202 to have a section of the mandrel 102 (e.g., an arcuate mandrel) to work upon at same time and progress at common takt time 222. If one station 202 cannot perform work in desired takt time, then a second or more stations 202 can be added serially and the work divided to arrive at a desired common takt time 222 per station 202. That is, the stations 202 are designed and arranged from day one such that work is divided in a manner that permits fabrication according to a desired takt time 222. Hence, the arrangement of the stations 202 is implemented from day one for the fabrication line 100.

Also indexing, such as the indexing system 146, is used by each station 202 to work on a different mandrel 102 or portion thereof, such as upper or lower, forward or aft, or one half-=barrel section 670 of a first model of an aircraft 650, or a half-barrel section 670 of another model of aircraft 650, illustrated in FIG. 6. The indexing informs the station 202 of the three-dimensional (3D) characteristics within the purview of the particular station 202. In one embodiment, the indexing for each station 202 is performed prior to initiating work on the mandrel 102 by that station 202. In a further embodiment, the indexing for each station 202 indexes a portion of the mandrel 102 within the purview of that station 202.

Also, the first skin station 214 and the second skin station 220 are configured to arrange lay down skin panel plies 34 such that splicing of the multiple skin layers 28 can occur. Crown and lateral lay down end effectors 232, 234 can overlap into lateral and crown portions 132, 134, 130, respectively to create the splice 278.

The track 140 maintains alignment and constrains motion of the mandrel 102, which facilitates setup and indexing for the arcuate mandrel 102 at each of the stations 202. The track 140 proceeds through each of the stations 202 but is illustrated as a small element on FIGS. 7 and 8 for the sake of clarity.

The mandrel 102 receives work for laying up a crown portion 130 of the layup 14 at the first component station 210, the first preform station 212, and the first skin station 214 as the mandrel 102 proceeds in a process direction 22. The first component station 210 includes end effectors 236 that apply isolation plies 32 and frame filler preforms 36 at the crown portion 130. The first preform station 212 includes end effectors 240 for placing one or more stringer preforms 38 into troughs 116 of the crown portion 130. The first skin station 214 includes end effectors 244 that apply Inner Mold Line (IML) skin panel plies 34 as well as Intersurface Anomaly (ISA) cauls 30 to the crown portion 130 that prevent intersurface anomalies. The end effectors 230 described herein can be moved by a robot arm, gantry, rail, track, etc.

Because the mandrel 102 proceed through the stations 202, in one embodiment a first mandrel 102a is disposed at the first component station 210, a second mandrel 102b is disposed at the first skin station 214 at the same time, and the first component station 210 and the first skin station 214 perform work on corresponding mandrels 102a, 102b during the same period of time.

Feeder lines 164 fabricate and provide material just in time to the stations 202. For instance, feeder line 166 provides frame filler preforms 36 and one or more isolation plies 32 to the first component station 210. Feeder line 170 provides stringer preforms 38 to the first preform station 212. Feeder line 174 provides skin panel ply material to the first skin station 214. Feeder line 168 provides frame filler preforms 36 and isolation ply 32 to the second component station 216. Feeder line 172 provides stringer preforms 38 to the second preform station 218. Feeder line 176 provides skin panel ply material to the second skin station 220.

In further embodiments, the stations 202 are arranged in series from first component station 210 to the second component station 216, to the second preform station 218, to the first preform station 212, to the first skin station 214, to the second skin station 220. This embodiment is depicted in FIG. 8. In still further embodiments, ISA cauls 30 are accompanied by plates of caul 58 and/or vacuum bags 60.

The mandrel 102 further receives work for laying up lateral portions such as first lateral portion 132, and second lateral portion 134 (e.g., left and right portions) of the layup 14 at the second component station 216, the second preform station 218, and the second skin station 220. The second component station 216 includes end effectors 238 that apply isolation plies 32 and frame filler preforms 36 at the lateral portions such as first lateral portion 132, and second lateral portion 134. The second preform station 218 includes end effectors 242 that place the stringer preforms 38 into troughs 116 of the lateral portions such as first lateral portion 132, and second lateral portion 134. The second skin station 220 includes end effectors 246 that apply skin panel plies 32 as well as ISA cauls 30 to the lateral portions such as first lateral portion 132, and second lateral portion 134. The skin panel plies 32 cover fiber reinforced components 24 and/or preforms 26 applied by earlier stations 202.

Isolation plies 32 provide electro-galvanic isolation between surfaces of the unhardened fiber-reinforced material 16 and aluminum surfaces. The ISA cauls 30 define shapes that prevent intersurface anomalies from forming during hardening. Frame filler preforms 36 provide spacing along the curvature of a layup 14 that results in a smooth surface along the layup 14 when traveled in a hoopwise direction, and the stringer preforms 38 define components that extend along the length 114 of the mandrel 102 and will be hardened into stringers 678 (shown in FIG. 23).

End effectors 230 discussed herein can be used to facilitate layup or pick and placement of the objects 18, such as components 24, preforms 26, skin layers 28, etc., onto the mandrel 102. Each station 202 can be specialized. Thus, some perform pick and placement, while others perform layup directly onto the mandrel 102 and may be arranged in any desired order with respect to each other.

Operations of the stations 202 discussed herein are managed by the controller 104. In this embodiment, the controller 104 operates the various end effectors 230 discussed herein based in instructions stored in one or more programs, such as Numerical Control (NC) programs, in a memory. In this manner, the controller 104 controllably moves and operates the end effectors 230 to lay up and prep components 24 and preforms 26 for desired composite parts 12. In one embodiment, the controller 104 is implemented as custom circuitry, as a hardware processor executing programmed instructions stored in the memory, or some combination thereof.

FIG. 7 further depicts the layup 14, which exists at the mandrel 102 after the stations 202 have completed their work. After completion, the arcuate layup 14 is laid-atop the mandrel 102 and ready to undergo hardening (e.g., via an autoclave) followed by demolding and assembly. Because layup processes may be sensitive to dust and debris, the fabrication line 100 may be located within a clean room environment. In further embodiments, the hardening system 20 forms a portal or boundary between a clean room environment and an assembly environment.

With a discussion provided of a general implementation a fabrication line 100 provided above, the following description provide specific implementations thereof. FIG. 6 is a perspective view of multiple stations 202 of a fabrication line 100 in an illustrative embodiment. In this embodiment, six stations 202 are arranged along a process direction 22. A component station 210, a preform station 212, and skin station 214 perform work on a crown portion 130 (as shown in FIG. 10) of a half-barrel mandrel 120. That is, the half-barrel mandrel 120 is an arcuate mandrel 102 that defines a shape for a half-barrel section 670 of the fuselage 666 (shown in FIG. 23).

In further embodiments, multiple mandrels 102 are arranged serially and synchronously advanced through the stations 202, and the stations 202 perform work during pause times 224 of the mandrels 102 according to a common takt time 22. Each of the stations 202 is fed by a feeder line 164 that fabricates material for placement onto the half-barrel mandrel 120, and the stations 202 may perform work at the half-barrel mandrel 120 at the same time after being indexed to the half-barrel mandrel 120. Work is performed by the component station 210, the preform station 212, and the skin station 214 during pause times 224 between movement time 228 the mandrel 102 and is performed according to a common takt time 222 by the stations 202. The mandrel 102 advances or moves by pulses 226. The pulses 226 are of the same or varying lengths, but a minimum of the full length 114 of the mandrel 102. Pulses 226 advance or move the mandrel 102 at a common takt time 222 from station 202 to station 202. The takt time 222 is the pause time 224 between pulses 226 plus the pulse movement time 228.

Furthermore, the stations 202 depicted herein perform splicing of crown layups, such as preforms 26 and/or skin layers 28 at the crown portion 130, with the lateral layups, such as preforms 26 and/or skin layers 28 at the lateral portions such as first lateral portion 132, and second lateral portion 134. In one embodiment, this includes overlapping end effectors 232, 234 between the stations 202 assigned to the crown portion 130 and the lateral portions such as first lateral portion 132, and second lateral portion 134. This facilitates longitudinal splicing between the layup 14 at the crown portion 130 and the layup 14 at the lateral portions such as first lateral portion 132, and second lateral portion 134. As shown in FIG. 11, it is also possible to have a lateral splice 288 of the layup 14 which is longitudinally arranged and/or at least one hoopwise splice 290 of the layup 14 arranged across the crown or lateral parts of the layup 14.

A greater number of divisions of the ply along lateral at least one lateral splice 288 and/or at least one hoopwise splice 290 increase the division of labor with the necessary splices such as lateral splice 288, or hoopwise splice 290 provides further divisions of labor beyond the depicted six stations 202 to facilitate a common Takt time 222 for each pulse stop. Hence, in further embodiments the depicted stations 202 are subdivided into smaller sub-stations, such as sub-stations 274 of FIG. 11. This means that in one embodiment, methods of operating the stations 202 include splicing skin panel plies 34 at a crown portion 130 of the mandrel 102 to skin panel plies 34 at a lateral portion(s) such as first lateral portion 132, or second lateral portion 134 of the mandrel 102. Hence, any of the stations 202 recited above may perform such a splicing task.

In this embodiment, there is only one crown layup head at each of the Zone 1 stations 258 while there are two lateral layup heads at each Zone 2 station 268. This is because there is more material being applied on the lateral portions such as first lateral portion 132 and second lateral portion 134 compared to at the crown portion 130 and the lateral portions such as first lateral portion 132, and second lateral portion 134 may require more plies and complexity of lay up. That is, more material can be placed because the material placement operations can be divided between two or more layup sub-station 274 to reduce in-station time and thus reduce takt time for the station 202.

The lateral portions such as first lateral portion 132, and second lateral portion 134 may be divided into smaller micro-pulses than at the crown portion 130 to compensate and permit a common takt time 222 between the Zone 1 stations 258 and the Zone 2 stations 268. As used herein, a "micro-pulse" includes a movement less than the length 114 of the mandrel 102. Therefore, stations 202 depicted herein can be broken into multiple sub-stations (e.g., sub-stations 274) to arrive at a desired takt time 222 in common the Zone 1 stations 258 and the Zone 2 stations 268. The work load in these stations is divided amongst the multiple sub-stations (e.g., sub-stations 274). The layup of these divided stations may require some type of hoopwise splicing between layups of stations 202 in serial or specialized orientation layup of materials in each subdivided station to 0 degrees, 90 degrees, +/−45 degrees, etc.

In the embodiment shown in FIG. 6, each station 202 is accompanied by one or more feeder lines 164 that bring in material to the station 202 that for placement onto the mandrel 102. The half-barrel mandrel 120 receives added material during pause times 224 between pulses 226.

The Zone 1 stations 258 include elevated gantries 260 (as shown in FIG. 10) for performing work on the crown portion 130 of the half-barrel mandrel 120 via end effectors 232; although, in further embodiments the end effectors (e.g., the end effectors 234 of FIG. 11 are mounted to robotic arms (e.g., robotic arms 272 of FIG. 11) or similar devices. The Zone 1 component station 202 includes end effectors 236 that apply isolation plies 32 and frame filler preforms 36 to the half-barrel mandrel 120. The Zone 1 preform station 212 is separated from the Zone 1 component station 210 by a distance in a process direction 22. The Zone 1 preform station 212 includes end effectors 240 that apply preforms 26 to the half-barrel mandrel 120. The Zone 2 skin station 214 is separated from the Zone 1 preform station 212 by a distance in the process direction 22. The Zone 1 skin station 214 includes end effectors 244 that apply an EVIL ply of skin panel plies 34 and/or one or more of ISA cauls 30 to the half-barrel mandrel 120.

Referring to FIG. 11, the Zone 2 stations 268, including the Zone 2 component station 216, the Zone 2 preform station 218, and the Zone 2 skin station 220, perform work on lateral portions 132 and 143 of the half-barrel mandrel 120. That is, the Zone 2 component station 216, the Zone 2 preform station 218, and the Zone 2 skin station 220 perform the same role as the Zone 1 component station 210, the Zone 1 preform station 212, and the Zone 1 skin station 214, respectively, but for a different location on the half-barrel mandrel 120. Specifically, the Zone 2 component station 216 includes end effectors 238 that apply isolation plies 32 and frame filler preforms 36 to the half-barrel mandrel 120. The Zone 2 preform station 218 is separated from the Zone 2 component station 216 by a distance in a process direction 22. The Zone 2 preform station 218 includes end effectors 242 that apply preforms 26 to the half-barrel mandrel 120. The Zone 2 skin station 220 is separated from the Zone 2 preform station 218 by a distance in the process direction 22.

The Zone 2 skin station 220 includes end effectors 246 that apply an IML ply of skin panel plies 34 and/or one or more of ISA cauls 30 to the half-barrel mandrel 120. The half-barrel mandrel 120 is moved in the process direction 22 from station 202 to station 202 and may be pulsed by its entire length 114 in a "pulse," or by less than its length 114 in a "micro pulse."

As discussed above, the half-barrel mandrel 120 is subdivided into a crown portion 130 and lateral portions such as first lateral portion 132 and second lateral portion 134 (as shown in FIG. 10), and the stations 202 performing the roles of the component station, the preform station, and the skin station are different for the crown portion 130 than for the lateral portions such as first lateral portion 132, and second lateral portion. In further embodiments, the Zone 2 stations 268 operate to perform layup in both lateral portions such as first lateral portion 132 and second lateral portion 134 at once/simultaneously. In further embodiments, the half-barrel mandrel 120 is subdivided into lengthwise or longitudinal portions 186 (e.g., each portion 186 occupying a full arc of the half-barrel mandrel 120 and continuing in the process direction 22). In such example, the stations 202 performing the roles of the component station, the preform station, and the skin station are different for each of the longitudinal portions 186. This enables multiple stations 202 to work simultaneously upon the mandrel 102 for each of multiple pulses 226 or micro pulses.

FIG. 10 is a perspective view of a Zone 1 station 258 for preparing a crown portion 130 of a half-barrel mandrel 120 for a half-barrel section 670, or full-barrel section 676 of the fuselage 666 (shown in FIG. 23) in an illustrative embodiment. In this embodiment, the crown portion 130 and each of lateral portions 132 and 132 occupy an at least sixty-degree (60°) arc, plus an overlap amount to accommodate splices 278 and/or at least one hoopwise splice 290 at the half-barrel mandrel 120. For each particular ply, the crown portion 130 or the lateral portion 132, 143 extends more than a sixty-degree arc to accommodate splicing requirements and the desire to stagger splices offset from exactly the sixty degree arc. The Zone 1 station 258 includes a gantry 260 that supports a set of end effectors 232. The end effectors 232 pick up and place objects 18 from the trays 266 onto the half-barrel mandrel 120. In further embodiments, the Zone 1 station 258 also places objects 18 onto border regions 188 between defined sixty degree arcs.

A platform 264 disposed at the crown portion 130 enables technicians 44 to ergonomically inspect the half-barrel mandrel 120, place objects 18 onto the half-barrel mandrel 120, and to perform any desired rework.

In further embodiments, the preforms 26, such as stringer preforms 38, are placed singularly or in mass or in bulk onto the troughs 116 instead of being placed one at a time. One trough 116 can be on the border region 188 between the crown portion 130 and the lateral portion such as first lateral portion 132 or second lateral portion 134. While one trough 116 is illustrated, it is understood that there are many troughs 116 arrange longitudinally or parallel to the illustrated trough 116 in each of the lateral portions such as first lateral portion 132, and second lateral portion 134 and the crown portion 130.

All objects 18, such as stringer preforms 38, isolation plies 32, frame filler preforms 36 (a.k.a., postage stamps), are placed singularly or in mass or in bulk. In some embodiments, the some or all of the objects 18 are pre-kitted and placed upon a backing, either singularly or in bulk, which is applied to desired locations at the mandrel 102. In further embodiments, all placement operations, except for fiber placement, are performed manually. In still further embodiments, all operations including fiber placement are performed robotically.

FIG. 11 is a perspective view of a Zone 2 station 268 for preparing lateral portions 132, 143 of a half-barrel mandrel 120. The Zone 2 station 268 includes a tray 266 at each lateral portion 132 and 143 of the half-barrel mandrel 120. End effectors 234 disposed at robotic arms 272 acquire objects 18 (e.g., stringer preforms 38, isolation plies 32, frame filler preforms 36) from the trays 266 for placement onto the lateral portions such as first lateral portion 132 and/or second lateral portion 134; although, in further embodiments these processes are performed manually.

In one embodiment, multiple Zone 2 stations 268 perform work on lateral portions such as first lateral portion 132, and second lateral portion 134 of the half-barrel mandrel 120 by moving end effectors 234 attached to robotic arms 272. A deck 270 disposed at the lateral portions such as first lateral portion 132, and second lateral portion 134 enables technicians 44 to ergonomically inspect the half-barrel mandrel 120 and to perform any desired rework. In further embodiments, all placement operations except for fiber placement are performed manually. In still further embodiments, all operations including fiber placement are performed robotically. In still further embodiments, longitudinal portions 186 (as illustrated in FIG. 10) of the mandrel 102 are worked upon by different Zone 2 stations 268 at the same time, such as during pause times 224 between pulses 226 in order to achieve a common takt time 222. In one embodiment, the Zone 2 station 268 is subdivided into sub-stations 274.

FIG. 9 is a front view of a rotary arrangement of the fabrication system 200. According to FIG. 9, the fabrication system 200 is on a floor 62 to which a rotating spindle 252 is mounted for rotation. A full-barrel mandrel 122 is affixed to the spindle 252 and includes a layup surface 110.

The spindle 252 rotates the full-barrel mandrel 122 about a longitudinal axis 254 of the spindle 252 (e.g., periodically by a small increment, such as an angular deviation between troughs 116). Each of the troughs 116 are shaped to accommodate a hat stringer preform. That is, the full-barrel mandrel 122 rotates to expose new troughs 116 for receiving preforms 26. This enables all placement to occur on the portion of the full-barrel mandrel 122 that is currently the upper portion, in order to avoid any concerns related to peeling due to gravity, and to reduce the amount of manual labor involved in the process of placing preforms 26. The fabrication system 200 can be indexed based on angular rotation and may include one or more features that rotate to indicate a current alignment. In further embodiments, layup/placement zones include at least one lateral splice 288 and/or hoopwise splice 290.

A component station 210 includes one or more end effectors 236 that applies isolation plies 32 and frame filler preforms 36 to the full-barrel mandrel 122 at a first angular position A1; although, in further embodiments manual kitting and placement is possible. In still further embodiments multiple stringer preforms 38 are placed at once, and the spindle 252 rotates the mandrel 102 by an angular pitch that covers multiple stringer troughs 116. A first feeder line 166 fabricates and supplies isolation plies 32 and frame filler preforms 36 to the component station 210 in a Just-in-Time (JIT) manner.

A preform station 212 includes one or more end effectors 240 at a gantry 248. The stringer preforms 38 are fabricated via a second feeder line 170 and provided to a loader 250 in a JIT manner. The end effectors 240 retrieve stringer preforms 38 from the loader 250 and apply the stringer preforms 38 to the full-barrel mandrel 122 (e.g., via a gap in decking at the preform station 212) at a second angular position A2; although, in further embodiments manual kitting and placement is possible. Thus, stringer preforms 38 arrive just in time and in the proper order for placement into newly exposed troughs 116. One or multiple preforms 26 may be placed at once in a similar fashion to the component station 210.

A skin station 214 includes one or more end effectors 244 that apply an EVIL ply 34 to the full-barrel mandrel 122 at a third angular position A3. A third feeder line 174 fabricates and supplies EVIL skin panel plies 34 to the skin station 214 in a JIT manner. The skin station 214 works on the upper half of the mandrel 122 to permit covering of the subcomponents and substructure with some layer of skin laminate to help keep the already-placed objects 18 in place.

However, subsequent layup stations can also be placed on the lower side of the mandrel 122 in order to place taped components or apply compaction forces to newly placed objects 18. Therefore, several tape laying end effectors can be placed around the rest of the 360 degrees of the mandrel 122. This division of tape laying helps to establish a desirable takt time 222.

The component station 210, the preform station 212, and the skin station 214 operate during the same pause between pulses on the full-barrel mandrel 122. In a similar manner to the stations 202 discussed above with regard to FIGS. 7 and 8, any of the stations 210, 212, 214 discussed herein with regard to FIG. 9 may operate as a splicing station that splices skin panel plies 34 at a crown section 130 of the full-barrel mandrel to skin panel plies 34 at a lateral portion such as first lateral portion 132 or second lateral portion 134 of the full-barrel mandrel 122.

During fabrication operations, a portion of the mandrel 122 is rotated into the purview of a station 210, 212, and/or 214 and indexed to the station 202. The station 202 places objects 18 on the mandrel 122 during a pause. Then, the portion of the mandrel 122 is rotated to the next station 212, 214, and/or 210 while the previous station 210, 212, and/or 214 receives a new portion of the mandrel 122 for receiving work. The indexing enables each station 202 to determine the current portion of the mandrel 122 that is exposed for receiving work. Crown, lateral, or keel portions will require different subcomponents, substructure, and skin layup. This will vary also from barrel section to barrel section and from aircraft model to aircraft model. In further embodiments, splicing between zones is also performed in order to facilitate fabrication of a completed layup 14.

In this embodiment, the fabrication system 200 also includes an indexing unit 162 that indexes the full-barrel mandrel 122 after each rotation of the spindle 252. After layup and hardening (e.g., in a downstream hardening system 20), a cutter 256 (e.g., also located downstream of the fabrication system 200) cuts a composite part 12 at the full-barrel mandrel 122 into two half-barrel sections 670 for later splicing into a full barrel section 676 (shown in FIG. 23).

In further embodiments, the fabrication system 200 includes multiple rotary subsystems 106, 108. Each of multiple rotary subsystems 106, 108 is arranged into the page in the process direction 22, such that each rotary subsystem 106, 108 operates on a different longitudinal portions 186 of the full-barrel mandrel 122. The rotary subsystems 106, 108, just like their stations 202, may operate simultaneously with respect to each other. This arrangement provides a technical benefit by enabling multiple operations to be performed simultaneously on the full-barrel mandrel 122, thereby increasing throughput. In further embodiments, a full barrel section 676 formed on the full-barrel mandrel 122 is cut by the cutter 256 into two half-barrel sections 670 of equal size, and the half-barrel sections 670 are micro pulsed by less than their length through the manufacturing line 10.

In a further embodiment, subsystems 106 and/or 108 splice skin panel plies 34 of succeeding third angular position A3 applying skin panel plies 34 of the full-barrel mandrel 122 to skin panel plies 34 of a prior placed third angular position A3, placed during a prior third angular position A3 application, on the full-barrel mandrel 122.

The full-barrel mandrel 122 is rotated as shown, in a clockwise direction by a pulse 226 during the fabrication process. Another embodiment, not shown, has the full-barrel mandrel 122 rotated in a counterclockwise direction during the fabrication process. The full-barrel mandrel 122 rotates in a pulse 226 of a fraction of the entire circumference 118. As shown, the full-barrel mandrel 122 is rotated by a pulse of 226 which is about 60 degrees to accommodate first angular position A1, second angular position A2, third angular position A3. Another embodiment has pulses 226 of varying angular rotation pulses and/or of less than about 60 degrees. Another embodiment has pulses 226 of varying angular rotation pulses and/or pulses more than about 60 degrees. The pulses 226 are each at the number of degrees of the circumference 118 that results in a common takt time 222 from first angular position A1 to second angular position A2 to third angular position A3.

Methods

The methods described with respect to FIGS. 16 to 20 can be performed by the controller 104 (shown in FIGS. 1, 2, and 7-9). For example, and referring to FIGS. 1 and 2, the steps of the methods are included in a program embodied in the controller 104 and are sent in instructions from the controller 104 to the stations 202 and/or in instructions sent to the mandrel 102 and/or the drive system 138 to perform the method(s). Accordingly, the controller 104 is operable to perform the methods 300 and 400 and steps described herein. When the method steps are performed by a system in the manufacturing line 10 other than the fabrication line 100 and/or the fabrication system 200, the controller 104 communicates with controller(s) in the other systems, such as the hardening system 20, to move the mandrel 102 and perform the remainder of the method step(s).

The steps of the methods are described below with reference to the fabrication line 100 and the fabrication system 200 of FIGS. 1 to 15, but those skilled in the art will appreciate that the herein-described methods may be performed in other systems. The steps of the flowcharts described herein are not all inclusive and may include other steps not shown and include optional steps that can be performed in some examples. The steps described herein may also be performed in an alternative order and/or may be skipped.

Figure 16:
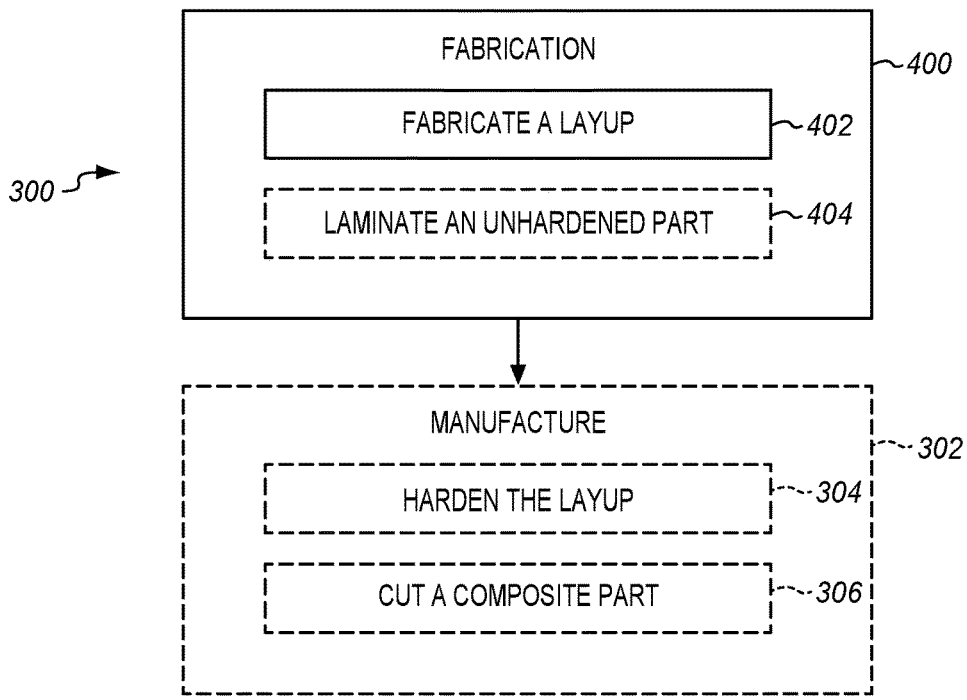
FIG. 16 is a flowchart illustrating a method of making a composite part using the systems shown in FIGS. 1 to 15.

FIG. 16 is a flowchart illustrating a method 300 of making a composite part 12 (shown in FIG. 1) using manufacturing line 10, fabrication line 100, and systems 200 shown in FIGS. 1 to 15. Referring to FIGS. 1 and 16, the method 300 includes a fabrication method 400 and a manufacturing method 302. The fabrication method 400 includes fabricating 402 a layup 14. The fabrication method 400 further includes a lamination method 404 that creates an unhardened part 50 (shown in FIG. 15) from layup 14. After the lamination method 404, the unhardened part 50 is prepared to be manufactured into the composite part 12.

The manufacturing method 302 includes hardening 304 the layup 14 and/or unhardened part 50 into the composite part 12. For example, the method 300 includes hardening 304 the components 24, the preforms 26, and the one or more skin layers 28 into the integral composite part 12. More specifically, the layup 14 and/or unhardened part 50 is moved to the hardening system 20 (shown in FIGS. 1, 7, and 8). The hardening system 20 hardens 303 the layup 14 and/or unhardened part 50 into the composite part 12.

When the fabrication method 400 is used to fabricate the layup 14 and/or unhardened part 50 on the full-barrel mandrel 122 (FIG. 9), the manufacturing method 302 can further includes cutting 306 the full-barrel composite part 12 into two half-barrel composite parts 12. More specifically, the cutter 256 (shown in FIGS. 1 and 9) cuts 306 a full-barrel section 676 (shown in FIG. 23) into the two half-barrel sections 670 (shown in FIG. 23).

Figure 17:
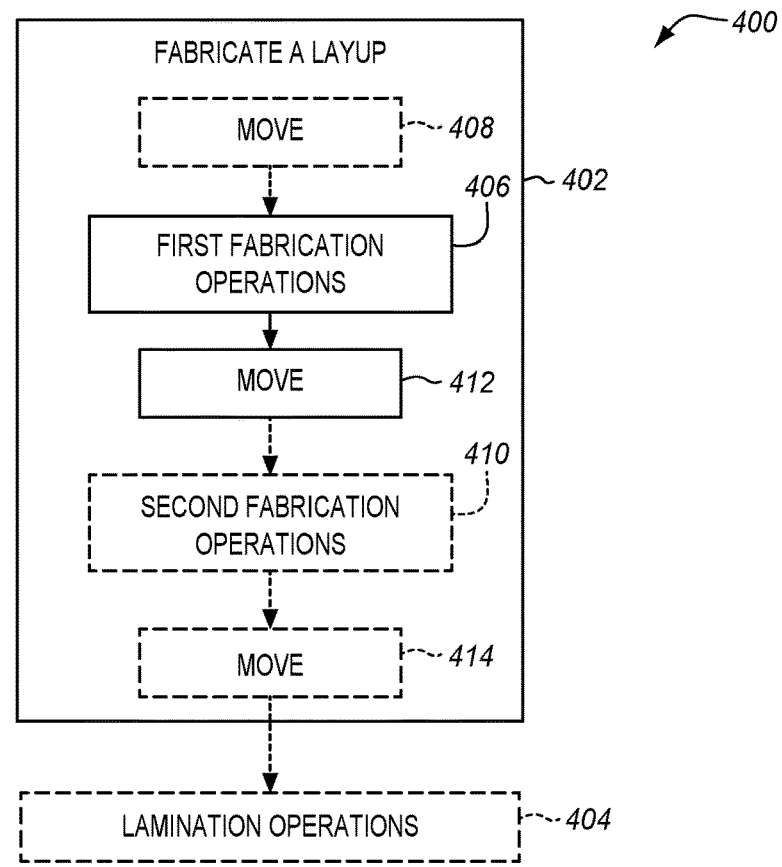
FIG. 17 is a flowchart illustrating a fabrication method that can be used with the method shown in FIG. 16.

FIG. 17 is a flowchart illustrating a fabrication method 400 that can be used with the method 300 shown in FIG. 16. Referring to FIGS. 1 and 17, the method 400 includes fabricating 402 a layup 14. The method 400 can further include the lamination method 404.

To fabricate 402 the layup 14, at least one set of fabrication operations are performed. The first fabrication operations 406 include placing 416 (shown in FIGS. 18 and 19) objects 18 on the mandrel 102. For example, the first fabrication operations 406 include placing 416 components 24, preforms 26, and one or more skin layers 28 on the mandrel 102, as will be described in more detail with respect to FIGS. 18 and 19.

When the fabrication line 100 includes one subsystem 106, performing the first fabrication operations 406 produces the layup 14. Further, when the fabrication system 200 includes one group 204 of stations 202, performing the first fabrication operations 406 also produces the layup 14. For example, when the fabrication system 200 has a rotary arrangement as shown in FIG. 9, performing the first fabrication operations 406 produces the layup 14.

Before the first fabrication operations 406 are performed, the mandrel 102 can be moved 408 to the fabrication system 200, such as the subsystem 106, group 204, and/or the stations 202 (e.g., Zone 1 stations 258) of the fabrication system 200. The drive system 138 can be used to move 408 the mandrel 102 to and/or through the fabrication system 200. Moving 408 the mandrel 102 will be explained in more detail below.

The layup fabrication 400 can further include performing second fabrication operations 410. The second fabrication operations 410 are performed after the first fabrication 406 operations are performed. When the mandrel 102 is a half-barrel mandrel 120 that includes the first zone 126 and the second zone 128, the first fabrication operations 406 are performed on the first zone 126, and the second fabrication operations 410 are performed on the second zone 128. When the mandrel 102 is the full-barrel mandrel 122, the first fabrication operations 406 can be performed on one longitudinal portion 186, and the second fabrication operations 410 can be performed on another longitudinal portion 186.

The second fabrication operations 410 are the same as the first fabrication operations 406. More specifically, the second fabrication operations 410 include placing 416, 440 (shown in FIGS. 18 and 19) objects 18 on the mandrel 102. For example, the fabrication operations 410 include placing 416, 440 components 24, preforms 26, and one or more skin layers 28 on the mandrel 102.

Alternatively, the second fabrication operations 410 can be different than the first fabrication operations 406. For example, the first fabrication operations 406 place 416 one type of object 18 and the second fabrication operations 410 place 416, 440 a second type of object 18. In such an example, the fabrication 400 to fabricate a layup 402 can include performing third fabrication operations. For example, the first fabrication operations 406 place 452 (shown in FIG. 19) components 24, the second fabrication operations 410 place 454 (shown in FIG. 19) preforms 26, and the third fabrication operations place 456 (shown in FIG. 19) one or more skin layers 28.

After the first fabrication operations 406 and the second fabrication operations 410 are performed, the layup 14 has been fabricated 402 on the mandrel 102. In the example where different types of objects 18 are placed 452, 454, 456, the layup 14 is fabricated 402 after the third fabrication operations are performed, too.

Before the second fabrication operations 410 are performed, the mandrel 102 can be moved 412 the second subsystem 108, the second group 20, and/or Zone 2 stations 268 of the fabrication system 200. The drive system 138 can be used to move 412 the mandrel 102 to and/or through the second subsystem 108. Alternatively, the first fabrication operations 406 can be performed on a first longitudinal portion 186 of the mandrel 102 and the second fabrication operations 410 can be performed on a second longitudinal portion 186 of the mandrel 102 while the mandrel 102 is stationary or paused.

Figure 20:
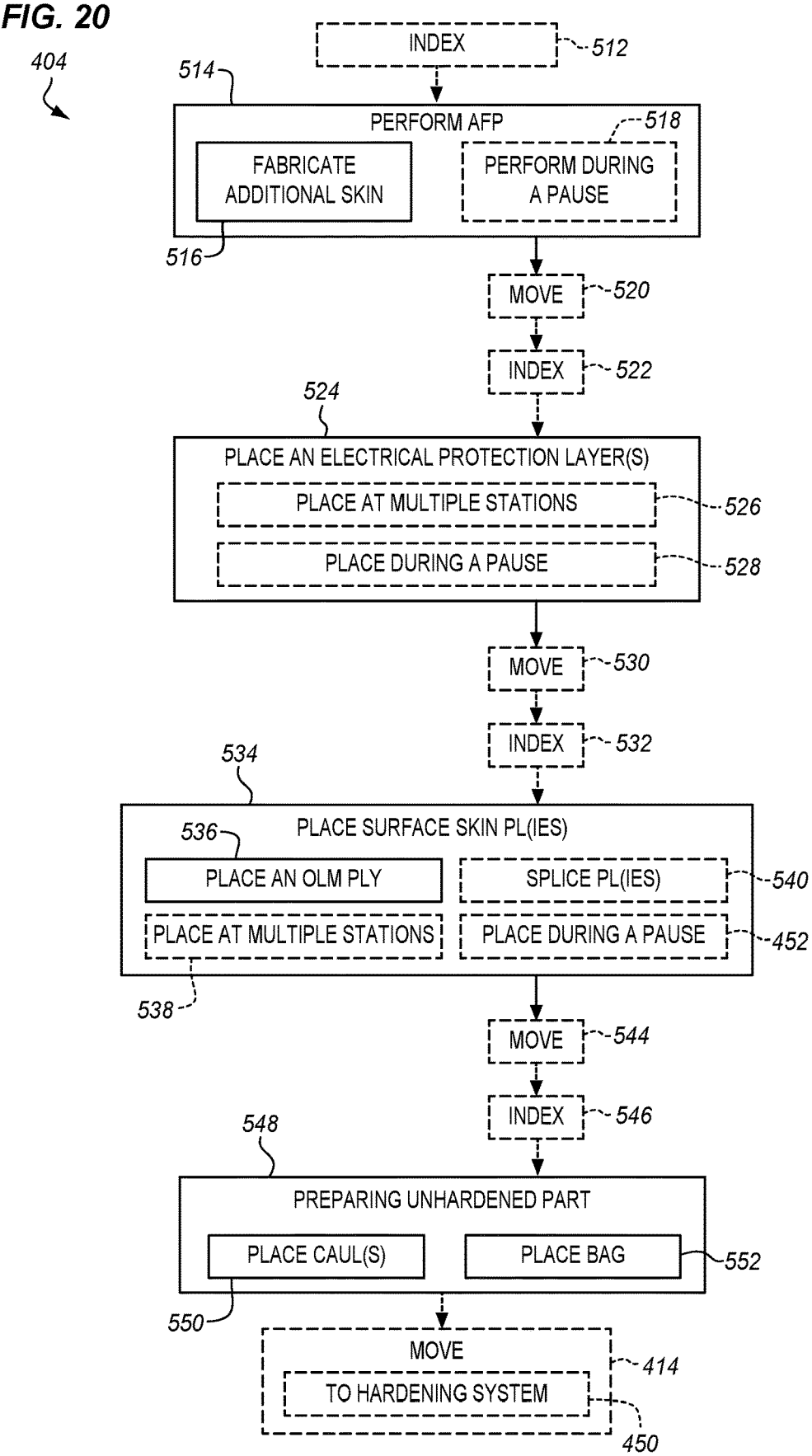
FIG. 20 is a flowchart illustrating a lamination method that can be used with the methods shown in FIGS. 16 to 18.

After the layup 14 is fabricated 402, the layup 14 can be moved 414 to the third subsystem 136 to perform the lamination method 404, which is described in more detail with respect to FIG. 20, or moved 414 to another part of the fabrication line 100 or manufacturing line 10.

In one example of the method 400, the method 400 fabricates a half-barrel section 670, or full-barrel section 676 of a fuselage 666 (shown in FIG. 23). In this example, the method 400 includes moving 408 a mandrel 102 to a first subsystem 106 assigned to a first zone 126 of the mandrel 102, such as a first zone 126 including a crown portion 130 of the mandrel 102. The method 400 includes placing components 24, preforms 26, and one or more skin layers 28 on the first zone 126 of the mandrel 102 at the first subsystem 106. The mandrel 102 is moved 412 to a second subsystem 108 assigned to a second zone 128 of the mandrel 102, such as a second zone 128 that include a lateral portion such as first lateral portion 132, or second lateral portion 134 of the mandrel 102. The components 24, the preforms 26, and the one or more skin layers 28 are placed 506 on the second zone 128 of the mandrel 102 at the second subsystem 108.

Figure 18:
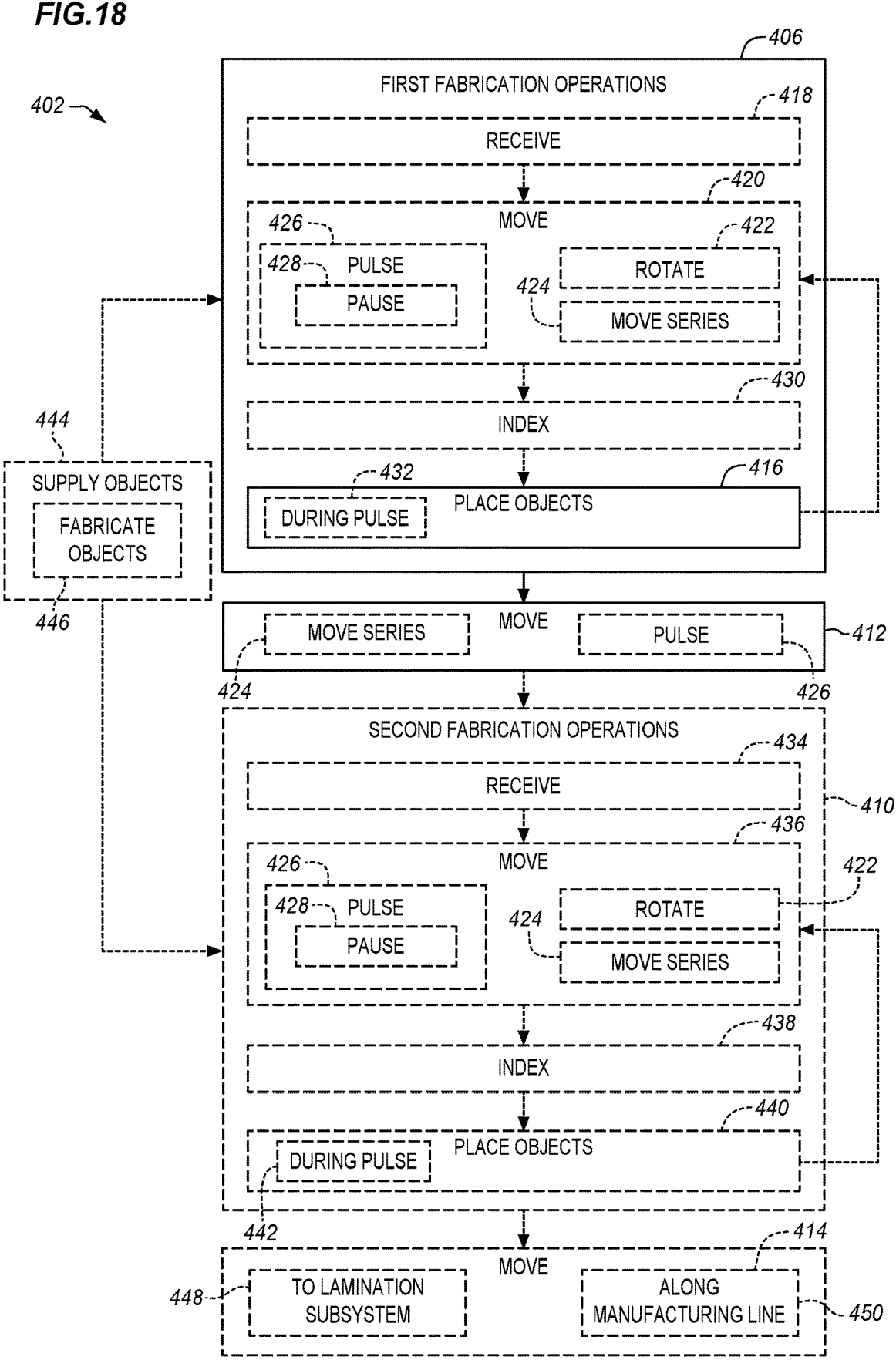
FIG. 18 is a flowchart illustrating a method of fabricating a layup that can be used with the fabrication method shown in FIG. 17.

FIG. 18 is a flowchart illustrating a method to fabricate a layup 402 a layup 14 that can be used with the fabrication method 400 shown in FIG. 17. Referring to FIGS. 1 and 18, to fabricate a layup 402 includes performing first fabrication operations 406 and optionally performing second fabrication operations. After the first fabrication operations 406 are performed, the mandrel 102 is moved 412 to having second fabrication operations 410 performed or is moved 414 to further systems, such as the third subsystem 136 or the hardening system 20. When the first fabrication operations 406 and the second fabrication operations 410 are included in the fabrication 400, the fabrication 400 operations such as first fabrication operations 406, or second fabrication operations 410 can be similar or different, as mentioned above. For the sake of clarity, the following description is based on fabrication 400 operations such as first fabrication operations 406, or second fabrication operations 410 that are similar.

Performing the first fabrication operations 406 includes placing 416 objects 18 on the mandrel 102. Before the placing 416, the mandrel 102 can first be received 418. More specifically, the mandrel 102 is received 418 at the stations 202. When the fabrication system 200 includes the first group 204 and the second group 206 and/or the first subsystem 106 and the second subsystem 108, the mandrel 102 is received 418 at the first group 204 and/or first subsystem 106. When the mandrel 102 is one of a series 124 of mandrels 102, the mandrel 102 is received 418 from the series 124 of mandrels 102 including at least a first mandrel 102a and a second mandrel 102b. For example, the first mandrel 102a is received 418 at the stations 202 and then the second mandrel 102b is subsequently received 418 at the stations 202. Moving 408 the mandrel 102 can result in the mandrel 102 being received 418 at the stations 202.

In one example, when a series 214 of mandrels 102 is used in the fabrication line 100, receiving 418 includes disposing the first mandrel 102a at the component station 210 and disposing the second mandrel 102b at the skin station 214 when the first mandrel 102a is disposed at the component station 210.

Receiving 418 the mandrel 102 may or may not position the mandrel 102 within a station 202. Accordingly, the mandrel 102 can be moved 420 to and/or through one or more stations 202. Even if receiving 418 the mandrel 102 positions the mandrel 102 in a station 202, the mandrel 102 can be moved 420 through the station(s) 202. The moving can be performed by activating the drive system 138 to move 420 the mandrel 102.

When the fabrication system 200 is in the rotary arrangement of FIG. 9, the moving 420 includes rotating 422 the mandrel 102 about a longitudinal axis 254. More specifically, the spindle 252 rotates 422 the full-barrel mandrel 122 about longitudinal axis 254 of the spindle 252 through a plurality of angular positions, such as a first angular position A1, a second angular position A2, and a third angular position A3. The rotating 422 rotates the full-barrel mandrel 122 with respect to the stations 202. In some examples, the full-barrel mandrel 122 is rotated 422 with respect to each station 202 of the first group 204 of stations and each station 202 of the second group 206 of stations.

When the fabrication line 100 includes a series 124 of mandrels 102, as shown in FIG. 6, the series 124 of mandrels 102 is moved 424 through a series of stations 202. Each mandrel 102 of the series 124 moves 424 with respect to the fabrication system 200 in the process direction 22. For example, each mandrel 102 moves 424 from a first station 202 to a second station 202 in the series of stations 202 as the next mandrel 102 moves 424 into the first station 202, and so on. In an example having the first mandrel 102a and the second mandrel 102b, moving 420 includes synchronously moving 424 the first mandrel 102a through the component station 210 and moving 424 the second mandrel 102b through the skin station 214.

The movement 420 can be a continuous movement to or through the station(s) 202. Alternatively, the movement 420 can pulse 426 the mandrel 102 for one or more pulses 226 (shown in FIGS. 6 and 9). When the movement 420 includes pulse 426, the moving 420 includes pause 428 the movement 420 to define each pulse 226. Accordingly, each pulse 226 includes a movement 420 portion and a paused 428 portion. The moving 420 can be the movement time 228 of the takt time 222, and the pause 428 can be the pause time 224 of the takt time 222 (shown in FIG. 6).

For example, the mandrel 102 is pulsed 426 by a length 114 of the mandrel 102 in the process direction 22. More specifically, the mandrel 102 is pulsed 426 (e.g., moved 420) by a distance corresponding to the length 114 of the mandrel 102. Alternatively, the mandrel pulsed 426 (e.g., moved 420) by a distance less than the length 114 of the mandrel 102. Such an example is considered moving 420 the mandrel 102 by micro-pulses. When the fabrication line 100 includes the first subsystem 106 and the second subsystem 108, moving 420 the mandrel 102 includes pulse 426 the mandrel 102 through the first subsystem 106 and pulse 426 the mandrel 102 through the second subsystem 108. For example, the first mandrel 102a is moved 424 in the process direction 22 by one or more pulses 226 to a first station 210 of a group 204 of stations 202.

Moving 420 by pulse 426 includes pause 428 the movement 420 of the mandrel 102 to define each pulse 226. More specifically, pulse 426 includes moving 420 the mandrel by a predetermined distance and pause 428 the moving 420 of the mandrel 102 to define each pulse 226 of the one or more pulses 226. In one example, the moving 420 of the mandrel 102 is paused 428 at the component station 210 and the skin station 214. In such an example, the mandrel 102 can continuing moving 420 at the preform station 212. In another example, the moving 420 of the mandrel 102 is paused 428 at or through the component station 210, the preform station 212, and/or the skin station 214.

When the fabrication line 100 includes the series 124 of mandrels 102, the moving 420 of each mandrel 102 is paused 428 at one or more of the stations 202. Further, each mandrel 102 of the series 124 of mandrels is paused 428 between the instances of moving 420 to define the one or more pulses 226.

When the fabrication system 200 in the rotary arrangement of FIG. 9, rotation 422 of the full-barrel mandrel 122 is paused 428 at each angular position of the plurality of angular positions. Each instance of the rotating 422 and pause 428 defines a pulse 226 of the spindle 252.

After the mandrel 102 is received 418 and/or moved 420 to a subsystem 106 or station 202, the mandrel 102 can be indexed 430 to the subsystem 106 and/or a station 202. The index 430 step can occur during the moving 420 or during pause 428. The index 430 step for each station 202 includes indexing a portion of the mandrel 102 that is within each station 202. Referring to FIGS. 1, 5, and 18, the indexing system 146 is used to index 430 the mandrel 102 to the subsystem 106 and/or the station 202. Accordingly, index 430 step includes engaging the mandrel indexing elements 150 with the system indexing elements 148. For example, index 430 step can include engaging the indexing pins 154 with the indexing cups 152 by receiving the indexing pin 154 in a respective indexing cup 152. Additionally or alternatively, index 430 step can including obtaining information from the identification tag 156 at the identification reader 158. As another option, index 430 step can include engaging the mandrel 102 against a hard stop 160.

More specifically, a portion of the mandrel 102 is indexed 430 to one or more stations 202. 15. In one example, the mandrel 102 the component station 210 and the skin station 214 are indexed 430 with the mandrel 102. In such an example, the mandrel 102 may or not be indexed 430 to the preform station 212. When the mandrel 102 is not indexed 430 to the preform station 212, index 430 step to another station 210 and/or 214 indexes the mandrel 102 to the preform station 212 or the mandrel 102 continues moving 420 with respect to the preform station 212 so is not indexed 430. When the mandrel 102 is indexed 430 to the component station 210 and the skin station 214, index 430 step for each station 210, 214 is performed prior to each of the placing 452 of the components 24 and the placing 456 of the one or more skin layers 28 on the mandrel 102.

When the mandrel is a full-barrel mandrel 122 as shown in FIG. 9, the full-barrel mandrel 122 is indexed 430 to a first angular position of a plurality of angular positions. The plurality of angular positions are aligned with respect to the stations 202. In such an example, index 430 step can be performed using the indexing unit 162.

After the mandrel 102 is moved 420 and/or indexed 430, the objects 18 are placed 416 on the mandrel 102. Specific details of the placing 416 are described with respect to FIG. 19. Placing 416 the objects 18 includes placing components 24, preforms 26, and/or one or more skin layers 28 to the mandrel 102 within the station(s) 202. Accordingly, the placing 416 is performed using the component station 210, the preform station 212, and/or the skin station 214. When the fabrication line 100 includes two subsystems 106, 108, the placing 416 is performed at the first subsystem 106. The components 24, preforms 26, and one or more skin layers 28 are placed 416 on the first zone 126 of the mandrel 102 at the first subsystem 106.

Placing 416 by the component station 210, the preform station 212, and/or the skin station 214 can occur during pause 428 of the mandrel 102. For example, the placing 416 at the first subsystem 106 occurs during pause 428 between the pulse 426 of the mandrel 102 through the first subsystem 106. In one example, the objects 18 are placed 416 on different portions of the mandrel 102 using a station 202 after each pulse 426 of the first mandrel 102 during pause 428 of the pulse 426.

When the series 124 of mandrels 102 is used, the objects 18 are placed 416 on each mandrel 102 of the series 124 during pause 428 between the moving 420 of the one or more pulses 226. As the series 124 of mandrels 102 pulses 426 through the stations 202, the objects 18 are placed 416 on the second mandrel 102b within a station 202 of the first subsystem 106.

When the fabrication system 200 has a rotary arrangement as shown in FIG. 9, placing 416 the objects 18 occurs during 432 each pulse 226 of the spindle 525. More specifically, placing 416 the components 24, preforms 26, and one or more skin layers 28 occurs during pause 428 between the rotating 422 of the spindle 252.

Further, the placing 416 by the component station 210, the preform station 212, and the skin station 214 can occur according to a common takt time 222 for the stations 202 and/or the subsystems 106, 108.

After the objects 18 are placed 416, the mandrel 102 moves 414 for further processes or moves 412 to another subsystem. More specifically, when the fabrication line 100 includes two subsystems 106, 108 or the fabrication system 200 includes two groups such as first group 204, or second group 206 of stations 202, the mandrel 102 moves 412 to the second subsystem 106 or second group 206. The move 412 is similar to the move 420 and/or 408. Accordingly, the mandrel 102 can move 412 via pulse 426 and/or at least one mandrel 102 of the series 124 of mandrels can move 424 to the second subsystem 108 and/or second group 206. For example, the mandrel 102 is moved 412 to the second subsystem 108 assigned to the second zone 128 of the mandrel 128, such as to the lateral portion(s) such as first lateral portion 132, or second lateral portion 134 of the mandrel 102.

Because the second subsystem 108 includes the second group 206 of stations 202, the second group 206 will be referred to below for clarity when describing the second fabrication operations 410. As or after the mandrel 102 moves 412, the second fabrication operation 410 includes receiving 434 the mandrel 102 at the second group 206 of stations 202. The receiving 434 is similar to the receiving 418 at the first group 204 and above description applies.

The mandrel 102 is moved 436 to and/or through the second group 204 of stations 202. The move 436 step is similar to the move 420 step and similar description apply. The move 436 step can include pulse 426 the mandrel 102 through the second subsystem 108.

The second fabrication operations 410 further include placing 440 objects 18 on the mandrel 102 using the second group 206 of stations 202. The placing 440 is similar to the placing 416 and similar descriptions apply, except that the placing 440 is at the second group 206 and/or second subsystem 108 and the placing 416 is at the first group 204 and/or the first subsystem 106.

More specifically, the components 24, the preforms 26, and the one or more skin layers 28 are placed 440 on the second zone 128 of the mandrel 102 at the second subsystem 108. In one example, the placing 440 at the second subsystem 108 occurs during 442 pauses between the pulse 426 of the mandrel 102 through the second subsystem 108. Step 442 is similar to step 432 and similar description applies.

When each mandrel 102 of a series 124 includes a first zone 126 and a second zone 128, the placing includes placing 416, 440 the one or more skin layers 28 on the first zone 128 and the second zone 128 of the first mandrel 102a and placing 416, 440 the preforms 26 on the first zone 126 and the second zone 128 of the first mandrel 102a. In such an example, placing 416 at the first zone 126 and the placing 440 at the second zone 128 can occur at the same time, as described in more detail below.

Referring to FIGS. 1, 6, and 18, as the first fabrication operations 406 are performed and/or the second fabrication operations 410 are performed, the fabrication 400 can include supplying 444 objects 18 and/or materials to the stations 202 using the one or more feeder lines 164. More specifically, material, which can include the objects 18, are supplied 444 to each of the component station 210, 216, the preform station 212, 218, and the skin station 214, 220 by one or more feeder lines 164 for placement 416, 440 onto the mandrel 102. In one example, the material includes at least the components 24, the preforms 26, and the one or more skin layers 18. In certain examples, and depending on the type of station 202, supplying 444 the material includes fabricating 446 the material, such as the objects 18, at each of the one or more feeder lines 164. Specific operations of the types of feeder lines 164 and/or particular feeder lines 166, 168, 170, 172, 174, 176 are described in more detail with respect to FIGS. 6 to 8.

After performing the first fabrication operations 406 and/or performing the second fabrication operations 410, the layup 14 has been fabricated 402 on the mandrel 102. The mandrel 102 with the layup 14 is moved 414 out of the group(s) such as first group 204, or second group 206 and/or the subsystem(s) 106, 108. More specifically, the mandrel 102 with the layup 14 is moved 448 to a lamination subsystem, such as the third subsystem 136, to perform the lamination method 404 or is moved 450 along the manufacturing line 10 to perform the manufacturing method 302.

An example method fabricating a half-barrel section 670, or full-barrel section 676 of a fuselage 666 includes moving 420 a mandrel 102 to a first subsystem 108 assigned to a first zone 126 of the mandrel 102. The first zone 126 can include a crown portion 130 of the mandrel 102. Components 24, preforms 26, and one or more skin layers 28 placed 416 on the first zone 126 at the first subsystem 106. The mandrel 102 is then moved 412 to a second subsystem 108 assigned to a second zone 128 of the mandrel 102. The second zone 128 can includes a lateral portion such as first lateral portion 132, or second lateral portion 134 of the mandrel. The components 24, the preforms 26, and the one or more skin layers 28 are placed 440 on the second zone 128 at the second subsystem 108.

Figure 19:
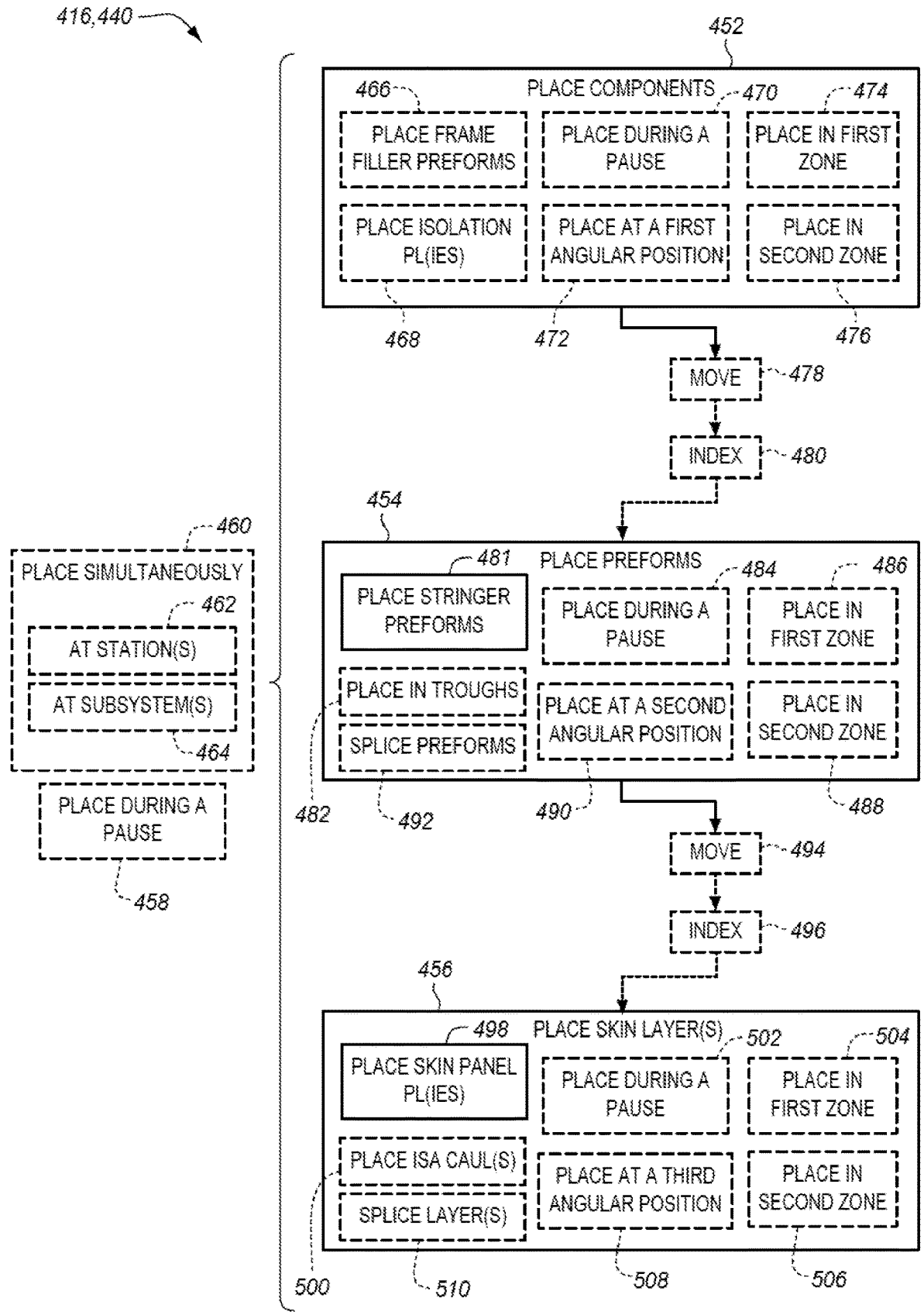
FIG. 19 is a flowchart illustrating a method for placing objects that can be used with the method of FIG. 18.

FIG. 19 is a flowchart illustrating a method for placing 416, 440 objects 18 that can be used with the method of FIG. 18. The method can be used as the placing 416 with a single group 204 and/or single subsystem 106 or a first group 204 and/or first subsystem 106. The method can also be used as the placing 440 using the second group 206 and/or second subsystem 108. For clarity the group 204 having the stations 210, 212, and 214 will be used in the description below; however, it should be understood the description also applies to the group such as second group 206 having the stations 216, 218, and 220. Any difference between the uses with the groups such as first group 204, or second group 206 will be noted. Examples using the method(s) at each group such as first group 204, or second group 206 will also be described.

Placing 416, 440 objects 18 includes placing 452 components 24, placing 454 preforms 26, and placing 456 one or more skin layers 28 on the mandrel 102 at one or more stations 202. In some examples, the mandrel 102 is moved between stations 202 to perform the placing 452, 454, and/or 456. In other examples, the stations 202 perform the placing 452, 454, and 456 without moving the mandrel 102 between one or more stations 202. Further, the placing 452, 454, and/or 456 can occur during 458 pausing of the mandrel 102 during each pulse 226, as described above with respect to steps 432, 442. The pause 428 and pulse 426 of the mandrel 102 are described with respect to FIG. 18.

When the fabrication line 100 includes the series 124 of mandrels 102, the stations 202 perform the placing 452, 454, and/or 456 during 458 the pause 428 of each mandrel 102 of the series 124 of mandrels according to a common takt time 222. Additionally or alternatively, placing 452 the components 24 and placing 456 the one or more skin layers 28 occurs simultaneously 460 during the pause 428 between move 420, and move 436 steps of one or more mandrels 102.

Placing 458 during pause 428 of the pulses 226 can result in the objects 18 being placed simultaneously 460. For example, the objects 18 are placed simultaneously 460 at different stations 202 and/or at different subsystems 106, 108. In an example of placing simultaneously 462 at different stations 202, components 24 are placed 452 at the component station 210 as preforms 26 are placed 454 at the preform station 212 and/or as one or more of skin layers are placed 456 at the skin station 214.

In an additional or alternative example that can be used with the series 124 of mandrels 102, the objects 18 are placed 464 simultaneously on the first mandrel 102a at the first subsystem 106 and the second mandrel 102b at the second subsystem 108. Further, placing simultaneously 462 at different stations 202 can include placing 456 one or more of skin layers 28 or placing 454 the preforms 26 on the first mandrel 102a at the second station 212 or 214 occurs simultaneously 460 as placing 452 the components 24 on the second mandrel 102b at the first station 210.

When the fabrication system 200 is in the rotary arrangement, placing 452 the components 24, placing 454 the preforms 26, and placing 456 the one or more skin layer occurs during 458 pause 428 between the rotating 422 of the spindle 252, as described with respect to FIGS. 9 and 18. More specifically, placing 452 the components 24, placing 454 the preforms 26, and placing 456 the one or more skin layers 28 occurs during 458 each pulse 226 of the spindle 252. For example, the components 24 are placed 452 at the component station 210 and one or more of skin layers 28 are placed 456 at the skin station 214 simultaneously 460 during or after rotating 422. In other words, placing 452 the components 24 and the placing 456 one or more of skin layers 28 occurs simultaneously 460 while the first mandrel 102a is disposed at the component station 210 and the second mandrel 102b is disposed at the skin station 216.

When the mandrel 102 moves as in move 420, or move 436 steps continuously instead of being pulsed 426, of objects 18 are placed simultaneously 460 as the mandrel 102 as in move 420, or move 436 steps rather than when the mandrel 102 is paused 428.

Components 24 are placed 452 on the mandrel 102 at the component station 202. Placing 452 includes placing 466 at least frame filler preforms 36 on the mandrel 102. As discussed above, the components 24 can include isolation plies 32 and frame filler preforms 36. Accordingly, placing 452 can include placing 468 isolation plies 32 and placing 466 the frame filler preforms 36. In such an example, the isolation plies 32 are placed 468 on the mandrel 102, and then the frame filler preforms 36 are placed 466 on the isolation plies 32. Further, the components 24 can be placed 452 during 470 pause 428 of the mandrel 102, as discussed above with respect to steps 432, 442, and/or 458.

When the fabrication system 200 is in the rotary arrangement, the placing 452 includes placing 452 the components 24, including isolation plies 32 and/or frame filler preforms 36, on the full-barrel mandrel 122 using a component station 210. Placing 472 components 24 on the full-barrel mandrel 122 can occur at the first angular position A1 of the spindle 252.

When the mandrel 102 includes two or more zones such as first zone 126, and second zone 128, the components 24 are placed 474 on the first zone 126 by placing 468 isolation plies 32 and placing 466 frame filler preforms 36 at the first component station 210. Similarly, the components 24 are placed 476 on the second zone 128 by placing 468 isolation plies 32 and placing 466 frame filler preforms 36 at a second component station 216. In such an example, placing 452 the components 24 can include placing 474 the components 24 on the first zone 126 of the mandrel 102 by moving the end effectors 232, 236 at the gantry 260 at the component station 210, as shown, for example, in FIG. 10. Similarly, placing 452 the components 24 can include placing 476 the components 24 on the second zone 128 of the mandrel 102 by moving the end effectors 234, 238 attached to robotic arm(s) 272 at the component station 216, as shown, for example, in FIG. 11.

The mandrel 102 can be moved 478 to the preform station 212. The move 478 is similar to the move 420, or move 436 steps and the previous description applies to the move 478 between the component station 210 and the preform station 212. For example, the move 478 can include a pulse 426 of the mandrel 102 to the next station 202 (e.g., the preform station 212). When the series 124 of mandrels 102 is used, the first mandrel 102a is moved 478 by one or more pulses to a second station 202 of the group 204 of stations 202 while the second mandrel 102a is moved 420, 436 by one or more pulses to the first station 202. For example, the first mandrel 102a is moved 478 by one or more pulses to the preform station 212 or the skin station 214 while the second mandrel 102a is moved 420, 436 by one or more pulses to the component station 210.

After or during the move 478, the mandrel 102 can optionally be indexed 480 to the preform station 212. The index 480 is similar to index 430, or index 438 steps described with respect to FIG. 18 and the previous description applies to the index 480 to the preform station 212. The index 480 can be omitted when index 430, or index 438 steps to the component station 210 and/or subsystem 106, 108 indexes 430, 438 the mandrel 102 to the remainder of the stations 202.

Preforms 26 are placed 454 on the mandrel 102 at the preform station 212. The preforms 26 are placed 454 by moving end effectors 240, 242 and the preform station 212. As discussed above, the preforms 26 are configured to become support structures of the fuselage 666, such as stringers 678. Accordingly, placing 545 the preforms 26 includes placing 481 stringer preforms 38 on the mandrel 102. More specifically, the preforms 26, and stringer preforms 38 are placed 482 into the troughs 116 of the mandrel 102. In one example, the preforms 26 are placed 482 into troughs 116 of the full-barrel mandrel 122. Further, the preforms 26 can be placed 454 during 484 pause 428 of the mandrel 102, as discussed above with respect to steps 432, 442, and/or 458. Alternatively, the preforms 26 can be placed 454 as the mandrel 102 continues moving 420 to the next station 202, such as the skin station 214.

The preforms 26 are placed 454 are the mandrel 102 using the preform station 212. When the mandrel 102 includes two or more zones such as first zone 126, and second zone 128, the preforms 26 are placed 486 on the first zone 126 and placed 488 on the second zone 128. More specifically, the preforms 26 are placed 486 on the first zone 126 by placing 454 stringer preforms 38 at a first preform station 212 positioned after the first component station 210. Similarly, the preforms 26 are placed 488 on the second zone 128 by placing 454 stringer preforms 38 at a second preform station 218 positioned after the second component station 216.

When the fabrication system 200 is in the rotary arrangement of FIG. 9, placing 454 the preforms 26 includes placing 490 preforms 26 on the full-barrel mandrel 122 at the second angular position A2 of the spindle 252. For example, stringer preforms 38 are placed 481, 490 on the full-barrel mandrel 122 using a preform station 212.

When short stringer preforms 40 are placed 481, as shown in FIG. 12, placing 454 the preforms 26 can include a splice 492 of the preforms 26 together. More specifically, first short preforms 40 are placed 481 on to the mandrel 102. For example, each of the first preform station 212a, second preform station 212b, and third preform station 212c places 481 a set 48 of short stringer preforms 40 on a zone such as first zone 126, and second zone 128 of the mandrel 102. In a particular example, each first preform station 212a, second preform station 212b, and third preform station 212c places 481 a set 48 of short stringer preforms 40 on two or more longitudinal portions 186a, 186b, 186c of a particular zone such as first zone 126, and second zone 128 of the mandrel 102.

The first preform station 212a places 481 a first set 48a of short stringer preforms 40 on the first longitudinal portion 186a of the mandrel 102. The second preform station 212b places 481 a second set 48b of short stringer preforms 40 adjacent the first set 48a of short stringer preforms 40 such that the second set 48b of short stringer preforms 40 slightly overlap the first set 48a of short stringer preforms 40 to splice 492 the each preform of preforms 26 of the second set 48b to a respective preform 26 of the first set 48a. More specifically, the overlap can create a scarf splice or a lap splice as the splice 492 between each short stringer preform 40 of the first set 48a and a respective short stringer preform 40 of the second set 48b. Similarly, the third preform station 212c places 481 a third set 48c of short stringer preforms 40 adjacent the second set 48b of short stringer preforms 40 such that the third set 48c of short stringer preforms 40 slightly overlap the second set 48b of short stringer preforms 40 to splice 492 the preforms 26.

Accordingly, the steps 402, 416, 440, 454 include a splice 492 of the preforms 26 on the first zone 128 and/or first longitudinal portion 186a together with the preforms 26 on the second zone 128 and/or the second longitudinal portion 186b. This example can apply when the first zone 126 is the first longitudinal portion 186a and the second zone 128 is the second longitudinal portion 186b.

The mandrel 102 can be moved 494 to the skin station 214. The move 494 is similar to move 420, or move 436 steps and the previous description applies to the move 494 between the preform station 212 and the skin station 214. For example, the move 494 can include a pulse 426 of the mandrel 102 to the next station 202 (e.g., the skin station 214). When the series 124 of mandrels 102 is used, the first mandrel 102a is moved 494 by one or more pulses to a third station 202 of the group 204 of stations 202 while the second mandrel 102a is moved 420, 436 by one or more pulses to the second station 202. For example, the first mandrel 102a is moved 494 by one or more pulses to the skin station 214 while the second mandrel 102a is moved 478 by one or more pulses to the preform station 212.

After or during the move 494, the mandrel 102 can optionally be indexed 496 to the skin station 214. The index 496 is similar to the index steps 430, 438 described with respect to FIG. 18 and the previous description applies to the index 496 to the skin station 214. The index 496 can be omitted when executing index 430, or index 438 steps to the component station 210 and/or subsystem 106, 108 indexes 430, 438 the mandrel 102 to the remainder of the stations 202.

One or more skin layers 28 are placed 456 on the mandrel 102 at the skin station 214. One or more of skin layers 28 cover at least the components 24 when the skin layer(s) is placed 456. One or more of skin layers 28 can be placed 465 over the components 24 and the preforms 26 to create the layup 14 on the mandrel 102. In some examples, the steps 402, 416, 440 includes placing 454, 456 the one or more skin layers 28 or the preforms 26 on the first mandrel 102 at the second station 212, 214.

To place 454 one or more of skin layers 28, one or more skin panel plies 34 are placed 498 onto the mandrel 102 to form the one or more skin layers 28. More specifically, one or more skin panel plies 34 are laid up or placed 498 on the mandrel 102 as the IML ply of skin panel plies 34 and additional skin plies 34 are laid up on the IML ply to form one or more of skin layers 28.

When placing 454 one or more of skin layers 28 includes the ISA cauls 30, placing 454 includes placing the ISA cauls 30 on the mandrel 102 and then placing the skin panel plies 34. For example, the ISA cauls 30 are placed 500 on the mandrel 102 with respect to the preforms 26, such as at the ends of the preforms 26. The skin panel plies 34 and then laid up or placed 498 over the preforms 26 and components 24 with respect to the ISA cauls 30. Further, one or more of skin layers 28 can be placed 456 during 502 pause 428 of the mandrel 102, as discussed above with respect to steps 432, 442, and/or 458. For example, the ISA caul of ISA cauls 30 and the skin panel pl(ies) can be placed during 502 pause 428 of the mandrel 102 at the skin station 214.

One or more of skin layers 28, such as the ISA cauls 30 and/or the skin panel pl(ies) 34, are placed 456 are the mandrel 102 using the skin station 214. When the mandrel 102 includes two or more zones such as first zone 126, and second zone 128, one or more of skin layers 28 are placed 456 on the first zone 126 by placing 504 skin panel plies 34 at a first skin station 214 positioned after the first preform station 212. For example, one or more of skin layers 28 are placed 504 on the first zone 126 of the mandrel 102 by moving end effectors 232, 244 at a gantry 260 of the first skin station 214, as shown in FIG. 10. Similarly, one or more of skin layers 28 are placed 456 on the second zone 128 by placing 506 skin panel plies 34 at a second skin station 220 positioned after the second preform station 218. For example, one or more of skin layers 28 are placed 506 on the second zone 128 of the mandrel 102 by moving end effectors 234, 246 attached to robotic arms 272 at the skin station 220.

When the fabrication system 200 is in the rotary arrangement of FIG. 9, placing 456 includes placing 508 one or more skin layers 28 on the full-barrel mandrel 122 at the third angular position A3 of the spindle 252. In such an example, one or more of skin layers 28 are placed 508, 504, 506 on the first zone 126 and the second zone 128 of the full-barrel mandrel 122.

Placing 456 the skin layer(s) 28 can include splicing 510 one or more of skin layers at adjacent zones such as first zone 126, and second zone 128 and/or crown portion 130, first lateral portion 132, and/or second lateral portion 134, 186. While the splicing 510 could occur at either group such as first group 204, or second group 206 of stations 202, the examples are focus on the splicing 510 occurring at the second skin station 220. The splicing 510 can also be performed by multiple skin stations 220 assigned to the second zone 128, similar to the multiple preform stations 212, 218 shown in FIG. 12. Longitudinal splices 278 (shown in FIGS. 13 and 14) at the second skin station 220 are described for clarity.

Referring to FIGS. 13, 14, and 19, the steps 402, 416, 440, 456 include splicing 510 the one or more skin layers 28 on the first zone 126 together with the one or more skin layers 28 on the second zone 128. More specifically, skin panel plies 34 at the first zone 126 of the mandrel 102 are spliced 510 to skin panel plies 34 at the second zone 128 of the mandrel 102. For example, skin panel plies 34 at the first zone 126, such as a crown portion 130, of the mandrel 102 are overlapped with skin panel plies 34 at the second zone 128, such as a lateral portion such as first lateral portion 132, or second lateral portion 134, of the mandrel 102 to splice 510 to one or more of skin layers 28.

When the fabrication system 200 is in the rotary arrangement of FIG. 9, skin panel plies 34 at the first zone 126 of the full-barrel mandrel 122 are spliced 510 to skin panel plies 34 at the second zone 128 of the full-barrel mandrel 122 during the placing 456 of the one or more skin layers 28. For example, skin panel plies 34 placed on the full-barrel mandrel 122 by the skin station 214 are spliced 510 to prior skin panel plies 34 placed by the skin station 214.

The method 400 can include any suitable number and combination of the steps of 402, 416, 440 described above. In one example of the method 400, the method 400 includes receiving 418 a mandrel 102 at the stations 202, placing 452 components 24 on the mandrel 102 at the component station 210, 216, a move 478 the mandrel 102 to a preform station 212, 218, placing 454 preforms 26 on the mandrel 102 at the preform station 212, 218, a move 494 of the mandrel 102 to a skin station 214, 220, and placing 456 one or more skin layers 28 on the mandrel 102 at the skin station 214, 220 so the one or more skin layers 28 cover at least the components 24.

In another example combination, when a series 124 of mandrels 102 including at least a first mandrel 102a and a second mandrel 102b are used with the fabrication line 100, the method 400 includes moving 424 the first mandrel 102a in a process direction 22 by one or more pulses 226, 426 to a first station 210, 202 of a group such as first group 204, or second group 206 of stations 202, executing index 430, or index 438 steps a portion of the first mandrel 102a to the first station 210, placing 416, 440 objects 18 including components 24, preforms 26, and/or one or more skin layers 28 on the mandrel 102 within the first station 210, 202, moving 424 the first mandrel 102a by one or more pulses 226, 426 to a second station 212, 214, 202 of the group such as first group 204, or second group 206 of stations 202 while the second mandrel 102b is moved by one or more pulses 226, 426 to the first station 210, 202.

In still another example combination of steps, when the fabrication system 200 has the rotary configuration of FIG. 9, the method 400 includes rotating 422 a full-barrel mandrel 122 about a lengthwise axis 254 of a spindle 252 through a plurality of angular positions including at least a first angular position A1, a second angular position A2, and a third angular position A3, placing 472 components 24 on the full-barrel mandrel 122 at the first angular position A1 of the spindle 252, placing 490 preforms 26 on the full-barrel mandrel 122 at the second angular position A2 of the spindle 252, and placing 508 one or more skin layers 28 on the full-barrel mandrel 122 at the third angular position A3 of the spindle 252.

FIG. 20 is a flowchart illustrating a lamination method 404 that can be used with the methods 300 and/or 400 shown in FIGS. 16 to 18. The lamination method 404 can performed with the fabrication line 100 includes the third subsystem 136 and/or the fabrication system 200 includes the third group 208 of stations 200.

Referring to FIGS. 15 and 20, the lamination method 404 can be performed after the mandrel 102 is moved 414, 448 to the lamination subsystem, which is the third subsystem 136. As or after the mandrel 102 is moved 414, 448, the mandrel 102 is positioned in the automated fiber placement (AFP) station 280. The mandrel 102 can be indexed 512 to the third subsystem 136 and/or the AFP station 280 as described with respect to index 430, or index 438 steps.

The lamination method 404 includes a perform AFP 514 step to fabricate the additional skin 52 on a layup 14 on the mandrel 102. In one example, the perform AFP 514 step is performed by an AFP machine 281 that fabricates 516 the additional skin 52 by laying up plies of the unhardened fiber-reinforced material 16 on the layup 14 to thicken layers that will become the skin 682 of the fuselage 666 (see FIG. 23). The AFP can be performed 514 during 518 a pause 428 in the movement 414 of the mandrel 102, as discussed above with respect to steps 432, 442, and/or 458.

The mandrel 102 can be moved 520 from the AFP station 280 to one or more electrical protection stations 282. The move 520 is similar to the move 420, or move 436 steps as described with respect FIG. 18 and the previous description applies to the move 520 from the AFP station 280 to the electrical protection station 282.

After or during the move 520, the mandrel 102 can optionally be indexed 522 to the electrical protection station 282. The index 522 step is similar to index 430, or index 438 steps described with respect to FIG. 18 and the previous description applies to the index 522 step to the electrical protection station 282. The index 522 step can be omitted when indexing 512 to the AFP station 280 and/or a subsystem indexes 430, 438 the mandrel 102 to the remainder of the stations 202.

The lamination method 404 further includes placing 524 an electrical protection layer 54 on the additional skin 52. The electrical protection station 282 places 524 the electrical protection layer 54 on the additional skin 52. When the third subsystem 136 includes a plurality of electrical protection stations 282, the electrical protection layer 54 is placed 526 at the plurality of electrical protection stations 282 zone-by-zone. More specifically, each of the electrical protection stations 282 is assigned to a particular zone such as first zone 126, and second zone 128 of the mandrel 102, and the placement 526 is similar to the placement 456 of one or more of skin layers 28 described with respect to FIG. 19. The placement 524 of the electrical protection layer 54 can occur during 528 one or more pauses of the pulses 226, as discussed above with respect to steps 432, 442, and/or 458.

The mandrel 102 can be moved 530 from the electrical protection station(s) 282 to one or more surface ply stations 284. The move 530 is similar to the move 420, or move 436 steps and the previous description applies to the move 530 from the electrical protection station 282 to the surface ply station(s) 284. After or during the move 530, the mandrel 102 can optionally be indexed 532 to the surface ply station 284. The index 532 step is similar to index 430, or index 438 steps and the previous description applies to the index 532 step to the surface ply station 284.

At the surface ply station(s) 284, one or more surface skin plies 56 are placed 534 over the electrical protection layer 54. The placement 534 includes placing 536 an OML ply of the skin 682 of the fuselage 666. When the third subsystem 136 includes a plurality of surface ply stations 284, the surface skin plies 56 are laid up or placed 538 at the plurality of surface ply stations 284 zone-by-zone. More specifically, each of the surface ply stations 284 is assigned to a particular zone such as first zone 126, and second zone 128 of the mandrel 102, and the placement 538 is similar to the placement 456 of one or more of skin layers 28 described with respect to FIG. 19.

Accordingly, placing 534 the surface skin plies 56 can also include splicing 540 together the surface skin plies 56 in different zones such as first zone 126, and second zone 128 or portions 186 of the mandrel 102. The splicing 540 of the surface skin plies 56 can be similar to the splicing 510 of one or more of skin layers 28 described with respect to FIG. 19 and the description above applies to splicing 540. Further, the placement 534 of the surface skin plies 56 can occur during 542 one or more pauses of the pulses 226, as discussed above with respect to steps 432, 442, and/or 458. After placement 534 of the surface skin plies 56, the layup 14 has become the unhardened part 50.

The mandrel 102 can be moved 544 from the surface ply station 284 to bagging station 286. The moving 544 is similar to move 420, or move 436 steps and the previous description applies to the move 544 from the surface ply station(s) 284 to the bagging station 286. After or during the move 544, the mandrel 102 can optionally be indexed 546 to the bagging station 286. The index 546 step is similar to index 430, or index 438 steps and the previous description applies to the index 546 step to the surface ply station 284.

The method 404 includes preparing 548 the unhardened part 50 for hardening. More specifically, the unhardened part 50 is prepared 548 by placing a caul 58 and/or bag 60 over the mandrel 102. For example, the caul 58 is placed 550 by positioning caul plates on the unhardened part 50. The bag 60 is then placed 552 over the caul 58 and the unhardened part 50. Vacuum pressure can be applied to the bag 60 before moving 414 the bagged, unhardened part 50 along the manufacturing line 10. After the unhardened part 50 is prepared 548, the mandrel 102 can be moved 450 to the hardening system 20 to form the composite part 12.

ILLUSTRATIVE METHOD EXAMPLES

Example 1

Illustrative details of the operation of fabrication line 100 will be discussed with regard to FIGS. 1, 18, and 19. Assume, for this embodiment, that an arcuate mandrel 102 has just been utilized to fabricate a composite part 12. The composite part 12 has been demolded from the arcuate mandrel 102, and the arcuate mandrel 102 has been cleaned. The arcuate mandrel 102 is therefore ready to enter the fabrication line 100 to receive a layup 14 for another composite part 12.

The steps of this example are described with reference to the fabrication line 100 of FIGS. 1, 2, 7, and 8, but those skilled in the art will appreciate that the method may be performed in other systems.

The mandrel 102 is received 418 at the fabrication line 100. The mandrel 102 includes troughs 116 for receiving preforms 26 (i.e., stringer preforms 38). In one embodiment, step 418 includes placing the mandrel 102 into a clean room environment or onto the track 140. The mandrel 102 is moved 420 to the component station 210 and indexed 430 to the component station 210. For example, the mandrel 102 may move 420 until reaching the component station 210 or may move 420 until the mandrel 102 mates with system indexing elements 148 (shown in FIG. 5) at the component station 210. Index 430 step can be performed as part of the end of a pulse 226 or at the start of a pause 428, and informs a station 202 of the 3D characteristics within the purview of that particular station 202. The characteristics permit differing half-barrel sections 670 arrange serially to be worked upon by the same stations 202 in succession. Index 430 step further allows for work to be performed on upper or lower, forward or aft sections of an aircraft model, or from model to model.

The component end effectors 236 apply fiber reinforced components 24 (e.g., isolation plies 32 (e.g., fiberglass plies) and frame filler preforms 36) to the mandrel 102 at the component station 210 (e.g., at a crown portion 130). The isolation plies 32 serve to isolate carbon fiber plies from aluminum components that will be placed in the fuselage 666. Therefore, the isolation plies 32 need not cover the entirety of the mandrel 102, but rather are placed where aluminum components will be positioned in order to block possible galvanic issues between carbon based material and aluminum structure.

The frame filler preforms 36 provide pad-ups for receiving frames 680 during assembly, thereby providing an even surface for alignment and installation of the frames 680 after the half-barrel section 670, or full-barrel section 676 of the fuselage 666 has been hardened 304 and de-molded. The frame filler preforms 36 are located in places that permit less complex geometry in the mating sections of the frames 680. The end effectors 236 are operated at the direction of programs, such as NC programs stored in the controller 104 and place the components 24 in predefined locations (e.g., to within the desired fraction of an inch) along the mandrel 102.

The mandrel 102 is moved 478 to the preform station 212. Move 478 may include driving the mandrel 102 along the track 140 or operating a drive system 138 for the track 140 to move 478 the mandrel 102. In some embodiments, this further includes index 430 step the mandrel 102 to a station 202 as discussed above.

The preform end effectors 242 of the preform station 212 place 454 preforms 26 for support structure (e.g., stringer preforms 38) in the troughs 116 at (e.g., at a crown portion 130 of) the mandrel 102. In one embodiment, the end effectors 242 pick and place the stringer preforms 38 into the troughs 116 in accordance with a program, such as an NC program, stored at the controller 104.

The mandrel 102 is moves 494 to the skin station 214. The move 494 is performed in a similar manner to move 478 above.

The skin end effectors 244 at the skin station 214 place 456 one or more skin layers 28 that cover the components 24. The skin panel plies 34 are supplied via the skin feeder line 174 just in time to the skin station 214. The skin panel plies 34 may be applied via AFP techniques, Automated Tape Layup Machines (ATLMs), or via pick and place methods. The skin panel plies 34 cover the stringer preforms 26 and structurally unite the stringer preforms 26. This means that after hardening 304, the stringer preforms 38 and the skin panel plies 34 form an integral whole. After laying up the skin panel plies 34, the end effectors 244 place 500 an ISA caul of ISA cauls 30 on the mandrel 102 (e.g., at a crown portion 130 thereof). The skin panel plies 34 unite the various components 24 and/or preforms 26 discussed previously into a single integral whole (e.g., the layup 14 of FIGS. 1, 7, and 8) and may for example span an entire arc defined by the mandrel 102. The ISA caul of ISA cauls 30 covers the skin panel plies 34 and facilitates compaction and/or hardening of the layup 14. The layup 14 is bagged 552, compacted, and prepared 548 for placement into the hardening system 20.

The steps described above are then repeated for the second component station 216, the second preform station 218, and the second skin station 220 to place objects 18 on the lateral portions such as first lateral portion 132, or second lateral portion 134 of the mandrel 102, and these repeated steps may be performed synchronously or asynchronously with steps for the crown portion 130.

The layup 14, including the isolation plies 32, frame filler preforms 36, stringer preforms 38, and skin panel plies 34, is hardened 304 into an integral composite part 12. In one embodiment, the hardening 304 is performed by inserting the mandrel 102 into the hardening system 20 and operating the hardening system 20 at apply heat and pressure to consolidate and harden the layup 14 into a desired shape. The mandrel 102 then exits the hardening system 20 (e.g., by proceeding into a non-clean room environment) and the composite part 12 is demolded from the mandrel 102. The mandrel 102 then proceeds to cleaning and may return for processing of another layup 14.

The method of Example 1 provides a technical benefit over prior systems because it enables a large number of mandrels 102 to be processed in series via specialized work stations 202. Furthermore, because the mandrel 102 is indexed to each station 202 after each pulse 226, there is no need for time-consuming scanning processes to be performed on the mandrel 102 during fabrication operations. That is, there is no need to scan after each pulse 226 (e.g., each micro pulse of the mandrel 102 by less than its length 114) and then provide the scan data to the station(s) 202 that have previously scanned sections of the mandrel 202 within their purview. This can increase throughput, which in turn reduces labor and enhances efficiency of the fabrication operations.

Example 2

Example 1 is a method for fabricating an arcuate half-barrel section 670, or full-barrel section 676 of a fuselage 666 (shown in FIG. 23) in an illustrative embodiment. The mandrel 102 is moved 420 to at least one crown station, for example a Zone 1 station 258. Components 24, preforms 26 for support structure, and one or more of skin layers 28 are placed 416 on a crown portion 130 of the mandrel 102 at the at least one crown station 258. The mandrel 102 is moved 412 to at least one lateral station, for example a Zone 2 station 268. Fiber-reinforced components 24, preforms 26 for support structure, and one or more skin layers 28 are placed 440 on a lateral portion such as first lateral portion 132, or second lateral portion 134 of the mandrel 102 at the at least one lateral station 268.

In a further embodiment, the at least one crown station 258 and the at least one lateral station 268 perform the placing 416, 440 during pauses in movement 420 of the mandrel 102. In a further embodiment, placing 416 the fiber-reinforced components 24 on the crown portion 130 includes placing 468 isolation plies 32 and placing 466 frame filler preforms 36 at a component station 210, placing the preforms 26 for support structure on the crown portion 130 includes placing 481 stringer preforms 38 at a preform station 212 disposed downstream of the component station 210, and placing 498 the skin layers 28 on the crown portion 130 includes placing 498 the skin panel plies 34 at a skin station 214 disposed downstream of the preform station 212. In a still further embodiment, placing 440 the fiber-reinforced components 24 on the lateral portion such as first lateral portion 132, or second lateral portion 134 includes placing 468 isolation plies 32 and placing 466 frame filler preforms 26 at a component station 216, placing 454 the preforms 26 on the lateral portion such as first lateral portion 132, or second lateral portion 134 includes placing 481 stringer preforms 38 at a preform station 218 disposed downstream of the component station 216, and placing 456 the skin layers 28 on the lateral portion such as first lateral portion 132, or second lateral portion 134 includes placing 498 the skin panel plies 34 at a skin station 220 disposed downstream of the preform station 218.

Example 3

Example 2 is a method for fabricating an arcuate half-barrel section 670, or full-barrel section 676 of a fuselage 666 (shown in FIG. 23) in an illustrative embodiment. A mandrel 102 is pulsed 426 in a process direction 22. A portion of the mandrel 102 is indexed 430 within the purview of a first station 20, 210 to the first station 202, 210. At least one of fiber-reinforced components 24, preforms 26, or skin layers 28 are placed 416 on the mandrel 102 within the first station 202, 210. The mandrel 102 is pulsed 426 to a second station 202, 212, 214 while another arcuate mandrel 102 is pulsed 426 to the first station 202, 210.

In a further embodiment, the mandrel 102 is pulsed 426 by a distance corresponding to its length 114, or the mandrel 102 is pulsed 426 by a distance less than its length 114 in a micro pulse. The first station 202, 210 works on different portions of the same layup 14 during the pause after each pulse. In a further embodiment, multiple stations 202 work at the same time on multiple mandrels 202 during pauses between pulses. In a still further embodiment, placing 452 components 24 includes placing 468, 466 isolation plies 32 and frame filler preforms 36, and placing 454 the preforms 26 includes placing 481 stringer preforms 38.

Example 4

Example 4 is a method for fabricating a full-barrel section 676 of a fuselage 666 (shown in FIG. 9) in an illustrative embodiment. A full-barrel mandrel 122 is rotated 422 about a longitudinal axis 254 of a spindle 252. The components 24 are placed 472 on the full-barrel mandrel 122 at a first angular position A1 of the full-barrel mandrel and spindle 252. In one embodiment, placing 472 the components 24 includes placing 468, 466 isolation plies 32 and frame filler preforms 26.

Preforms 26 are placed 490 on the full-barrel mandrel 122 at a second angular position A2 of the full-barrel mandrel 122 and spindle 252. In one embodiment, placing 490 the preforms 26 includes placing 481 stringer preforms 38. In a further embodiment, placing 481 the stringer preforms 38 includes placing 482 the stringer preforms 38 into troughs 116 at the full-barrel mandrel 122. One or more of skin layers 28 are placed 508 on the full-barrel mandrel 122 at a third angular position A3 of the full-barrel mandrel 122 and spindle 252. In one embodiment, the full-barrel mandrel 122 is pulsed 426 by less than a full rotation at a time, such as from position A1 to position A2, and placing 472 the components 24 includes placing 468, 466 isolation plies 32 and frame filler preforms 36, placing 481 stringer preforms 38, and placing 498 skin panel plies 34 occurs during pause 428 between pulses 226 in rotation 422 of the mandrel 122.

In a further embodiment, Example 4 also includes splicing 510 one or more of skin layers 28 of succeeding third angular position A3 by placing 508 skin panel plies 34 on the full-barrel mandrel 122 to skin panel plies 34 of a prior placed 508 third angular position A3, placed 508 during a prior third angular position A3 placement 508, on the full-barrel mandrel 122. The full-barrel mandrel 122 is rotated 422 as shown in FIG. 9, in a clockwise direction by a pulse 226 during the fabrication 400. Another embodiment, not shown has the full-barrel mandrel 122 rotated 422 in a counterclockwise direction during the fabrication 400. The full-barrel mandrel 122 rotates in a pulse 226 of a fraction of the entire circumference 118. As shown, the full-barrel mandrel 122 is rotated 422 by a pulse of 226 which is about 60 degrees to accommodate first angular position A1, second angular position A2, third angular position A3. Each of the first angular position A1, second angular position A2 and third angular position A3 is an angular equivalent of a station 202. Another embodiment has pulses of varying angular rotation pulses of pulse 226 of less than about 60 degrees. Another embodiment has pulses of varying angular rotation pulses of pulse 226 of more than about 60 degrees.

Example Implementation

In the following examples, additional processes, systems, and methods are described in the context of a fabrication system, such as the fabrication system 200, for fabricating airframe components.

Figure 21:
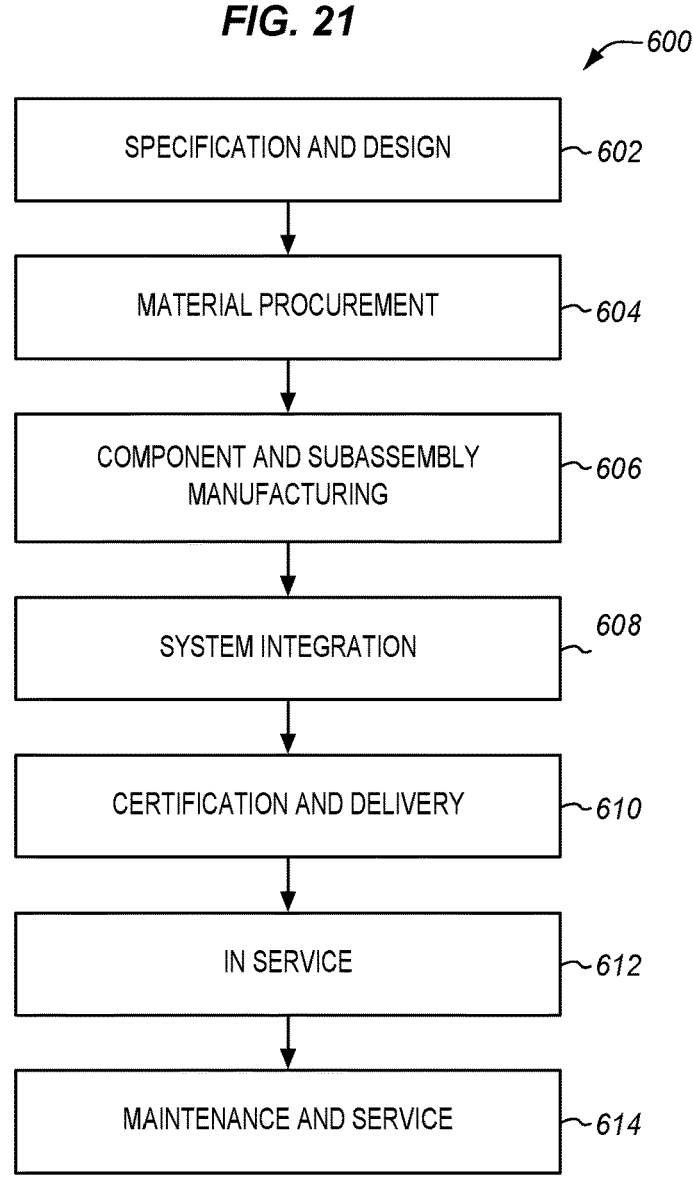
FIG. 21 is a flowchart illustrating an aircraft production and service method in which the manufacturing line and/or fabrication system shown in FIGS. 1 to 15 and/or the method shown in FIGS. 16 to 20 can be used in an illustrative embodiment.
Figure 22:
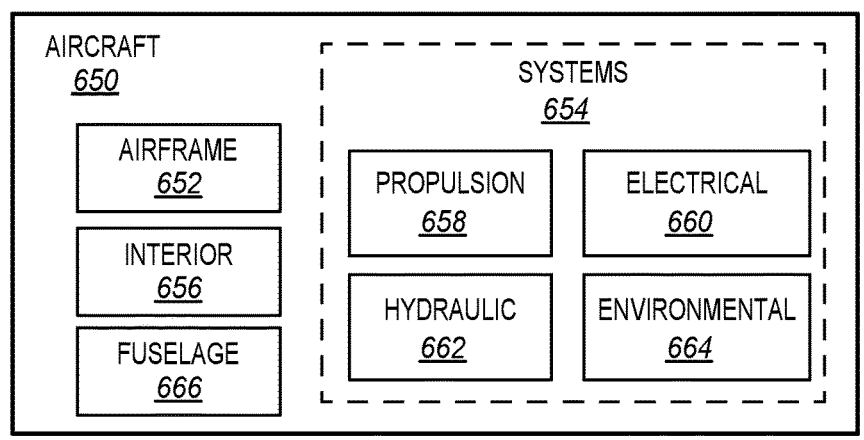
FIG. 22 is a block diagram of an aircraft that can be made using the manufacturing line and/or fabrication system shown in FIGS. 1 to 15 and/or the method shown in FIGS. 16 to 20 in an illustrative embodiment.

Referring more particularly to the drawings, embodiments of the disclosure may be described in the context of aircraft manufacturing and service in method 600 as shown in FIG. 21 and an aircraft 650 as shown in FIGS. 22 and 23. During pre-production, method 600 may include specification and design 602 of the aircraft 650 and material procurement 604. During production, component and subassembly manufacturing 606 and system integration 608 of the aircraft 650 takes place. Thereafter, the aircraft 650 may go through certification and delivery 610 in order to be placed in service 612. While in service 612 by a customer, the aircraft 650 is scheduled for routine work in maintenance and service 614 (which may also include modification, reconfiguration, refurbishment, and so on).

Manufacturing line 10, fabrication line 100, fabrication system 200, and methods 300, 400 embodied herein may be employed during any one or more suitable stages of the production and service described in method 600 (e.g., component and subassembly manufacturing 606, system integration 608, maintenance and service 614) and/or in any suitable component of aircraft 650 (e.g., airframe 652, systems 654, interior 656, propulsion system 658, electrical system 660, hydraulic system 662, environmental system 664).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 22, the aircraft 650 produced by the method 600 may include an airframe 652 with a plurality of systems 654 and an interior 656. The airframe 652 includes a fuselage 666 that defines at least a portion of the interior 656. Examples of systems 654 include one or more of a propulsion system 658, an electrical system 660, a hydraulic system 662, and an environmental system 664. Any number of other systems may be included. Although an aerospace example is shown, the principles of the lines, systems, and methods described herein may be applied to other industries, such as the automotive industry.

FIG. 23 is a perspective view of the aircraft 650 shown in FIG. 22. The aircraft 650 includes the fuselage 666. The fuselage 666 can make up part of the airframe 652 (shown in FIG. 22) and define the interior 656 of the aircraft 650. The fuselage 666 also houses at least a portions of the systems 654. The fuselage 666 can be made up of portions 668 that are manufactured individually or as a subassembly using the manufacturing line 10, fabrication line 100, fabrication system 200, and methods 300, 400 described with respect to FIGS. 1 to 20. For example, the portion 668 of the fuselage 666 can be the structure 12 fabricated using the fabrication line 100 and/or the fabrication system 200.

As described above, a half-barrel section 670 is an example of the portion 668 of the fuselage 666 assembled using the fabrication line 100 and/or the fabrication system 200 and methods 300, 400. Because the fuselage 666 makes up at least part of the airframe 652, the portion 668 and half-barrel section 670 can be considered parts of the airframe 652. In the example of FIG. 23, the fuselage 666 is fabricated from half-barrel sections 670 by joining an upper half-barrel section 672 to a lower half-barrel section 674 to form a respective full-barrel section 676. The full barrel sections 676-1, 676-2, 676-3, and 676-4 are joined serially to form the fuselage 666.

Each portion 668 or half-barrel section 670, or full-barrel section 676 of the fuselage 666 includes stringers 678, frames 680, and skin 682. The skin 682 is attached to the stringers 678 and frames 680. In some embodiments, a frame filler 684 can be positioned between the skin 682 and the frames 680. After hardening 304 (shown in FIG. 16), the stringer preforms 38 (shown in FIGS. 3,4, and 12) become the stringers 678 and the frame filler preforms 36 (shown in FIGS. 3, 4, and 12) become the frame fillers 684. One or more of skin layers 28 on the frame filler preforms 36 and stringer preforms 38 becomes the skin 682 after hardening 304. In one embodiment, a part comprises a portion of airframe 652 and is manufactured during component and subassembly manufacturing 606. The part may then be assembled into the aircraft 650 during component and subassembly manufacturing 606 and/or system integration 608, and then be utilized in service 612 until wear renders the part unusable. Then, during maintenance and service 614, the part may be discarded and replaced with a newly manufactured part. Inventive components and methods may be utilized throughout component and subassembly manufacturing 606 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

The figures and the above description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents. Although specific embodiments are described herein, the scope of the disclosure is not limited to those specific embodiments. The scope of the disclosure is defined by the following claims and any equivalents thereof.

What is claimed is:

1. A method for fabricating a composite part using stations including at least a component station, a preform station, and a skin station, wherein the composite part is a section of a fuselage, the method comprising:
receiving a mandrel at the stations, the mandrel comprising an arcuate cross sectional shape;
placing components on the mandrel at the component station, wherein the components include at least one of isolation plies and frame filler preforms;
moving the mandrel to the preform station;
placing preforms on the mandrel at the preform station, wherein the preforms are configured to become support structures of the fuselage;
moving the mandrel to the skin station; and
placing one or more skin layers on the mandrel at the skin station and overlapping skin panel plies at a crown portion of the mandrel with skin panel plies at a lateral portion of the mandrel, the one or more skin layers covering at least the components.

2. The method of claim 1, further comprising:
supplying material to each of the component station, the preform station, and the skin station by one or more feeder lines for placement onto the mandrel, wherein the material includes at least the components, the preforms, and the one or more skin layers.

3. The method of claim 2, wherein supplying material comprises fabricating the material at each of the one or more feeder lines.

4. The method of claim 1, further comprising:
pausing the moving of the mandrel at one or more of the component station and the skin station,
wherein the placing the components and the placing the one or more skin layers occurs simultaneously during the pausing between the moving of the mandrel.

5. The method of claim 1, wherein the mandrel includes at least a first zone and a second zone, wherein the first zone includes the crown portion and the second zone includes two lateral portions and wherein the crown portion and each of the lateral portions occupy at least a sixty-degree arc of the mandrel, and wherein:
the placing the components includes placing the components on the first zone of the mandrel by moving end effectors at a gantry at the component station; and
the placing one or more skin layers includes placing the one or more skin layers on the first zone of the mandrel by moving skin end effectors at a gantry of the skin station.

6. The method of claim 1, wherein the mandrel includes at least a first zone and a second zone, wherein the first zone includes the crown portion and the second zone includes two lateral portions and wherein the crown portion and each of the lateral portions occupy at least a sixty-degree arc of the mandrel, and wherein:
the placing the components includes placing the components on the second zone of the mandrel by moving end effectors attached to robot arms at the component station; and
the placing one or more skin layers includes placing the one or more skin layers on the second zone of the mandrel by moving skin end effectors attached to robot arms at the skin station.

7. The method of claim 1, wherein:
the receiving the mandrel includes receiving the mandrel from a series of mandrels including at least a first mandrel and a second mandrel; and
the moving to the component station and the moving to the skin station includes synchronously moving the first mandrel through the component station and moving the second mandrel through the skin station.

8. The method of claim 7, further comprising:
pausing the moving of each mandrel at one or more of the stations,
wherein the stations perform the placing during the pausing of the moving of each mandrel of the series of mandrels according to a common takt time.

9. The method of claim 7, wherein receiving the mandrel comprises:
disposing the first mandrel at the component station, and
disposing the second mandrel at the skin station when the first mandrel is disposed at the component station; and
wherein the placing the components and the placing the one or more skin layers occurs during a same period of time while disposing the first mandrel at the component station and disposing the second mandrel at the skin station.

10. The method of claim 1 further comprising pausing the moving of the mandrel at or through the component station, the preform station, and/or the skin station, wherein the placing by the component station of one of: the preform station, or the skin station, occurs during the pausing of the mandrel.

11. The method of claim 10, wherein the placing by the component station, the preform station, and the skin station occur according to a common takt time for the stations.

12. The method of claim 1, wherein the moving to the component station and the moving to the skin station each comprises pulsing the mandrel by a length of the mandrel in a process direction.

13. The method of claim 1, wherein the moving to the component station and the moving to the skin station comprise rotating the mandrel about a longitudinal axis.

14. The method of claim 13, wherein the placing components at the component station and the placing the one or more skin layers at the skin station occur at a same time during or after the rotating.

15. The method of claim 1, further comprising indexing the component station and the skin station with the mandrel.

16. The method of claim 15, wherein:
the indexing for each station is performed prior to each of the placing of the components and the placing of the one or more skin layers on the mandrel.

17. The method of claim 15, wherein:
the indexing for each station includes indexing a portion of the mandrel that is within each station.

18. The method of claim 1, wherein the mandrel is a full-barrel mandrel, the method further comprising:
indexing the full-barrel mandrel to a first angular position of a plurality of angular positions, wherein the plurality of angular positions are aligned with respect to the stations.

19. The method of claim 1, wherein the placing the preforms comprises placing the preforms into troughs of the mandrel.

20. The method of claim 1, wherein the mandrel is a full-barrel mandrel and the skin station is positioned at an angular position with respect to the full-barrel mandrel, and wherein the placing the one or more skin layers further comprises:
splicing skin panel plies placed on the full-barrel mandrel by the skin station to prior skin panel plies placed by the skin station.

21. A method for manufacturing an integral composite part, the method comprising:
receiving a mandrel at stations, the mandrel comprising an arcuate cross sectional shape;
placing components on the mandrel at a component station, wherein the components include at least one of isolation plies and frame filler preforms;
moving the mandrel to a preform station;
placing preforms on the mandrel at the preform station, wherein the preforms are configured to become support structures of a fuselage;
moving the mandrel to a skin station;
placing one or more skin layers on the mandrel at the skin station and overlapping skin panel plies at a crown portion of the mandrel with skin panel plies at a lateral portion of the mandrel, the one or more skin layers covering at least the components; and
hardening the components, the preforms, and the one or more skin layers into the integral composite part.

22. A machine configured to fabricate a portion of an aircraft, such that the machine comprises stations configured to receive a mandrel that comprises an arcuate cross-sectional shape, such that the mandrel is configured to:
receive components on the mandrel at a component station, wherein the components each comprise at least one of: isolation plies, and frame filler preforms;
subsequently move in a process direction to a preform station and receive preforms configured to become support structures of a fuselage of the aircraft; and
subsequently move in the process direction to a skin station and receive one or more skin layers that cover at least the components on the mandrel at the skin station.

23. A system configured to fabricate a section of a fuselage from objects, such that the system comprises:
a component station configured to place components on a mandrel, wherein the components include frame filler preforms formed of an unhardened fiber-reinforced material, wherein the component station is a first component station assigned to a first zone of the mandrel;
a second component station that comprises second component end effectors configured to place the components on a second zone of the mandrel, wherein the second zone is one or more lateral portions of the mandrel;
a skin station separated from the component station in a process direction and configured to place one or more skin layers on the mandrel and the skin station is a first skin station assigned to the first zone of the mandrel, wherein the first zone is a crown portion of the mandrel; and
a second skin station that comprises skin end effectors configured to place the one or more skin layers to the second zone of the mandrel.

24. A fabrication line configured to fabricate a composite part, such that the fabrication line comprises: a mandrel, wherein the mandrel includes at least a first zone and a second zone, wherein the first zone includes a crown portion at the second zone includes two lateral portions and wherein the crown portion and each of the lateral portions occupy at least a sixty-degree arc at the mandrel;
a component station configured to place components on the mandrel, wherein the components include frame filler preforms formed of an unhardened fiber-reinforced material and the component station includes component end effectors configured to place the components;

a skin station separated from the component station in a process direction, such that the skin station comprises skin end effectors configured to place one or more skin layers on the mandrel; and a preform station separated from the component station in the process direction, such that the preform station comprises preform end effectors configured to place stringer preforms on the mandrel, wherein the preforms comprise the unhardened fiber-reinforced material configured to form a support structure of a fuselage.

25. A method of fabricating a portion of an aircraft, the method comprising:

forming components comprising frame filler preforms of an unhardened fiber-reinforced material;

a component station comprising component end effectors placing the components on a mandrel, wherein the mandrel includes at least a first zone and a second zone, wherein the first zone includes a crown portion at the second zone includes two lateral portions and wherein the crown portion and each of the lateral portions occupy at least a sixty-degree arc at the mandrel;

a skin station, separated from the component station in a process direction and comprising skin end-effectors, placing one or more skin layers on the mandrel; and a preform station, separated from the component station in the process direction and comprising preform end effectors, placing stringer preforms on the mandrel, the stringer preforms comprising the unhardened fiber-reinforced material forming a support structure of a fuselage.

26. A method for fabricating a section of a fuselage, the method comprising:

moving a mandrel to a first subsystem assigned to a first zone of the mandrel, wherein the first zone includes a crown portion of the mandrel;

placing components, preforms, and one or more skin layers on the first zone of the mandrel at the first subsystem;

moving the mandrel to a second subsystem assigned to a second zone of the mandrel, wherein the second zone includes a lateral portion of the mandrel; and placing the components, the preforms, and the one or more skin layers on the second zone of the mandrel at the second subsystem.

27. A method of fabricating a portion of an aircraft, the method comprising:

a component station placing components on a mandrel, wherein the components include frame filler preforms formed of an unhardened fiber-reinforced material; and a skin station, separated from the component station in a process direction, placing one or more skin layers on the mandrel; and a second preform station comprising preform end effectors placing the preforms on a second zone of the mandrel.

28. A method for fabricating a section of a fuselage using a series of mandrels including at least a first mandrel and a second mandrel, the method comprising:

moving the first mandrel in a process direction by one or more pulses, comprising a distance equal to or greater than a full length of the first mandrel, to a first station of a group of stations;

indexing a portion of the first mandrel to the first station;

placing objects including at least one of: components, preforms, or one or more skin layers, on the first mandrel within the first station;

moving the first mandrel in a process direction by one or more second pulses, comprising at least a distance of a full length of the first mandrel, to a second station of the group of stations while the second mandrel is moved by one or more third pulses, comprising at least a distance of a full length of the second mandrel, to the first station; and moving the first mandrel in the process direction by one or more fourth pulses, comprising at least a second distance of the full length of the first mandrel, to a third station of the group of stations while moving the second mandrel in the process direction by one or more fourth pulses, comprising at least a second distance of the full length of the second mandrel, to the second station.

* * * * *